United States Patent
Pels et al.

(10) Patent No.: US 6,634,247 B2
(45) Date of Patent: Oct. 21, 2003

(54) DOUBLE-CLUTCH TRANSMISSION

(75) Inventors: Thomas Pels, Achern (DE); Dierk Reitz, Baden-Baden (DE); Reinhard Berger, Bühl (DE); Wolfgang Reik, Bühl (DE); Robert Fischer, Bühl (DE)

(73) Assignee: LuK Lamellen Und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/905,254

(22) Filed: Jul. 14, 2001

(65) Prior Publication Data

US 2002/0033059 A1 Mar. 21, 2002

(30) Foreign Application Priority Data

| Jul. 18, 2000 | (DE) | 100 35 335 |
| Aug. 7, 2000 | (DE) | 100 38 455 |
| Feb. 23, 2001 | (DE) | 101 08 990 |
| Mar. 27, 2001 | (DE) | 101 15 056 |
| Mar. 27, 2001 | (DE) | 101 15 055 |
| Apr. 24, 2001 | (DE) | 101 19 879 |

(51) Int. Cl.$^7$ ............................................. F16H 3/08
(52) U.S. Cl. ............................ 74/329; 74/330; 74/661; 477/6; 477/8
(58) Field of Search ......................... 74/329, 335, 330, 74/333, 661, 730.1; 477/5, 6, 8

(56) References Cited

U.S. PATENT DOCUMENTS

| 4,315,439 | A | * | 2/1982 | Grachtrup | 74/661 |
| 5,875,691 | A | * | 3/1999 | Hata et al. | 74/661 |
| 5,887,670 | A | * | 3/1999 | Tabata et al. | 180/65.2 |
| 6,251,042 | B1 | * | 6/2001 | Peterson et al. | 477/3 |
| 6,341,541 | B1 | * | 1/2002 | Sakamoto et al. | 74/665 A |
| 6,427,549 | B1 | * | 8/2002 | Bowen | 74/331 |
| 6,499,370 | B2 | * | 12/2002 | Bowen | 74/330 |

FOREIGN PATENT DOCUMENTS

| DE | 2805594 A | * | 8/1979 | B60K/25/00 |
| EP | 348622 A2 | * | 1/1990 | F16H/3/12 |
| EP | 845618 A2 | * | 6/1998 | F16H/3/72 |

* cited by examiner

Primary Examiner—Sherry Estremsky
Assistant Examiner—Tisha D. Lewis
(74) Attorney, Agent, or Firm—Alfred J. Mangels

(57) ABSTRACT

A double clutch transmission in connection with an electric unit, as well as a method for operating the transmission.

59 Claims, 31 Drawing Sheets

Figure 1:
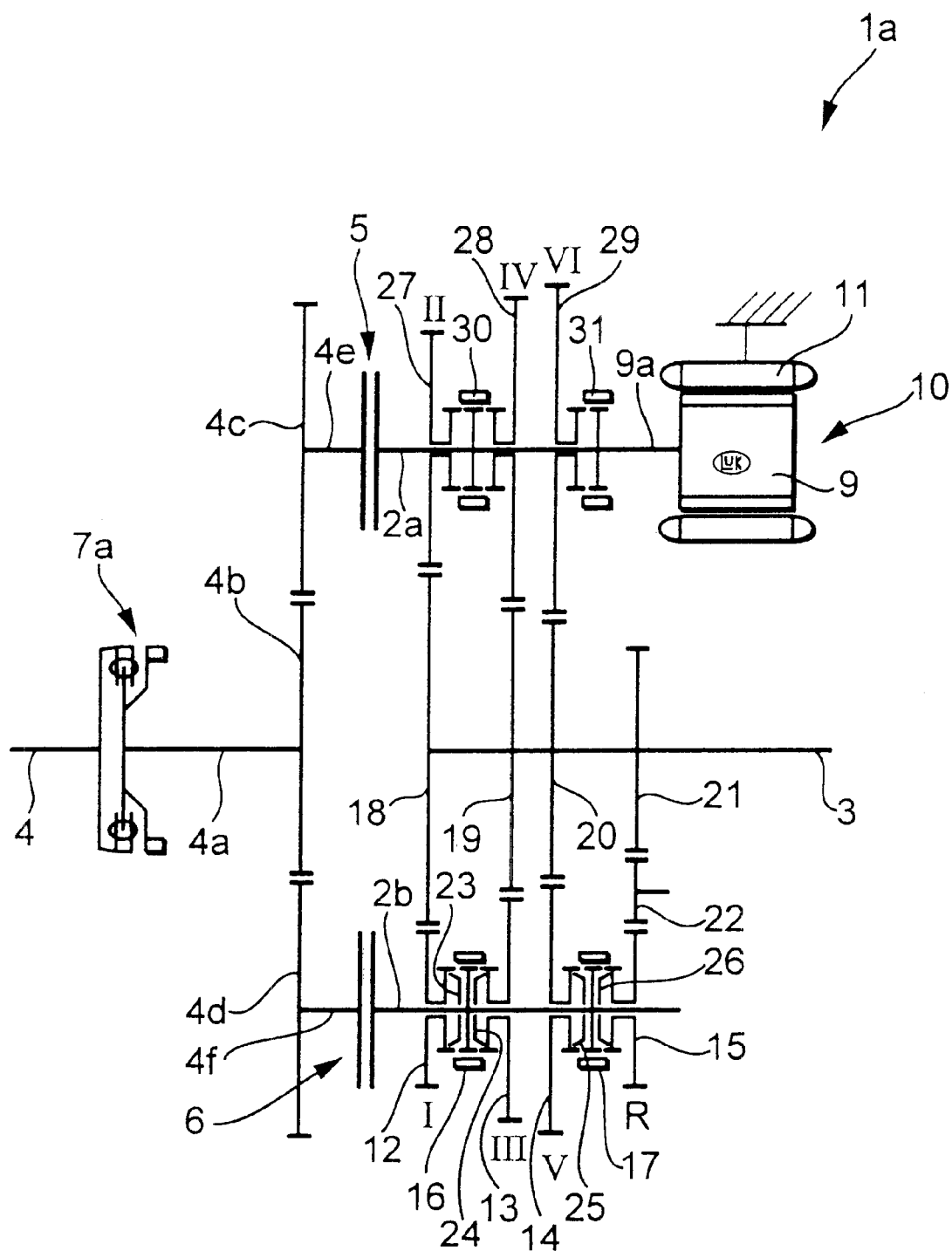

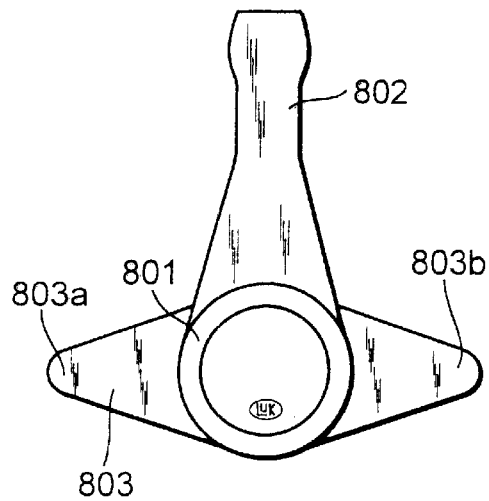
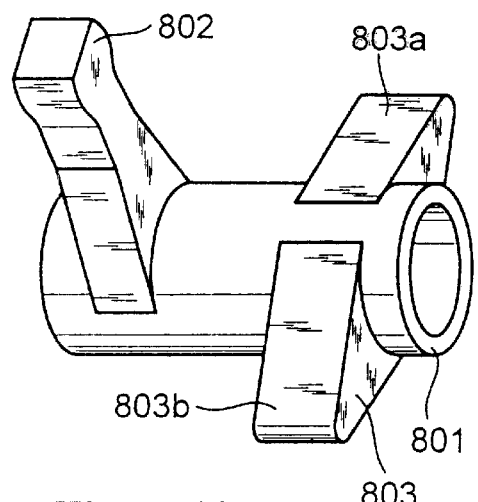
Fig. 28a  Fig. 28b
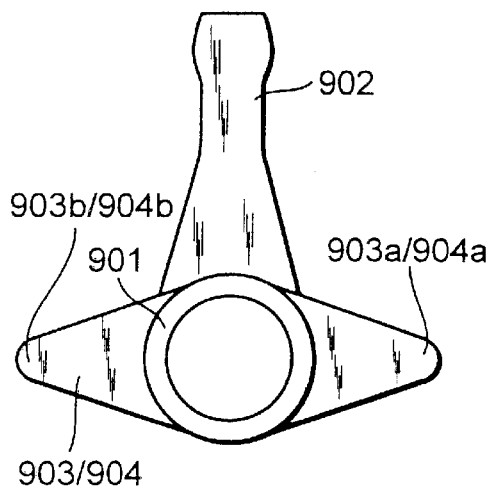
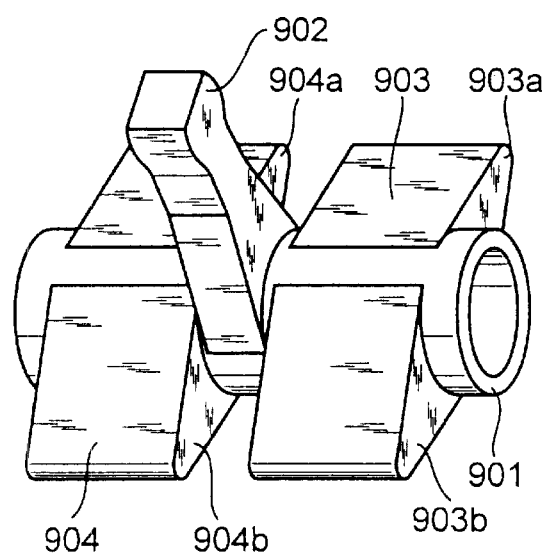
Fig. 29a  Fig. 29b

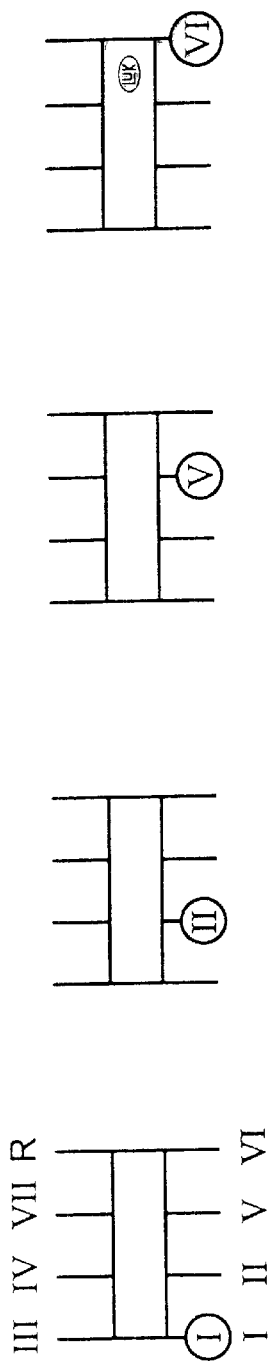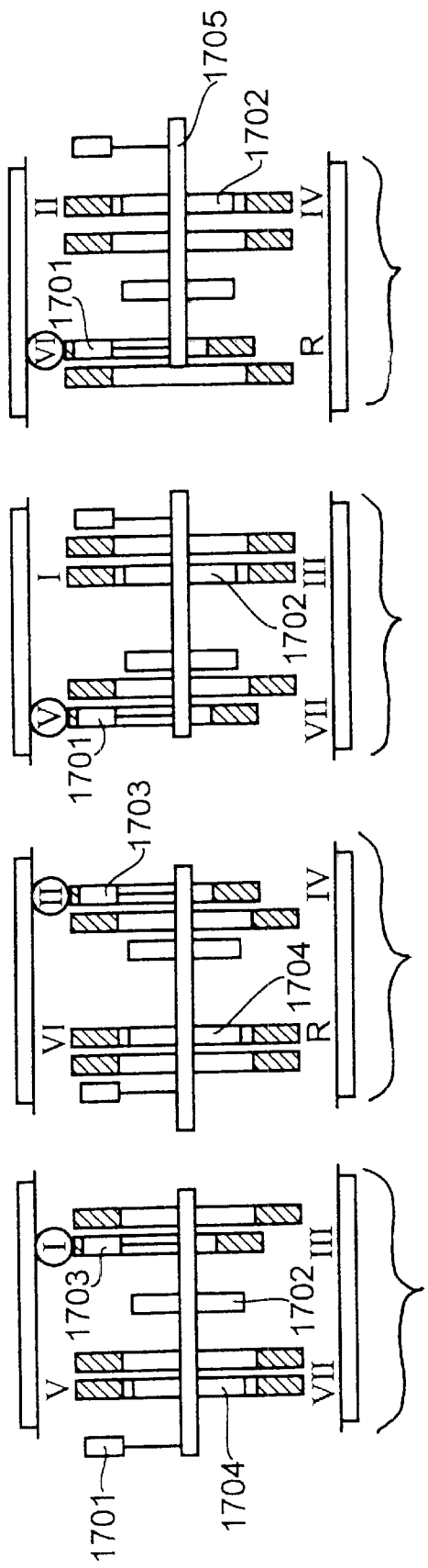
Fig. 31a  Fig. 31b  Fig. 31c  Fig. 31d

DOUBLE-CLUTCH TRANSMISSION

The invention relates to a gearbox, particularly for a motor vehicle, with multiple shafts such as a first and a second gear input shaft and a gear output shaft as well as a multitude of gear pairs between the gear output shaft and the gear input shafts, consisting of an idler that is arranged around one of the shafts, respectively, and connected with it in a stationary manner, and a fixed wheel that is arranged in a stationary manner on a corresponding shaft so as to comb with the idler for the purpose of forming gears with different gear ratios between the gear input shaft and one of the gear output shafts.

Such gears are basically known particularly in connection with internal combustion engines and the separation of the gear input shafts through a clutch of the crankshaft and represent the state of the art for the task of further developing and automating these gearboxes. One aspect of the task is to manufacture this gearbox in the automatic version in a cost effective manner, another aspect of the task is the economical operation of a drive branch with such a gearbox. Furthermore, a partial aspect of the task consists of creating a method for the ecological and comfortable operation of a motor vehicle with a gear box pursuant to the disclosed application documents.

This task is resolved with a gearbox, particularly for motor vehicles, with a multitude of shafts such as a first and a second gear input shaft and an output shaft, which in a beneficial version can also be formed by two shaft branches that can be united later one, for example, with a differential or toothed wheel work, with this gearbox being equipped with at least the following features:

a) a multitude of gear pairs is arranged between the gear output shaft and the gear input shafts, consisting of an idler that is arranged around one of the shafts, respectively, and connected with it in a stationary manner, and a fixed wheel that is arranged in a stationary manner on a corresponding shaft so as to comb with the idler for the purpose of forming gears with different gear ratios between the gear input shaft and one of the gear output shafts;

b) at least one gear input shaft can be driven at least in part through a drive unit with a drive shaft;

c) at least one gear input shaft can be connected with a first electric unit;

d) the gear output shaft can be connected with at least one driving wheel;

e) at least one gear can be actuated automatically with an actuator.

For this embodiment, the idler and fixed wheels that are formed by the gear pairs can be arranged on the gear input shafts and/or the gear output shaft, wherein it may be beneficial to arrange the idlers on the gear input shafts, respectively. Furthermore, it may be beneficial for other embodiments to arrange the idlers on the gear output shaft, particularly in transmissions where the appropriate fixed wheels can be arranged rationally on the gear input shafts because their diameter can be designed so small that they can be easily manufactured in a firmly connected version or single-piece version through forging, milling, stamping processes, through hot flow processes such as lateral extrusion or similar processes. The drive unit can be formed by an internal combustion engine, for example, a piston engine with crankshaft, with appropriate devices being provided for dampening torsional oscillation, axial and/or wobble oscillation between the internal combustion engine and the transmission. Furthermore, the drive unit can be formed by a second electric unit, wherein the first as well as the second electric unit, which can also be operated in a polyphase manner as an electric engine and/or generator based on the synchronous, asynchronous and/or reluctance principle, can drive one gear input shaft, respectively, and can have roughly the same dimensions. Particularly in connection with the usage of an internal combustion engine as the drive unit, it is particularly beneficial to design its drive shaft so that it can be coupled with the gear input shafts, wherein at least one gear input shaft, preferably both, can be coupled with the drive shaft. One embodiment in accordance with the invention provides for a design where the clutches are friction clutches, preferably dry friction clutches, in the form of a double clutch, with this being possibly arranged in the clutch housing of the gearbox, i.e. axially between the drive unit and the transmission. For this version, the previously mentioned dampening devices can be integrated in the double clutch, furthermore a flywheel that may be provided can hold the clutches, wherein the various clutch components can be fastened to the flywheel as modules and the flywheel can be a divided flywheel with two-mass effect.

Based on one inventive idea, the drive unit can furthermore be formed by an internal combustion engine with a crankshaft that can be connected with one gear input shaft, respectively, through a double clutch. For this purpose, an electric unit—such as the one described above as the first electric unit—can be connected additionally with at least one gear input shaft in such a manner that it can be uncoupled. It can also prove particularly beneficial to arrange the electric unit so as to allow it to be connected alternatively with both gear input shafts. This connection can be formed by a friction, shifting or magnetic clutch, which creates the connection from the electric unit to the gear input shaft by building up electro-magnetic fields, wherein the formation of the connection and/or the selection of this clutch can occur through an actuator of the electric, hydraulic and/or pneumatic as well as a combined procedure or in the case of a magnetic clutch through the appropriate selection of the electric currents through the device adjusting the magnetic effect, such as coils or similar devices. Of course, two clutches can also be beneficial for forming a connection between the gear input shafts and the electric unit that can be uncoupled, wherein one clutch, respectively, can connect the electric unit with one of the gear input shafts and two appropriate actuators can be used for this purpose.

Beneficial embodiments of the gearbox provide for the fact that the gear output shaft can be arranged basically coaxially to the drive shaft and/or that one of the gear input shafts is arranged basically coaxially to the drive shaft. It can prove particularly beneficial to arrange one gear input shaft as a hollow shaft around the other gear input shaft. In a beneficial version, the gear pairs that form the individual gears can be arranged alternating on the two gear input shafts in dependence of the gear ratios. This way it is possible to operate the vehicle through a gear input shaft, which is connected with the internal combustion engine through the appropriate clutch, and a gear with one gear ratio, while on the other gear input shaft the next gear ratio is engaged with an engaged clutch between the gear input shaft and the internal combustion engine. This way, for example, four, preferably six, separate forward speeds and one reverse speed can be incorporated in these transmissions, wherein those gears with an increasing gear ratio can be arranged on one gear input shaft and those gears with gear ratios in between the gear ratios of that on the first gear input shaft can be arranged on the other gear input shaft.

The reverse gear can be arranged on either of the two gear input shafts. In an alternative to this embodiment, the motor vehicle can be operated purely electrically in reverse, wherein the electric unit is operated in the opposite rotational direction. The preferred starting gear with the smallest gear ratio can, for example, be arranged on the first one, the second gear with the next higher gear ratio on the second one, the third gear again on the first one and the fourth gear again on the second one etc. The electric unit can be connected with the gear input shaft that contains the gear with the smallest or the gear with the next smaller gear ratio. The individual gears are preferably formed through fixed wheels and idlers, which are arranged on one shaft, respectively, such as the gear input shaft and the gear output shaft, wherein for the purpose of activating the gear the appropriate idlers is connected with the shaft, for example, through a sliding sleeve. In a beneficial version, the idlers can be arranged on the gear input shafts, on the gear output shaft or depending on the requirement alternating on one of the gear input shafts and the gear output shaft or driven shaft. As known, the idlers can be placed on the appropriate shafts such as gear input shaft and/or gear output shaft in a synchronized manner with regard to a speed between the shafts carrying the two gear pairs, wherein this synchronization process can occur with conventional synchronizing devices or alternatively or additionally with the electric unit and wherein the electric unit can be used in a driving or braking manner in accordance with the required minimum of the differential speed between the two shafts for achieving a synchronizing speed. Furthermore, it may be particularly beneficial to accelerate the synchronization process by decelerating or accelerating the gear input shaft, by operating it at least in a slipping manner with the drive unit through the clutch, which is generally engaged when the torque is transferred through the other gear input shaft.

With regard to the arrangement of the electric unit on the gearbox it has proven particularly beneficial to arrange it on the end of the gear input shaft that is opposite the drive unit such as the internal combustion engine. Of course, it can also be beneficial to arrange the electric unit parallel to one of the gear input shafts, wherein an arrangement parallel to the axis through an active connection such as a belt, chain, toothed wheel connection or similar is selected and the electric unit can be arranged in the area of the double clutch or at axial height of the gear. When arranged on the side of the gear that is opposite the drive unit, a coaxial arrangement of the electric unit to the gear input shaft, with which the electric unit is connected, can be beneficial. Additionally, the electric unit can be arranged around the clutch, for example, around the double clutch of the double clutch gearbox, which offers the advantage that additional axial space is largely eliminated and that due to a larger diameter the electric unit can have a stronger, i.e. more powerful, design. With regard to an active connection of the electric unit to the double clutch gear, it may be beneficial to arrange the electric unit on the gear wheels that are arranged on one of the gear input shafts, next to the direct coupling to the gear input shaft. This way, the electric unit, when used as a motor or generator, can be adjusted to the speed-dependent efficiency maximum level of the electric unit by utilizing the various gear ratios on the gears that can be engaged on this gear input shaft. On the other hand, it has turned out that particularly during recuperation processes kinetic energy that can be converted into electric energy is recuperated with a long power branch, such as in the case of an active connection of the electric unit with the gear with the largest gear ratio, when recuperating in a gear with small gear ratio. In this case, kinetic energy is guided, for example, through three gear pairs so that a loss of efficiency must be tolerated. Based on the inventive idea it can prove particularly beneficial in such cases to actively connect the electric unit preferably on the gears and/or the gear wheels with a mean gear ratio, for example, in dependence on the selection of the gear input shaft preferably on gear II or gear IV and/or gear III.

Additionally, the electric unit can be arranged on the gear output shaft, wherein it is arranged in an articulating way around it and can be actively connected with the gear input shaft. This is particularly beneficial in so-called in-line gearboxes where the gear output shaft is arranged coaxially to the crankshaft. The electric unit can be positioned on the gear output shaft at the end of the gearbox that is opposite the crankshaft, and can thus be arranged optimally for spatial reasons. This can include an articulating arrangement around the gear output shaft so as to arrange the rotor around the gear output shaft and seat it in an articulating manner or to seat the rotor in an articulating manner in relation to the gear housing. In both cases, the stator must be firmly connected with the gear housing. As in the remaining embodiments, the electric unit can have an external or internal design, i.e. with a rotor that is arranged around the stator or within the stator. The electric unit can basically be a synchronous, asynchronous or reluctance type. The active connection between rotor and gear input shaft can occur through a belt design, a toothed wheel connection or similar, wherein it may be particularly beneficial to connect the electric unit with a gear wheel of a gear wheel pair of one gear, for example, a gear with high gear ratio, e.g. gear V. Beneficially, a gear is selected whose gear ratio is larger than the gear ratio of the direct speed (speed of the crankshaft is equal to the speed of the gear input shaft) so that an appropriate gear ratio of these two gears between the electric unit and the internal combustion engine exists, which allows the electric unit to be operated in generator mode at the speeds within efficiency and the internal combustion engine to be started by the electric unit with appropriate smaller speeds of the crankshaft and high speeds of the electric unit. Additionally, it may be beneficial to connect the rotor, for example, with the gear output shaft in a stationary manner through a shifting clutch to further spread the speed range of the electric unit.

At least one secondary unit can be connected with the electric unit from a drive point of view, and it may be particularly beneficial when in the case of an arrangement of the electric unit parallel to the axis of the gear input shaft the electric unit is integrated into the pulley plane of the secondary unit. The electric unit can perform a drive function in the conventional sense, wherein the electric unit beneficially can be uncoupled from the gear input shaft so that the secondary units can be operated by the electric unit independently from the speed of the gear input shaft, i.e. also independently from the speeds of the driving wheels and the speed of the drive shaft of the internal combustion engine. This offers the advantage that, if it is desired to operate the secondary units electrically independently from the drive unit, the separate supply of these secondary units with one electric unit, respectively, can be eliminated and an appropriate weight reduction can occur. Furthermore, a gear ratio can be provided between the electric unit and at least one secondary unit that can be adjusted variably, for example, through a variably adjustable gearbox (CVT) or through toothed wheel connections that can be actuated automatically or manually. It can also prove beneficial to uncouple the electric unit from at least one secondary unit through a so-called secondary unit clutch. Several secondary units that are arranged in one pulley plane can be separated from, connected with and/or have a gear ratio in relation to each other and/or to the electric unit, which can be accomplished with clutches, free-wheels and appropriate gearboxes for selecting variable and/or fixed gear ratios.

Based on another idea of the invention, the connection between the drive shaft and at least one of the gear input shafts can be either reduced or multiplied. This gear ratio process or pre-multiplication can occur beneficially through gear wheel steps, wherein already a graduation of the gear input shafts among each other can occur by subjecting one gear input shaft to a gear ratio, but not the other. Additionally, the advance gear ratio process of the r.p.m. range of the gear input shafts can be adjusted so as to operate the electric unit independently from the engaged gear at an optimized speed, i.e. a speed that has been adjusted for the electric unit with regard to its efficiency. Of course, the appropriate gear ratio process can also occur directly between the gear input shaft and the electric unit, particularly in the case of an arrangement of the gear input shaft parallel to the axis of the electric unit with an active connection between these components, such as belt operation, chain drive, gear wheel drive and similar arrangements.

Based on another idea of the invention, the drive branch consisting of the drive unit such as an internal combustion engine, the clutch device such as the double clutch and the gearbox such as the double clutch transmission is provided for automatic actuation, wherein at least one clutch and/or one gear can be engaged automatically in dependence on the driving situation. The design of the drive branch as fully automatic gearbox with two clutches that can be actuated fully automatically and the fully automatic actuation of all gears however is advantageous. This way, at least one gear or one clutch is actuated by an actuator, which can be an electric, hydraulic, pneumatic or combined actuator. In a beneficial embodiment such an actuator is provided for each gear, wherein it can prove particularly beneficial to engage two neighboring gears, respectively, that are arranged on one gear input shaft through shifting sleeves such as sliding sleeves that are engaged by an appropriate actuator, for example, a pair of gears consisting of a first gear and a neighboring gear on the gear input shaft can be engaged by an actuator. A pair of gears can be formed, for example, by the first and the third gear, wherein the shifting sleeve can override a possibly adjustable neutral position between activation of the first gear and activation of the second gear by forming a positive lock with the gear input shaft. It can be beneficial to combine an individual gear that cannot be combined with a pair of gears with the gear input shaft through connection with the electric unit so that with this sliding sleeve an actuator either engages this gear or connects the electric unit with the gear input shaft or activates optionally a neutral mode.

Based on another idea of the invention, gear ratio steps can be actuated through an actuator on the gear input shafts that are equipped with a synchronizing device on the last gear pair, for example, of the first gear input shaft that does not actively connect with the electric unit, wherein gear ratio steps are engaged by connecting an idler with the shaft that holds it through an end output element, which is part of an end output mechanism that is actuated by the end actuating mechanism, and wherein the shifting sequence of the gear ratio steps is not set in the end actuating mechanism. The end output element here is the element that is moved in order to set a gear ratio, i.e. the one that establishes the connection between two power transmission devices, for example, a clutch sleeve. This end output element is part of the end output mechanism, which apart from the clutch sleeve comprises a shifting fork, for example, that is connected with the clutch sleeve and can be moved with a shifting finger that can be actively connected with it, causing the clutch sleeve to be moved in order to engage or disengage a gear ratio step, wherein the shifting finger is part of the end actuating mechanism that actuates the end output mechanism. The end actuating mechanism, which can be triggered by an actuator and can include the kinematic transmission of the actuator movement onto an actuating element, such as a shifting finger, can comprise at least a main actuating element such as shifting fingers, which is actively connected with the end output mechanisms such as shifting forks and sliding sleeves in such a way that a gear ratio step can be engaged and that at least one main actuating element can be actively connected with another end output mechanism without having to disengage the previously engaged gear ratio step, wherein the end actuating mechanism can comprise at least one secondary actuating element, for example, at least one additional shifting cam. The end output mechanisms in accordance with the invention can comprise connecting elements such as shifting forks, which are equipped with a first functional area for engagement of a main actuating element and a second functional area for engagement of a secondary actuating element. The secondary actuating element can be arranged, for example, on a control shaft that articulates around its longitudinal axis upon actuation, wherein the second functional area can be designed so as to allow power to be transmitted—upon rotation of the control shaft—from one secondary actuating element onto the second functional area in the disengaging direction of the appropriate gear ratio step, with this power being equal to or larger than the force that is required for disengagement.

As soon as at least one main actuating element actively connects with an end output mechanism, at least one secondary actuating element can actively connect with at least one additional end output mechanism. For the purpose of disengaging the appropriate gear ratio steps, it can prove furthermore beneficial to actuate another end output mechanism through at least one secondary actuating element while actuating an end output mechanism for engaging a gear ratio step through at least one main actuating element. The end actuating mechanism can be designed so as to allow only one gear ratio step of a gear input shaft to be engaged at one time. Furthermore, secondary actuating elements and the functional areas in the end output mechanisms can interact in such a way that a gear ratio step is disengaged when rotating the control shaft regardless of the rotational direction, wherein an secondary actuating element and these functional areas are of symmetrical design. It is beneficial when at least one secondary actuating element has two cam-like end areas and the functional areas have corresponding recesses. Furthermore, the functional areas can be equipped with two cam-like end areas and at least one secondary actuating element can have corresponding recesses. Transmission of power between the secondary actuating element and the functional areas can occur, for example, through the tips of the cam-like end areas or through the side areas of the cam-like end areas. Further embodiments and a more detailed description with regard to function are revealed in the unpublished application DE 101 08 990.2, which hereby is included with its full content in the present application.

Based on the idea of the invention, the end actuating mechanism can also perform the synchronization of the gear input shaft through the synchronizing device on the last gear pair, for example, with the sliding sleeve actuating only the friction device of the synchronizing device of the last gear pair by performing an axial movement that corresponds to the engagement of the last gear ratio step, however not really actuating the shifting clutch, but rather moving it back into the starting position after decelerating the gear input shaft and the gear input shaft reaching the synchronizing speed. Of course, the friction device of the synchronizing device on the last gear pair is appropriately designed so as to perform the synchronization of the gear input shaft for all gear ratio shifts on the gear ratio steps that are arranged on this gear input shaft. This feature can include particularly resistant, wear-proof friction components such as ceramic friction disks or conventional friction lining with a large wear range. Furthermore, it can provide for easily exchangeable friction disks, e.g. fins that are open on one side and arranged in finned cages, which can be slid easily over the shaft around which the synchronizing device is arranged. The usage of the end actuating mechanism with at least one main and one secondary actuating element can be particularly beneficial in that the synchronizing device on the last gear pair is actuated through the secondary actuating element for the purpose of synchronizing the speed of the first gear input shaft to the speed of the gear output shaft during a gear ratio step switch and that the gear ratio step switch occurs through the main actuating element. This allows the deceleration of the gear input shaft through the secondary actuating element to occur nearly simultaneously and in the same operation as the disengagement of the engaged gear ratio step with the main element so that practically no loss of time occurs over the arrangement of separate synchronizing devices on each gear step—an arrangement that requires considerably more space and is more cost intensive—and a simplified actuation of the synchronizing device over actuation through a separate or kinematically complicated end actuating mechanism that is dependent upon the end actuating mechanism for disengaging and engaging the remaining gear steps can be suggested. Of course, the secondary actuating element can also engage the last gear ratio step.

Based on an idea of the invention, the drive unit can still be formed by an internal combustion engine with a crankshaft, which can be connected with a gear input shaft through a double clutch. For this, an electric unit—as the one described above as first electric unit—can be connected additionally with at least one gear input shaft in such a manner that it can be uncoupled. It may be particularly beneficial to arrange the electric unit in such a way that it can be connected alternatively with both gear input shaft. This connection can be formed with a friction, shifting or magnetic clutch, which creates the connection of the electric unit with the gear input shaft by creating electromagnetic fields, wherein the formation of the connection and/or the selection of this clutch can occur through an actuator with electric, hydraulic and/or pneumatic as well as combined features or in the case of a magnetic clutch by the appropriate selection of electric currents by devices that adjust the magnetic effect, such as coils or similar. Of course, two clutches may also be advantageous for forming a connection between the gear input shafts and the electric unit that can be uncoupled, wherein one clutch respectively can connect the electric unit with one of the gear input shafts and for which two appropriate actuators can be employed.

At least one secondary unit can be connected with the electric unit from a drive point of view; it may be particularly beneficial if in the case of an arrangement of the electric unit parallel to the axis of the gear input shaft the electric unit is integrated into the pulley plane of the secondary unit. The electric unit can perform a drive function in the conventional sense, wherein the electric unit in a beneficial embodiment can be uncoupled from the gear input shaft so that the secondary units can be operated by the electric unit independently from the speeds of the gear input shaft, i.e. also independently from the speeds of the driving wheels and the speed of the drive shaft of the internal combustion engine. If it is desired to operate the secondary units electrically independently from the drive unit, this design is beneficial because it eliminates the separate supply of these secondary units with an electric unit and reduces the weight accordingly. Furthermore, a gear ratio may be provided between the electric unit and at least one secondary unit that can be adjusted variably, for example, through a variably adjustable belt wrap gearbox (CVT) or through gearwheel connections that can be actuated automatically or manually. It can also be beneficial to uncouple the electric unit from at least one secondary unit through a so-called secondary unit clutch. Several secondary units that are arranged in a pulley plane can be separated from, connected with and/or subjected to a gear ratio process with each other and/or the electric unit, also through clutches, free-wheels and appropriate gearboxes for selecting variable and/or fixed gear ratios.

Another beneficial embodiment may involve the usage of energy recovered during recuperation for supplying hydraulic accumulators when employing hydraulic devices, e.g. a hydraulic actuating device of at least one of the clutches, wherein, for example, the recuperation energy that has been converted into electric energy supplies an electric pump or wherein a pump that is coupled to the drive branch directly supplies the accumulator during a recuperating process by utilizing the kinetic energy that is provided by the driving wheels. The advantage of such methods and designs is that a usually occurring intermediate storage process, for example, in an electric accumulator, can be avoided, thus allowing the overall efficiency of the recuperating process and thus of the motor vehicle to increase. Of course, the direct operation of a secondary unit with kinetic energy offers the greatest efficiency and in particular applications, for example, when a secondary unit cannot be directly connected actively with the drive branch for spatial reasons, the energy created by the electric unit can be supplied directly and without intermediate storage in an accumulator to an electrically operated secondary unit, e.g. a pump for an actuating device of clutches, steering booster devices, chassis stabilization device and/or similar, a compressor for air conditioning devices, compression of the intake air for the internal combustion engine, compressed air brakes and/or similar, which can be arranged in accordance with the spatial conditions. Priorization of the power supply and/or energy supply with a combination of individual power users and/or energy consumers can be provided in dependence of the charge state of the electric accumulator during a recuperation process. The highest priority is beneficially assigned to the supply of safety-relevant users such as the steering booster pumps, the braking devices, the actuating devices for clutches, the chassis stabilizing components, engine controls and similar before users providing comfort such as air conditioning compressors, seat heating, window openers and similar; after that excess energy can be stored e.g. as electric energy in an electric accumulator or e.g. as thermodynamic energy in an air conditioning compressor, e.g. as carbon dioxide snow, as condensed supercritical gas or similar.

In the shifting device mentioned above in accordance with the invention, the end output element is the element that is moved in order to set the gear ratio, i.e. the one which establishes the connection between two power transmission devices, such as a clutch sleeve. This end output element is part of the end output mechanism, which apart from the clutch sleeve comprises e.g. a shifting fork, which is connected with the clutch sleeve and can be slid through a shifting finger that can actively interact with it, so that the clutch sleeve is moved in order to engage or disengage a gear ratio step, wherein the shifting finger is part of the end actuating mechanism that actuates the end output mechanism; the end actuating mechanism is the entire kinematic chain between the shifting and/or selecting drive and end output mechanism.

In state-of-the-art gearboxes, the end output mechanism and end actuating mechanism interact so as to allow a gear ratio step to only become engaged when no other gear ratio step has been engaged. In order to engage a gear ratio step, all other gear ratio steps must therefore be disengaged first. For example, control shaft openings, with which the shifting finger can be connected in order to shift the clutch sleeve through the respective control shaft, are designed in such a way that the shifting finger can only connect with another shifting fork if the clutch sleeve, with whose shifting fork it is connected at that time, has assumed a neutral position. With regard to a conventional manual transmission with an H-figure this means that a selection movement of the gear shift lever from one shifting channel into another can only occur in the neutral channel, wherein with a lever movement from one shifting channel into the neutral channel always the gear ratio step that was just engaged will be disengaged. The gear ratio steps, which can be engaged with the same clutch sleeve, cannot be engaged simultaneously anyhow. Therefore, it is necessary for a shifting process to disengage a previous gear ratio step, perform a selection movement and then engage a new gear ratio step; during this time, the flow of torque is interrupted by an engaged starting clutch since the branch must be free from load during the shifting process.

Particularly in the case of gearboxes that can be shifted with load, where the gear ratio steps form groups between which tractive force-uninterrupted load shifting can be performed, for example, by allowing the gear ratio steps to be wrapped by various parallel transmission branches that are allocated to different output elements of a friction clutch so that a continuous change of the torque from one branch to the next can be affected by actuating a friction clutch, designs of connections of the end output mechanism with the end actuating mechanism have been known that permit the engagement of one gear ratio step without having to disengage another gear ratio step that has possibly already been engaged. This way it is possible to engage several gear ratio steps simultaneously in several transmission branches through a single end actuating mechanism by first engaging a gear ratio step in one branch, with the shifting finger then connecting with other shifting forks in order to engage additional gear ratio steps without having to disengage the appropriate gear ratio step. In this connection, we would like to refer to application DE 100 20 821 A1 by the applicant, whose contents are also part of the disclosure content of the present application.

Generally, two groups of gear ratio steps are formed, wherein with regard to the graduation of their gear ratio subsequent gear ratio steps are part of different groups. For example, in the case of a gear box with one reverse gear (R) and six forward gears (I–VI) one group comprises gears I, III and V and the other group comprises gears R, II, IV and VI.

Such a gearbox offers the possibility of having engaged a gear ratio step in the transmission branch closed in the flow of torque through the friction clutch and to then engage—in another still open branch—the gear ratio step into which subsequently the switch is supposed to occur through diversion of the flow of torque onto the appropriate branch. During an acceleration process, for example, while the gear III has been engaged in a closed gear branch, the gear IV can be engaged in another branch. If however suddenly a shifting back into gear II should occur, the gear IV must first be disengaged and then the gear II be engaged, which represents a particularly high loss of time when the gears II and IV are shifted by different clutch sleeves.

It would also be feasible to have a situation where in the open transmission branch more than one gear ratio step is engaged, which represents a very large safety risk because as soon as this branch is integrated into the flow of torque several gear ratio steps with differing gear ratios become active, which can block or even destroy the transmission.

Additionally, so-called drum controller transmissions are known, where the end output mechanisms of the gear ratio steps are actuated through a rotating drum controller. In the drum controller, e.g. shifting gate-like grooves are incorporated, which extend on the surface of the cylindrical drum controller both in circumferential direction and in axial direction so that upon rotation of the drum controller around its longitudinal axis shifting forks, which are connected with the drum controller kinematically through elements traveling in the grooves, move in the axial direction of the drum controller; the shifting sequence of the gear ratio steps in relation to the rotation of the control shaft is set by the course of the grooves. With an appropriate design of the grooves, such drum controller transmissions allow the disengagement of an old and the engagement of a new gear ratio step to overlap, which offers a certain time advantage during the shifting process and thus reduces the duration of the tractive force interruption, however only sequential shifting is possible, e.g. shifting from gear I into gear III is just as impossible as a direct shifting back from e.g. gear V into gear I.

This task is resolved with the feature that in a gear box—where the end actuating mechanism comprises at least one main actuating element such as shifting fingers that interacts, e.g. through axial displacement of a control shaft on which it is arranged, with the end output mechanisms, which are formed e.g. by shifting forks and clutch sleeves that are connected with them, in such a manner that a gear ratio step can be engaged, e.g. by rotating the control shaft on which at least one main actuating element is arranged, and that it can then connect with another end output mechanism without having to disengage the previously engaged gear ratio step—the end actuating mechanism comprises at least one secondary actuating element.

In accordance with one particularly preferred embodiment at least one secondary actuating element interacts with at least one additional end output mechanism, e.g. in a certain position, a main actuating element interacts with a end output mechanism, while simultaneously secondary actuating elements interact with the additional end output mechanisms, as soon as at least one main actuating element interacts with the end output mechanism. Upon actuation of an end output mechanism for engaging a gear ratio step through at least one main actuating element, e.g. by rotating the control shaft, it is beneficial if at the same time at least one additional end output mechanism is actuated through at least one secondary actuating element for disengaging the appropriate gear ratio steps. It is particularly useful that this way only one gear ratio step can be engaged at one time and that due to the overlapping disengagement of the old and engagement of the new gear ratio step as well as the already performed selective movement a considerably time advantage is achieved.

Based on another, also particularly preferred embodiment for a gear box where the gear ratio steps form groups among which a tractive force-uninterrupted switch can occur, at least one secondary actuating element interacts with at least one additional end output mechanism of the same group as soon as at least one main actuating element interacts with an end output mechanism of a group. In this embodiment, it is very useful that upon actuation of a end output mechanism of one group for engaging a gear ratio step through at least one main actuating element at the same time at least one additional end output mechanism of the same group is actuated through at least one secondary actuating element for disengaging the appropriate gear ratio steps. It is beneficial if at least one secondary actuating element interacts with no end output mechanism of the other group as soon as at least one main actuating element interacts with a end output mechanism of one group. It is very useful that this way a gear ratio step can be engaged simultaneously in each group, but not several gear ratio steps of one group.

Based on an exemplary, but particularly preferred embodiment of the end output mechanisms, which comprise connecting elements such as shifting forks, they are equipped with a first functional area for engaging a main actuating element and a second functional area for engaging an secondary actuating element so that each end output mechanism can be actuated through a main actuating element or through an secondary actuating element. On a gear box at least one secondary actuating element is here arranged on the control shaft that can rotate around its longitudinal axis upon actuation and the second functional area is designed in such a way that upon a rotation of the control shaft a force can be transmitted from one secondary actuating element to the second functional area in the disengagement direction of the appropriate gear ratio step, with this force being equal to or larger than the force that is required for disengagement. The connection between the secondary actuating element and end output mechanism must not be suited to also transfer a force for engaging a gear ratio step.

In another embodiment a design of at least one secondary actuating element is preferred that makes it possible to connect the secondary actuating element with at least two end output mechanisms. For this, at least one secondary actuating element is particularly wide in the control shaft axial direction, which preferably corresponds at least roughly to the width of two shifting fork mouths and their joint distance.

Based on a particularly preferred embodiment, at least one secondary actuating element and the second functional areas interact so as to disengage a gear ratio step upon rotation of the control shaft independently from the rotational direction. Starting from the original position in which the control shaft is in a mean position in relation to its rotation and in which also the main actuating element has become engaged with the first functional area of a end output mechanism, a gear ratio step is engaged by rotating the control shaft either to the right or the left, wherein in any case at least one secondary actuating element actuates the gear ratio step(s) that is (are) are assigned to it with regard to disengagement.

In the embodiment it is considered particularly beneficial if for this purpose at least one secondary actuating element and the second functional areas are of symmetrical design.

In a particularly preferred example, at least one secondary actuating element is equipped with two cam-like end areas and the second functional areas with corresponding recesses.

In another, also particularly preferred embodiment, the second functional areas are equipped with two cam-like end areas and at least one secondary actuating element with corresponding recesses.

Transmission of power between the secondary actuating element and the second functional area occurs through the tips of the cam-like end areas, wherein in another embodiment it is also useful if the transmission of power between the secondary actuating element and the second functional area occurs through the side areas of the cam-like end areas.

In order to resolve the task, these beneficial embodiments are based on an inventive method that contains at least the following procedural steps:

the drive unit drives at least one of the gear input shafts at least some of the time;

the first electric unit drives one of the gear input shafts at least some of the time;

the first electric unit is driven by one of the gear input shafts at least some of the time.

The invented method can at least provide for a starting of the drive unit, which has the design of an internal combustion engine, wherein in the case of a cold internal combustion engine this unit is started preferably through a method that uses the idea of the invention in connection with beneficial arrangements of the drive branch that include one clutch, respectively, between the internal combustion engine and gear input shaft and contain the following procedural steps:

both clutches are engaged;

no gear has been engaged between the first gear input shaft, with which the first electric unit is connected from a drive point of view, and the gear output shaft;

a gear with preferably a small gear ratio (multiplication or reduction) has been engaged between the second gear input shaft and the gear output shaft;

the first electric unit is driving the first gear input shaft;

the clutch in the power distribution flow between the first gear input shaft and the drive shaft is disengaged after reaching the torque that is required for a cold start of the electric unit;

after starting the drive unit the clutch in the power distribution flow between the drive shaft and the second gear input shaft is disengaged and the vehicle starts to run.

This method can alternatively or additionally be combined with another method for starting the internal combustion engine, wherein this method is preferably employed for a drive unit in the warmed-up state and contains the following procedural steps:

no gear has been engaged between the first gear input shaft, with which the first electric unit is connected from a drive point of view, and the gear output shaft;

a gear with preferably a small gear ratio (multiplication or reduction) has been engaged between the second gear input shaft and the gear output shaft;

the clutch in the power distribution flow between the first gear input shaft and the drive shaft is disengaged;

the first electric unit is being driven and the drive unit is started;

by disengaging the clutch in the power distribution flow between the drive shaft and the second gear input shaft the vehicle starts to run.

Alternatively or additionally, the following starting procedure can prove beneficial, particularly for a cold internal combustion engine in connection with the arrangement of a fixed wheel on the first gear input shaft and an idler with a shifting sleeve, a so-called triplex sleeve, that interacts with the fixed wheel, with the sleeve being arranged on the gear output shaft and being able to connect selectively the gears of a gear pair with each other, to connect one of the gears positively with the gear output shaft or to assume a neutral position without connecting function:

- no gear is engaged between the first gear input shaft, which is connected with the first electric unit from a drive point of view, and the gear output shaft;
- the two gears are connected with each other through the triplex sleeve between the second gear input shaft and the gear output shaft;
- the clutch in the power distribution flow between the second gear input shaft and the drive shaft is disengaged;
- the electric unit is being driven and the drive unit is being started;
- the clutch between the drive unit and second gear input shaft is being engaged;
- the second gear input shaft and the gear output shaft are decelerated to a negligible speed, for example, through the electric unit;
- the triplex sleeve is moved into the neutral position;
- a gear with a small gear ratio between the second gear input shaft and gear output shaft is engaged;
- by disengaging the clutch in the power distribution flow between the drive shaft and the second gear input shaft the vehicle starts to move.

A large advantage of this method is a cold start of the internal combustion engine at high speed—caused by the gear ratio steps of two gears, for example, the second and the fifth gear—and thus a reduced torque of the electric unit. In connection with an appropriate transmission design, the elimination of a pulse start with a cold internal combustion engine is made possible, also and particularly for temperatures under the freezing point, and the electric unit can become more cost effective and have smaller torques. This can lead to enormous cost and space savings.

The invented method can additionally comprise the following procedural steps for operating the first electric unit as a generator for creating electric energy:

- the first electric unit is driven by the drive unit or for a driving mode such as recuperation by at least one driving wheel;
- when driven by the drive unit selectively one of the two clutches in the power distribution flow between the drive shaft and one gear input shaft is disengaged;
- when driven by at least one driving wheel both clutches are engaged, wherein it may be beneficial to operate the electric unit in dependence on the charge state of electric energy accumulators, such as a high current battery, a power capacitor and/or similar, i.e. to connect it with the gear input shaft, which thus transmits a torque, which is transmitted from the wheels and/or from the drive unit to the shaft, to the electric unit.

For the method in accordance with the invention, the following torque flows can be beneficial:

- torque is transmitted from the drive shaft of the drive unit through the disengaged clutch in the power distribution flow between the first gear input shaft, which holds, i.e. is actively connected with, the electric unit, and the drive shaft to the first gear input shaft and from there to the rotor shaft of the electric unit;
- torque is transmitted from the drive shaft of the drive unit through the disengaged clutch in the power distribution flow between the second gear input shaft without electric unit through a pair of gears to the gear output shaft, from there through a pair of gears to the first gear input shaft and from there to the rotor shaft of the electric unit;
- torque is transmitted from at least one driving wheel to the gear output shaft and from there through a pair of gears via the first gear input shaft to the rotor shaft of the first electric unit. The first electric unit can be operated at a speed, preferably by selecting an appropriate gear wheel pair between the gear output shaft and the first gear input shaft, where it reaches its optimal operating point with regard to efficiency. It may be beneficial to uncouple the drive unit from the first gear input shaft during the recuperating process with a switch from "pull" to "push" by engaging the clutch between the first gear input shaft and the drive shaft in a delayed fashion, e.g. with a delay of >0.3 seconds after the switch from "pull" to "push."

The recuperating process can be performed particularly beneficially in connection with a gear box with an electric unit that can be connected between the gear input shafts because a switch of the electric unit to the appropriate gear input shaft and selection of the most favorable gear for the recuperating process allows efficiency to be improved further since all gears of the transmission can be used for adjusting the speed with the highest efficiency of the electric unit. Based on another inventive idea, recuperating energy can be stored through additional energy storage types, e.g. thermal energy, pressure and similar, particularly in the case of an already charged electric energy accumulator. For this, energy conversion units such as compressors, Peltier elements, Piezo elements and similar that are attached to the rotor shaft can be used. The secondary units, which were used, for example, as air conditioning compressors above, can also be provided for this.

Another beneficial variation of the invented method can include a feature that the first electric unit additionally or alternatively to the drive unit, which can be a second electric unit or an internal combustion engine, transmits torque to the first gear input shaft for driving the motor vehicle and from there through a gear pair between the first gear input shaft and gear output shaft to at least one driving wheel. The pair of gears can either be selected based on the driving situation or the gear pair of the currently engaged gear can be used.

The method in accordance with the invention furthermore provides a feature that the first gear input shaft with the first electric unit is decelerated during shifting processes for the synchronization of the gears and thus the moment of inertia of the rotor of the electric unit is reduced so that the synchronizing devices are not overloaded and possibly can even eliminated, wherein the deceleration of the first gear input shaft can occur by briefly closing the clutch between the drive unit and the first gear input shaft, while the flow of torque between the drive unit and the driving wheels takes place through the second gear input shaft. The extent of deceleration of the gear input shaft depends on the synchronizing speed of the first gear input shaft that must be set. Monitoring of the synchronizing speeds can occur through appropriate speed sensors that are attached to the gear input shaft such as a sensor that is already incorporated in the electric unit for controlling it and/or on the gear output shaft and/or on the driving wheels as wheel speed sensors, wherein when fastening them to the gear output shaft they are accordingly calculated while taking the gear ratios of the engaged gear between both shafts into consideration. Furthermore a feature may be included where with non time critical upshifting processes, i.e. during shifting processes that occur toward overdrive with regard to their gear ratio, electric synchronizing procedures take place exclusively, while in the case of down-shifting processes exclusively mechanical synchronizing procedures take place. This method includes among other things the advantage that the expenditure of electric energy is minimized during down-shifting processes and that electric energy can be gained when upshifting due to a delay of the gear input shaft. Acceleration of the gear input shaft to the synchronizing speed when down-shifting can occur, for example, by briefly closing the appropriate clutch. Of course, synchronization can occur both mechanically and electrically in the case of time critical shifting processes.

The shifting sequence from a gear with lower gear ratio to a gear with higher gear ratio for a transmission with an appropriate method takes place by engaging, for example, the gear with low gear ratio between the first gear input shaft and the gear output shaft, closing the clutch between the drive unit and first input shaft and thus transmitting torque from the drive unit through the clutch to the gear input shaft, from there through the gear pair to the gear output shaft and from there to the driving wheel. During this time, the next gear is engaged on the second gear input shaft with an engage clutch between the drive unit and second gear input shaft, wherein synchronization of the second gear input shaft can be supported by a slipping contact of the clutch between the drive unit and second gear input shaft or—if the second electric unit is arranged on this gear input shaft—by accelerating or decelerating the electric unit. Of course, upshifting into the next gear can occur in the same fashion, i.e. by first transmitting torque to the driving wheel through the second gear input shaft, while engaging the next gear on the first gear input shaft, and then closing the clutch to the first gear input shaft and engaging the clutch to the second gear input shaft. The shifting sequence from a gear with higher gear ratio to a new gear with lower gear ratio takes place in a similar fashion, i.e. by engaging and synchronizing the next lower gear on the gear input shaft that is not connected with the drive unit through the clutch, with then the clutch interrupting the flow of torque through the engaged gear and starting the new gear by closing the clutch to the gear input shaft with the new gear.

Another beneficial shifting variation can include the shifting from a gear with higher gear ratio to a gear with lower gear ratio on one and the same gear input shaft, i.e. a downshift on the same gear input shaft, which can be performed beneficially with the following procedural steps:

adjustment of the drive unit to increased power, preferably full load;

slipping operation of the clutch in power distribution flow between a gear input shaft on which the gears that are to be shifted are to be arranged and the drive shaft;

upon reaching the synchronizing speed for a gear that is between the gears on the one gear input shaft with regard to its gear ratio on the clutch between the drive shaft and the other gear input shaft, this clutch is operated in a slipping manner and torque with regard to its gear ratio between the gears on the gear on the one gear input shaft is directed to at least one driving wheel through the gear output shaft;

the clutch between the drive shaft and the one gear input shaft is disengaged;

upon reaching the synchronizing speed of the new gear that is to be engaged on the one gear input shaft the shifting process to this gear takes place.

It may prove beneficial when shifting from one gear to a new gear with lower gear ratio on the same gear input shaft that is to be engaged to additionally use the electric unit during the synchronizing process to the new gear that is to be engaged if the electric unit is actively connected with this gear input shaft. For the synchronization of at least one new gear that is to be engaged, which preferably is the gear with the smallest gear ratio on the gear input shaft with which the electric unit is connected from a drive point of view it may furthermore be beneficial to employ the electric unit for decelerating the gear input shaft that is connected with it while accelerating the motor vehicle through the gear input shaft without electric unit. The gear input shaft is preferably decelerated basically to the synchronizing speed of the new gear that is to be engaged.

Based on the inventive idea, another beneficial method that can be applied for arrangements of gear boxes allows an electric unit to be connected with a gear input shaft through a shifting clutch, which at the same time can connect the gear with the largest gear ratio with the gear output shaft. This shifting clutch undergoes the following shifting modes:

the idler of the gear pair of the gear is arranged on the gear input shaft in an articulating manner, the electric unit is uncoupled from the gear input shaft;

the electric unit is uncoupled from the gear input shaft;

the electric unit is coupled to the gear input shaft, the idler can be rotated in relation to the gear input shaft;

the idler is connected with the gear input shaft in a stationary manner, the electric unit is coupled with the gear input shaft;

the electric unit is connected with the idler, the idler can be rotated in relation to the gear input shaft.

Based on the idea of the invention, the method furthermore sees beneficial steps for the sole operation of the motor vehicle with the first electric unit or its operation that supports the internal combustion engine and/or a second electric unit in its place. The clutches between the drive shaft and the gear input shafts can be opened, and in accordance with the driving situation a selected gear pair that is connected between the gear input shaft and the gear output shaft can transmit torque from the electric unit to at least one driving wheel. Additionally the method can provide for support by the first electric unit to the drive unit for operating the motor vehicle so as to allow the first electric unit to directly interact with the gear input shaft in a power distribution flow from the drive shaft to the gear output shaft through the gear input shaft, which can be coupled with the first electric unit, to engage the clutch between the drive shaft and the gear input shaft with the electric unit with a power distribution flow through the gear input shaft without electric unit, and to transmit the torque fed by the electric unit to the gear output shaft through a gear pair that has been selected in dependence of the driving situation. Furthermore, in the case of a gear box arrangement with an electric unit that can be shifted between the gear input shafts, it may be particularly beneficial to connect the electric unit of the gear input shaft that does not transmit any torques from the crankshaft to the gear output shaft at that time and to operate it through one of the gears that are arranged on this gear input shaft at a gear ratio that is optimal for efficiency.

Based on another idea of the invention, a creeping movement of a vehicle with the invented double clutch gear, i.e. a slow forward motion of the motor vehicle from the stopped position such as during congested or stop-and-go traffic areas or similar traffic situation, may be beneficial. The starting situation can be a vehicle with a selected driving mode with engaged gear and put-on brakes, wherein the internal combustion engine is not in operation. In accordance with the idea of the invention, a differentiation can now be made as to whether the motor vehicle is supposed to be operated in the creeping mode or quickly accelerated. The starting process for the internal combustion engine can be initiated either in dependence on the releasing of the brakes and/or by indicating a driving request, e.g. by signaling a load requirement to the internal combustion engine such as the actuation of the accelerator pedal such as the gas pedal. Compared to the exclusive evaluation of the accelerator pedal such as the gas pedal this can save time, and the internal combustion engine can be started sooner. Additionally, a creeping movement of the vehicle can be excluded and it can be accelerated immediately when releasing the brakes quickly and actuating the gas pedal quickly, while during a slow release of the brake pedal a creeping process can be initiated. Depending on the behavior of the driver, a differentiation can be made among the following incidents with the respective subsequent procedural steps:

a) release the brake pedal, no actuation of the gas pedal after a stop phase:
   the available torque of the electric unit is transmitted through the clutch between the gear input shaft with the electric unit and the crankshaft;
   between the other gear input shaft and the gear output shaft, torque that is sufficient for a creeping movement of the vehicle is transmitted to the gear output shaft simultaneously through a gear with a low gear ratio, i.e. the gear with the lowest gear ratio, in the case of a slipping clutch between this gear input shaft and the crankshaft;
   after starting the internal combustion engine, the internal combustion engine provides the creeping moment and the electric unit is switched off.

The transmitted torque on the clutch between the gear input shaft without electric unit and the crankshaft may be reduced down to zero if necessary in order to achieve a faster start of the internal combustion engine.

b) the driver actuates the accelerator pedal;
   with released brakes and engaged clutch between the gear input shaft with the electric unit and with an engaged low gear between this gear input shaft and the gear output shaft, the creeping moment is generated through the electric unit and directed to the driving wheels;
   upon actuation of the gas pedal the engaged gear is deactivated;
   the clutch between the crankshaft and gear input shaft with electric unit is disengaged;
   a gear with low gear ratio between the gear input shaft without electric unit and gear output shaft is engaged;
   the internal combustion engine is started through the electric unit;
   the clutch between the crankshaft and gear input shaft with the electric unit is opened after the start, the other clutch is disengaged and the vehicle starts to move.

Of course, in accordance with the statements provided under a), here as well the clutch that needs to be disengaged after the start can be adjusted to a defined creeping moment.

Advantageously, the clutch between the gear input shaft with electric unit and the crankshaft is before the tactile point in order to shorten its engagement time.

Further beneficial embodiments, in particular for increasing shifting comfort and dynamics, e.g. for double and/or triple upshifting and/or down-shifting without a drop in tractive force, can include the integration of additional and/or the separation of existing gear input shafts or secondary shafts with additional gear pairs.

Another advantageous shifting sequence is provided by the idea of the invention in such a way that during a shifting process between a first gear, e.g. the gear II on a first gear input shaft, and a second gear with a higher gear ratio than the first gear, e.g. the gear III on a second gear input shaft, the clutch between the crankshaft and the first gear input shaft transmits torque to the electric unit that is actively connected with the clutch until the crankshaft has achieved roughly the speed that is required for a jerk-free operation of the second gear. This way, disadvantageous speed adjustments of the internal combustion engine can be foregone, for example, by reducing the load of the internal combustion engine by adjusting the firing angle—connected with a shortened life of the catalytic converter due to an increased concentration of unburnt hydrocarbon. The advantage of the electric unit over this method consists particularly of its clearly improved controllability and high dynamics so that the acceleration gradients to the drive shaft can be kept low and an increased feeling of comfort arises when shifting. Furthermore the energy supply to the clutches can be reduced, which leads to an increased life and lower fuel consumption.

Figure 2:
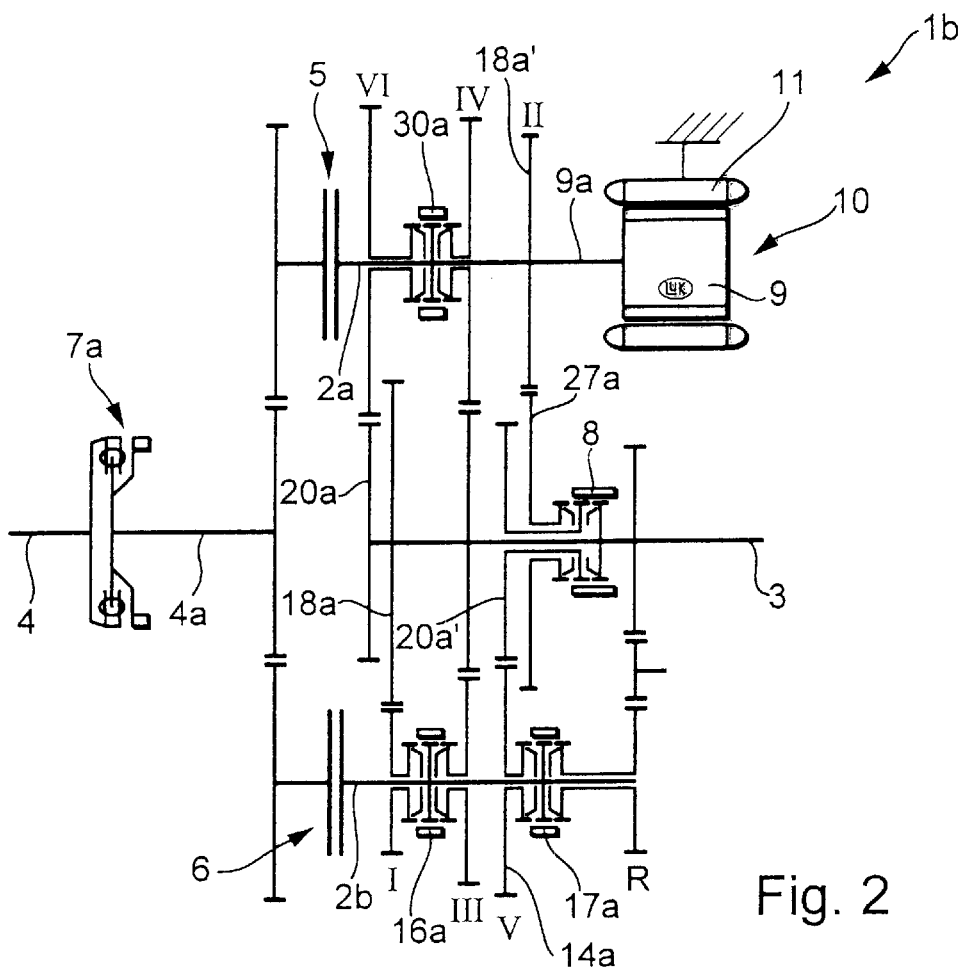
Figure 11:
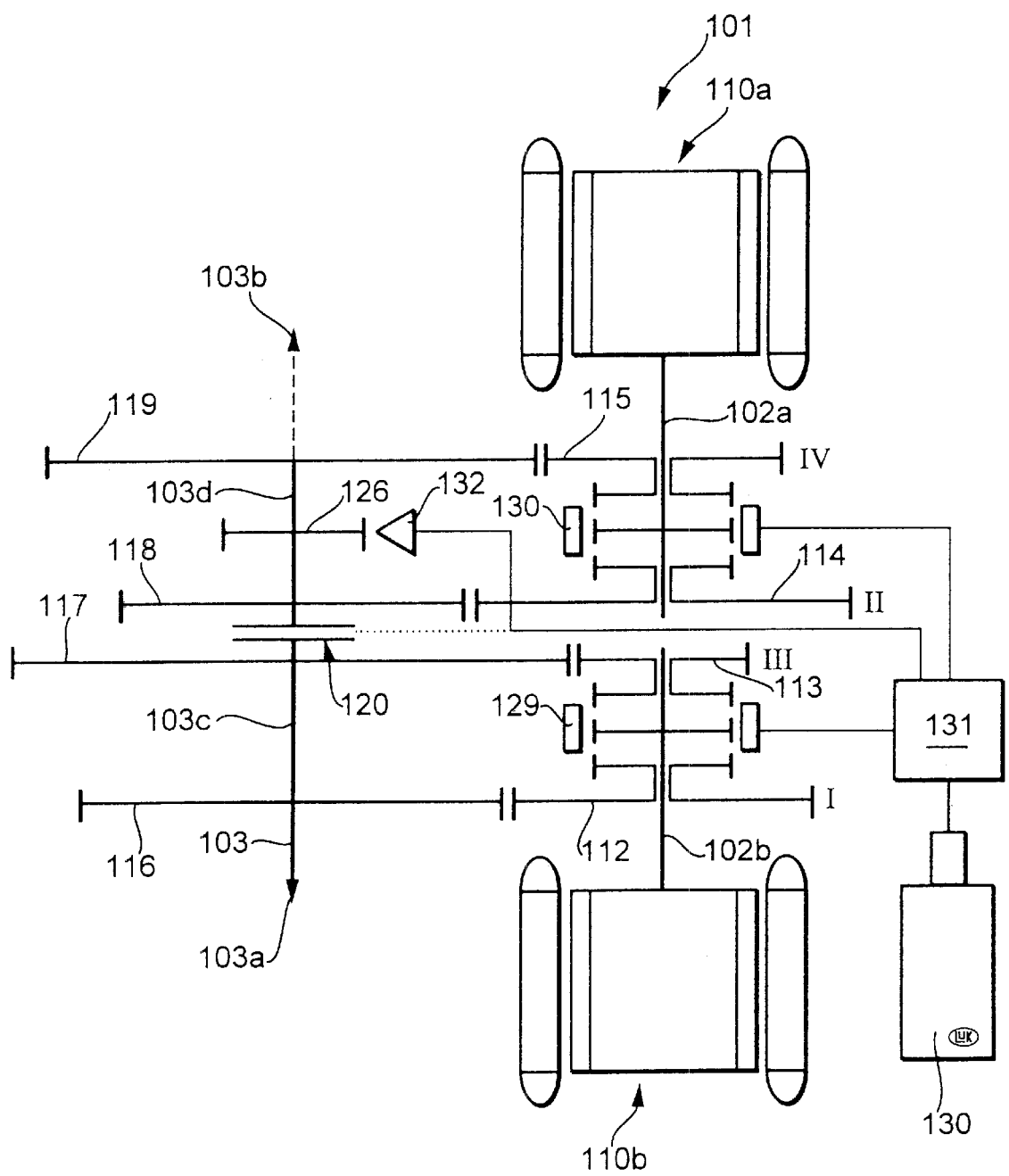
Figure 12:
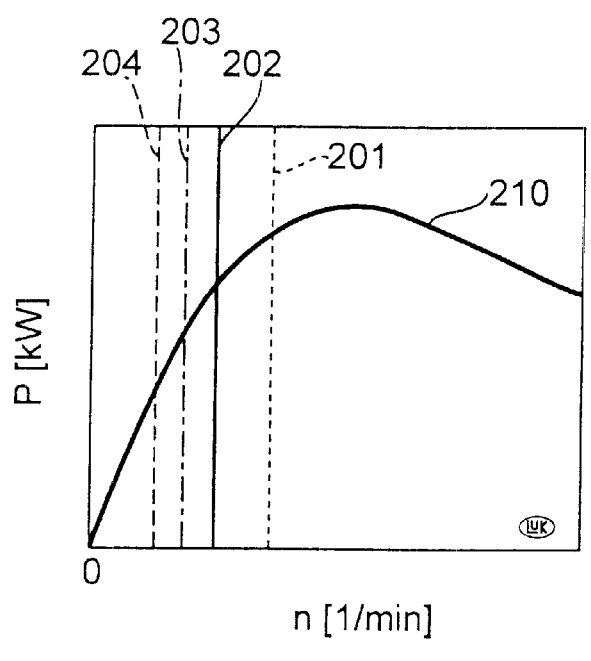
Figure 13:
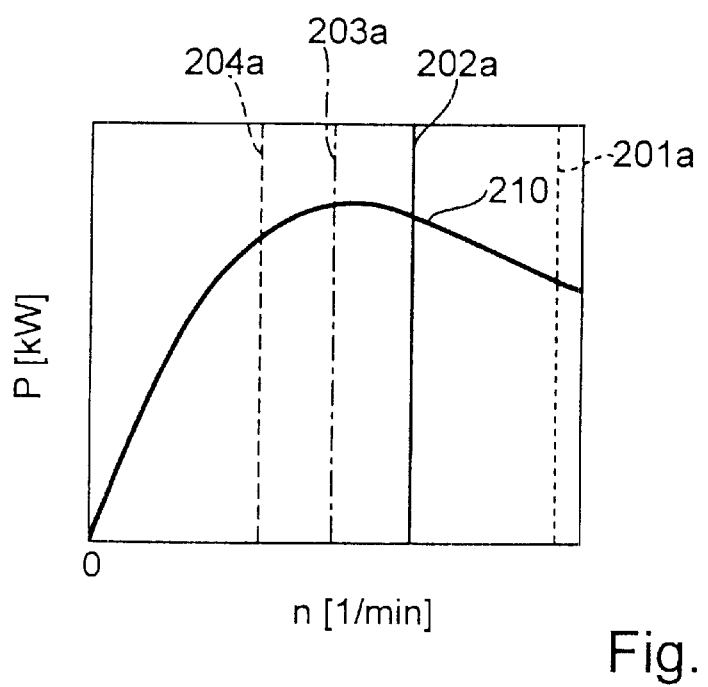
Figure 14:
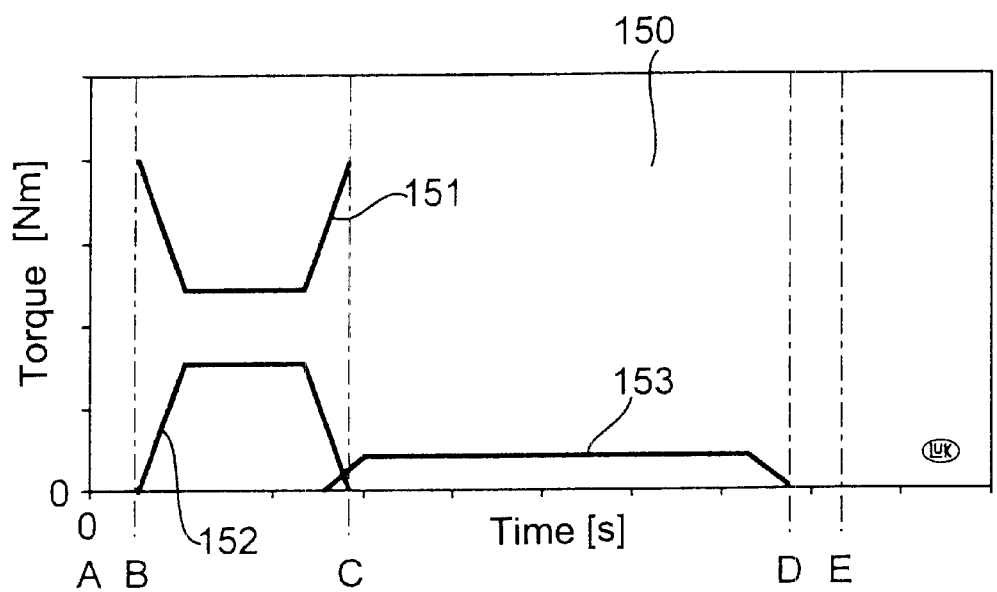
Figure 15:
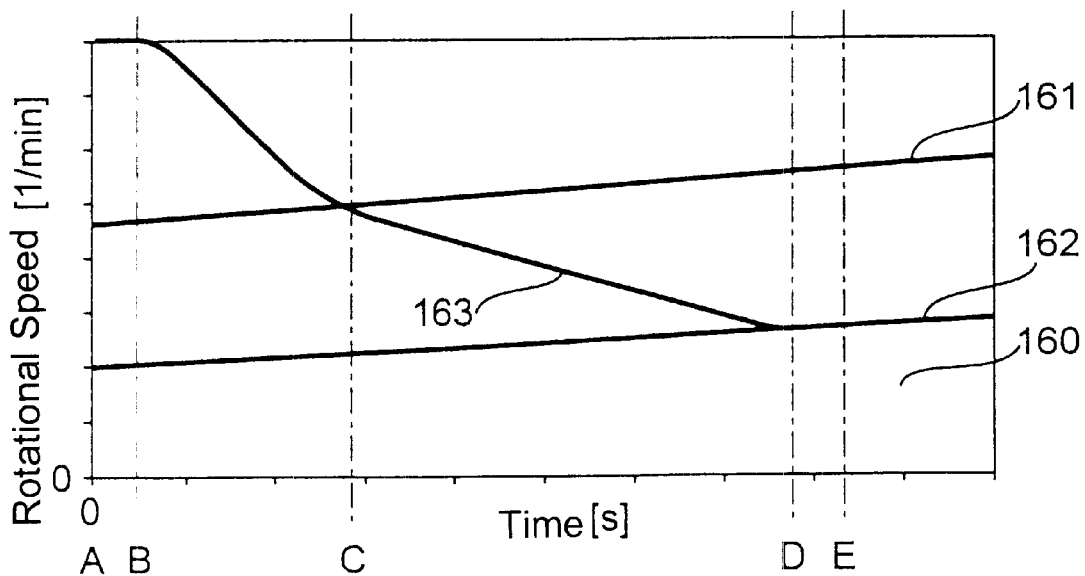
Figure 17:
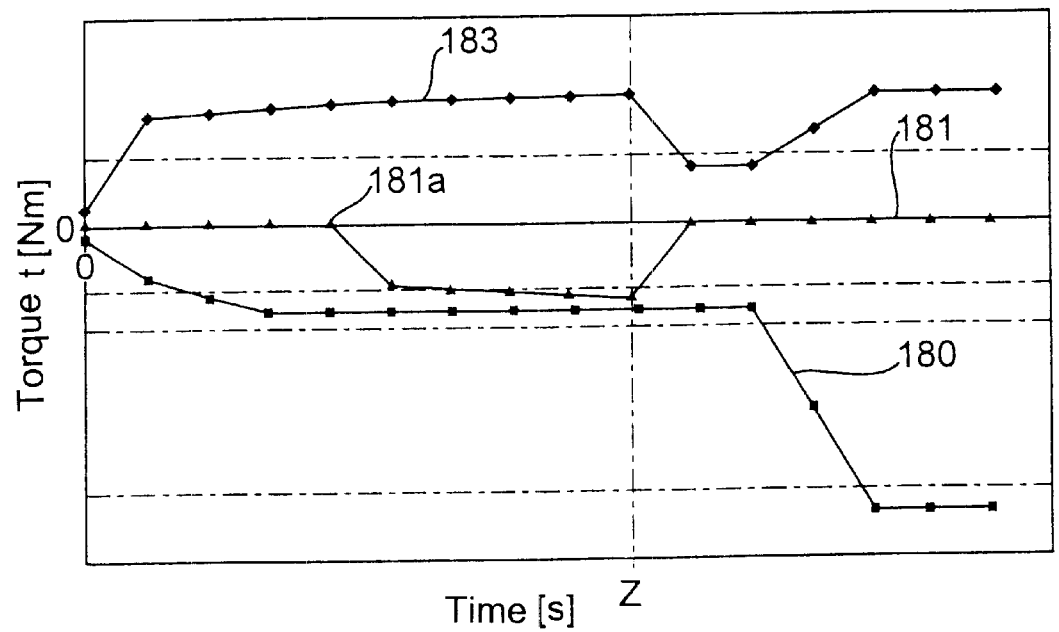
Figure 18:
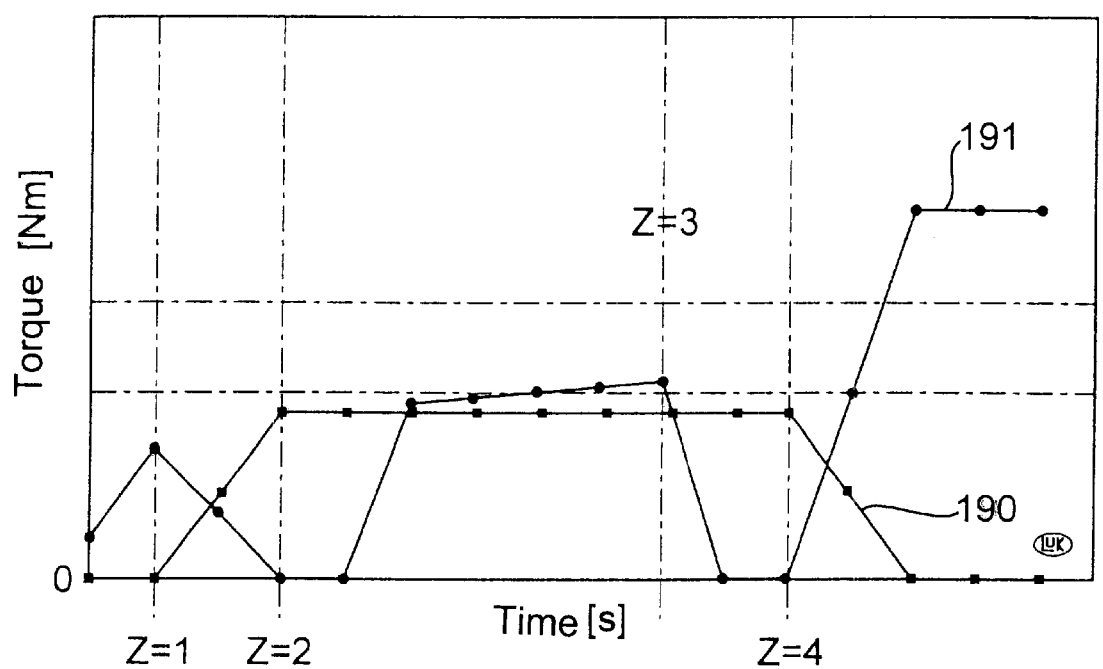
Figure 19:
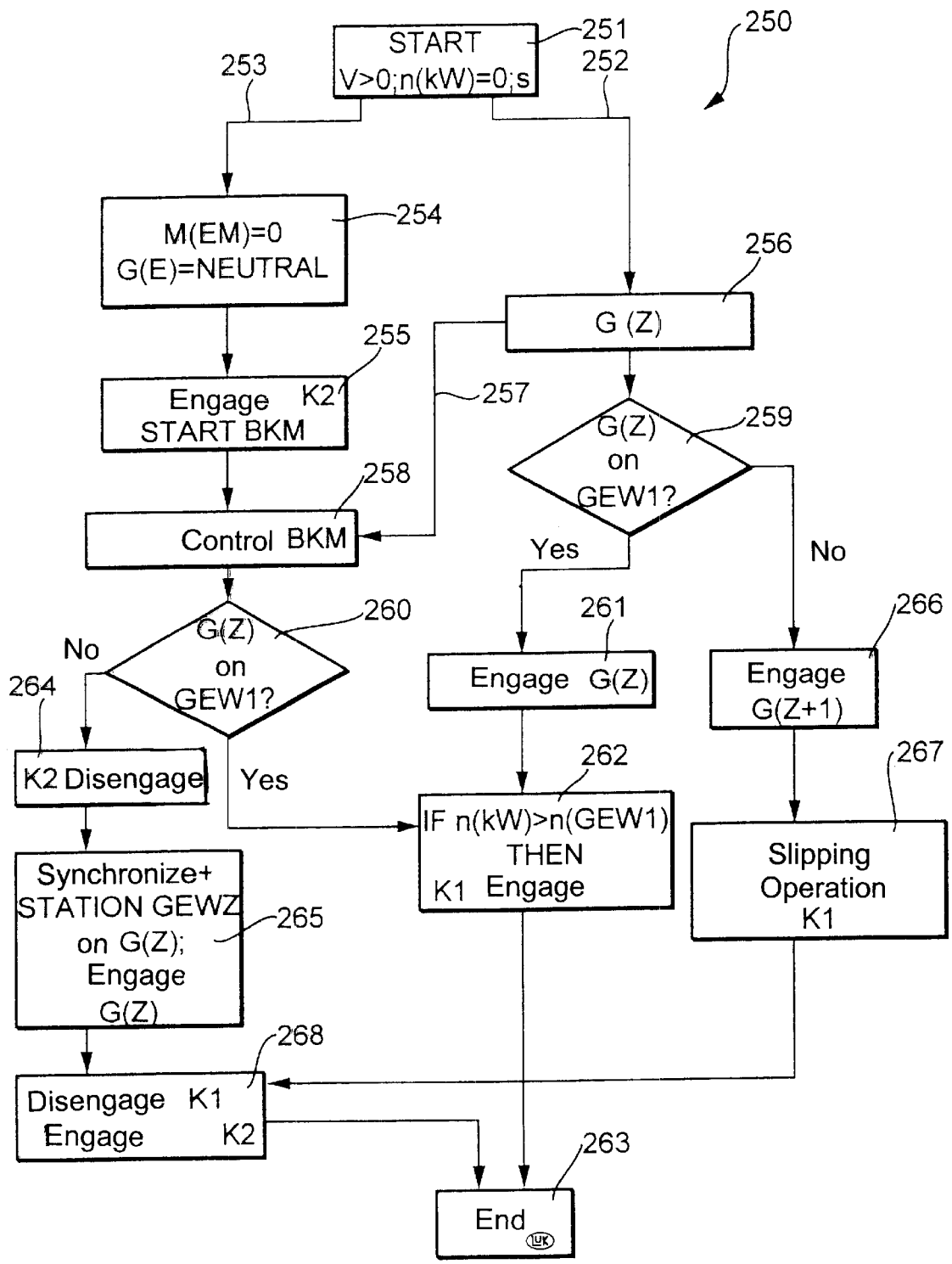
Figure 20:
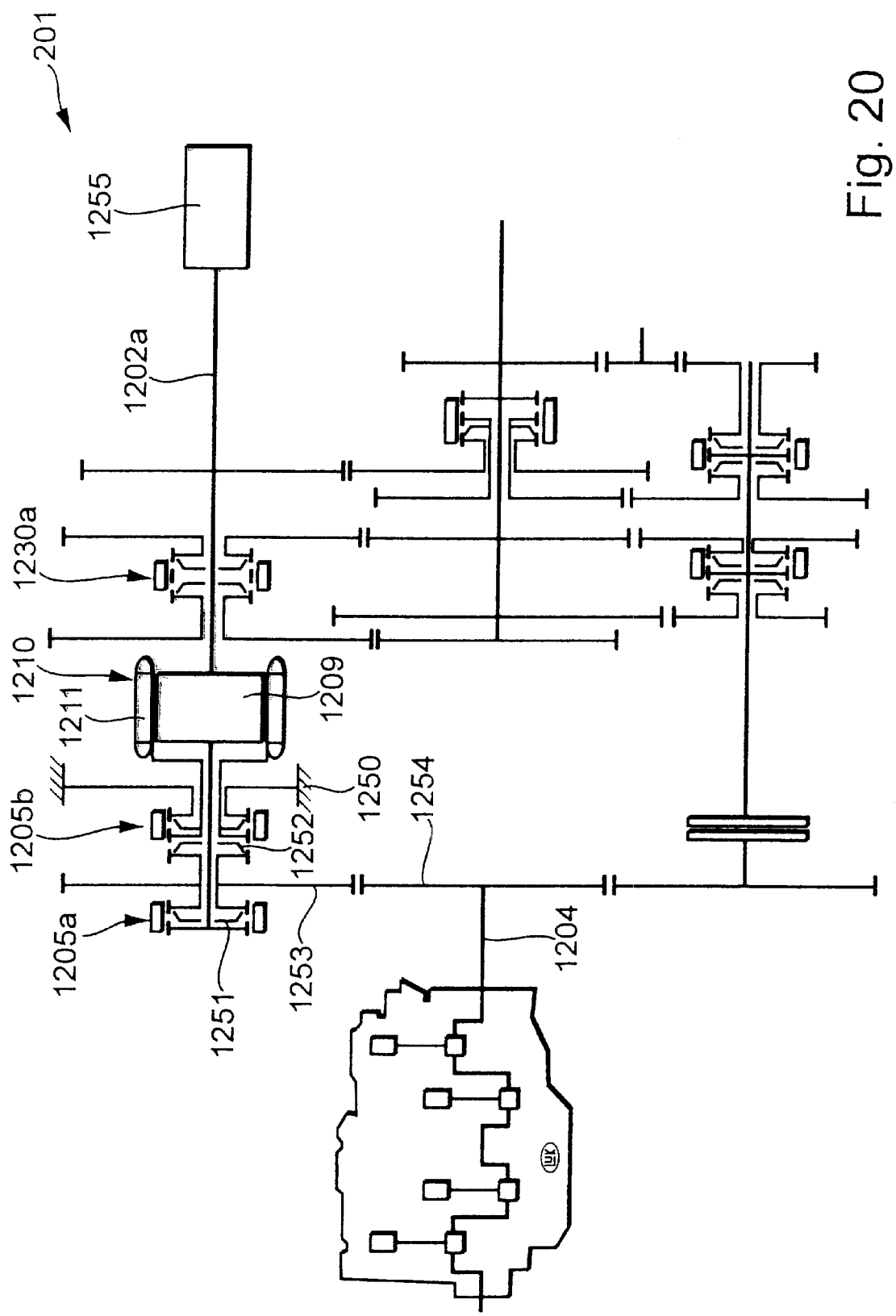
Figure 21:
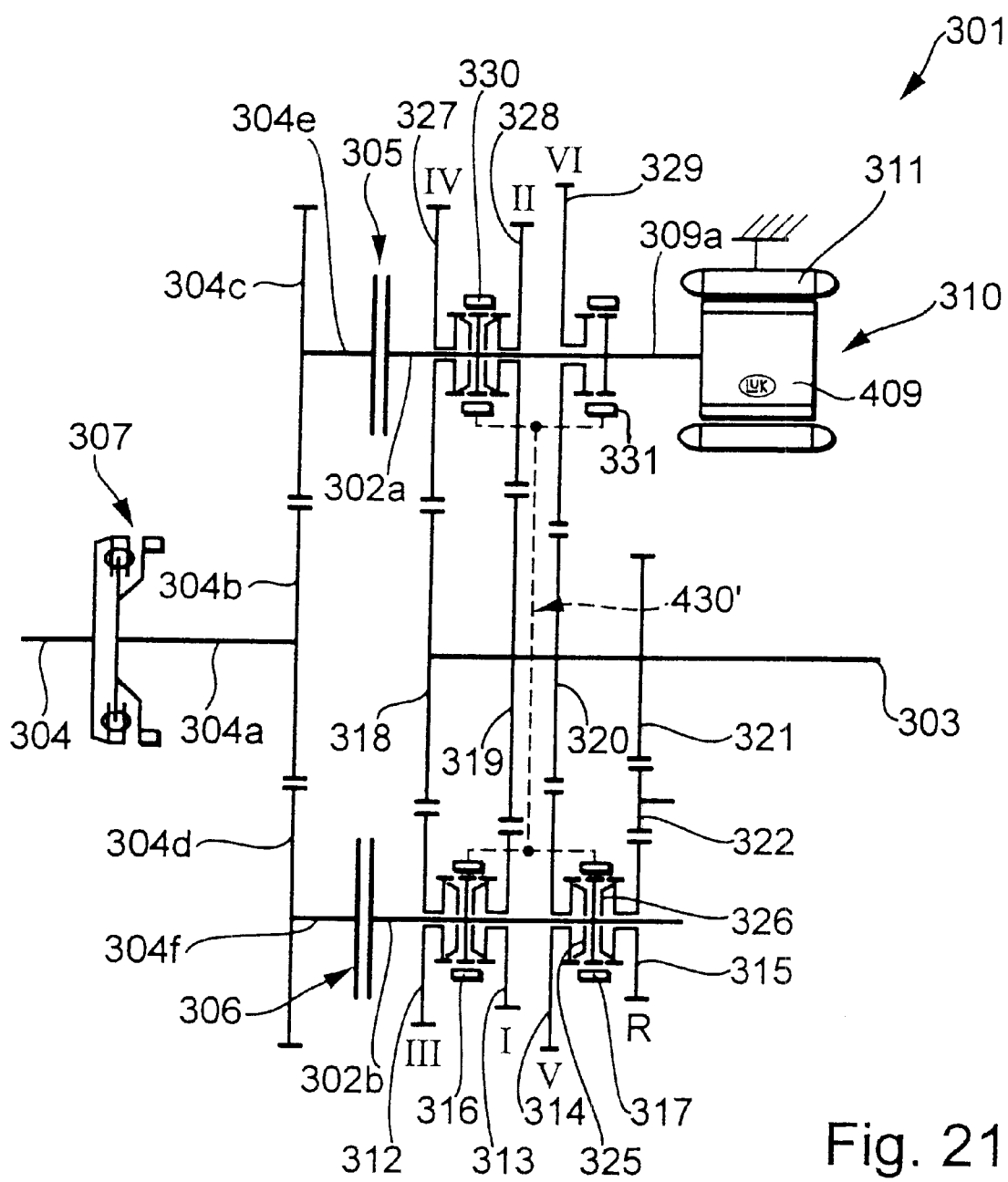
Figure 22:
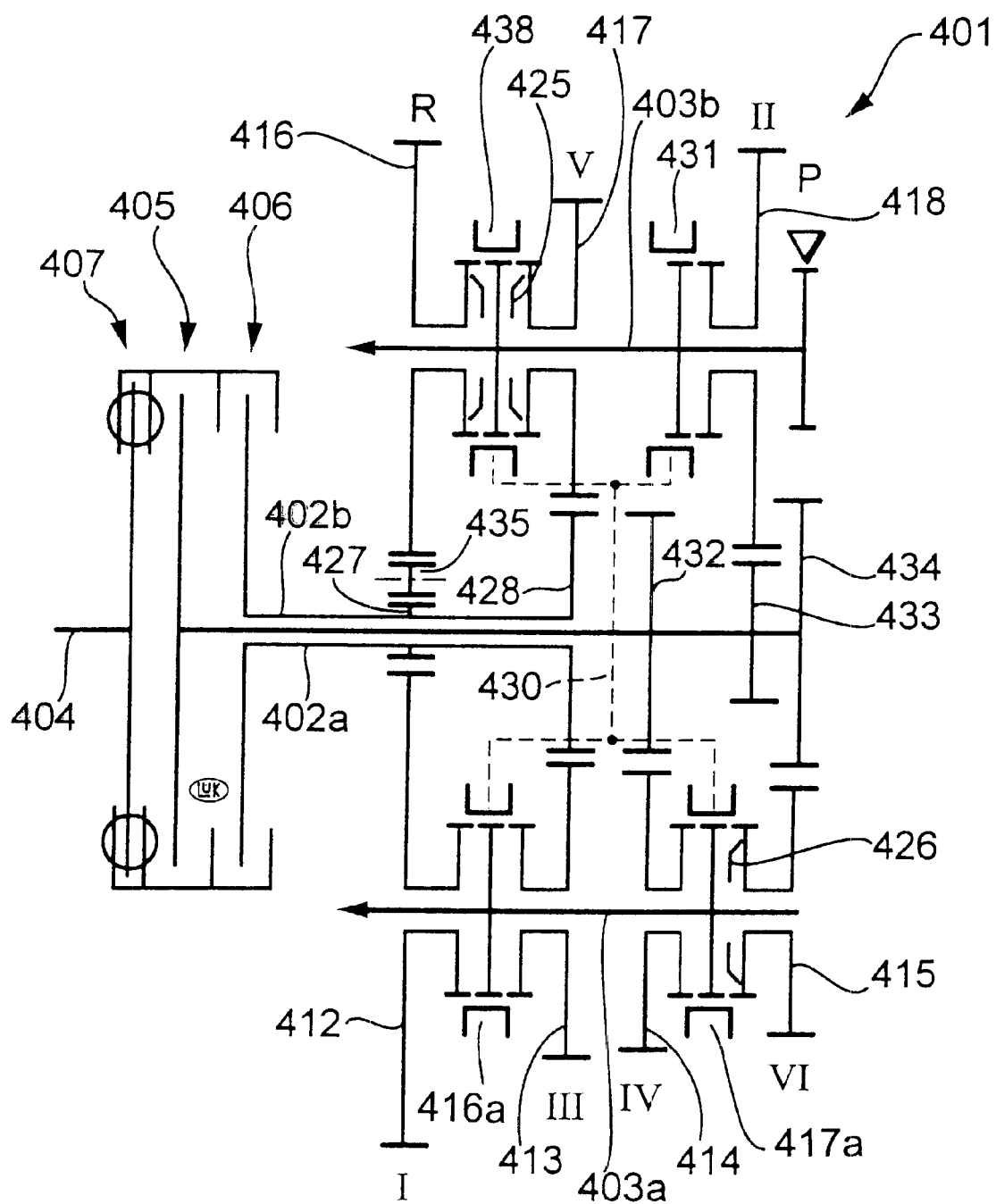
Figure 23:
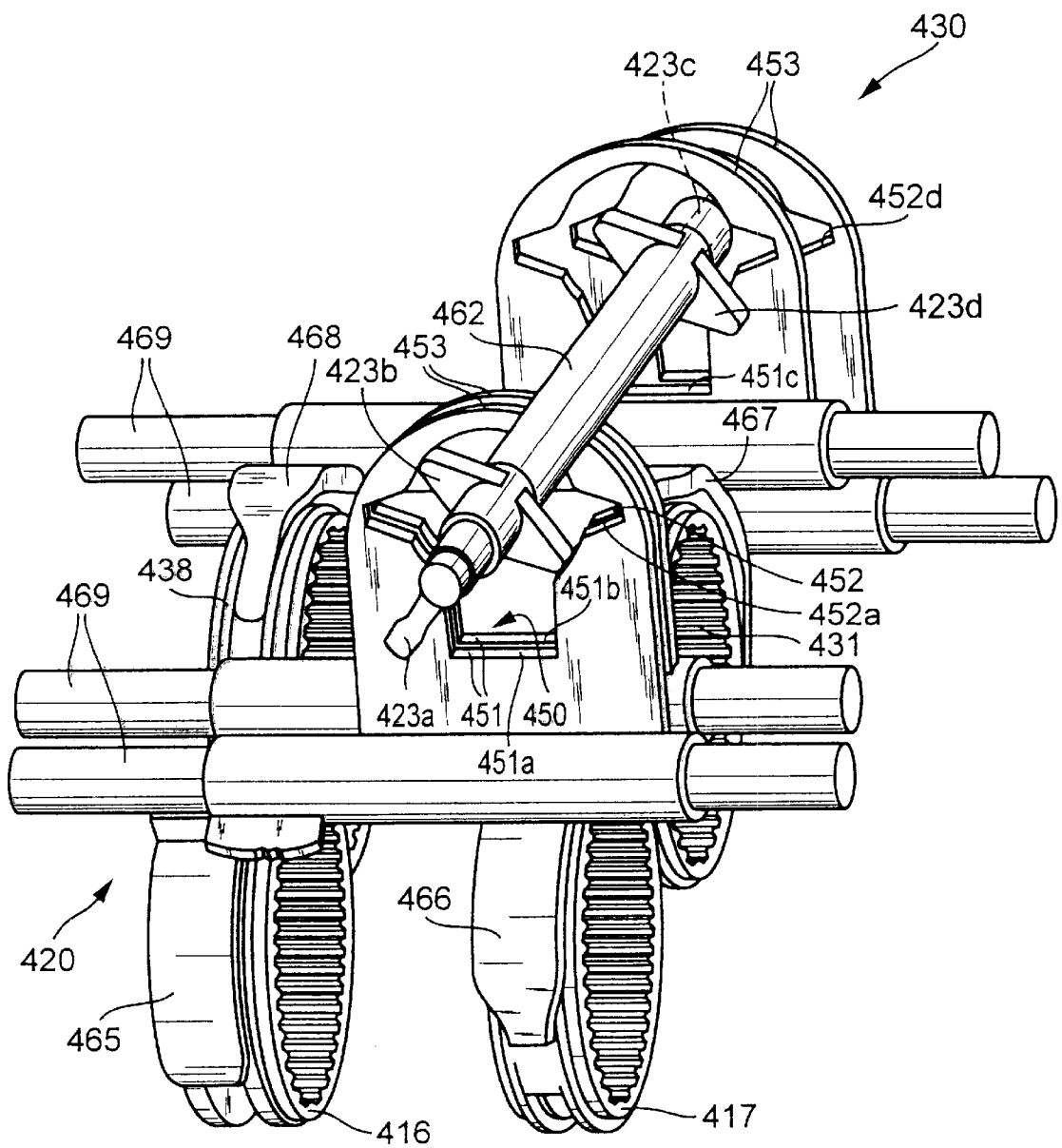
Figure 24A:
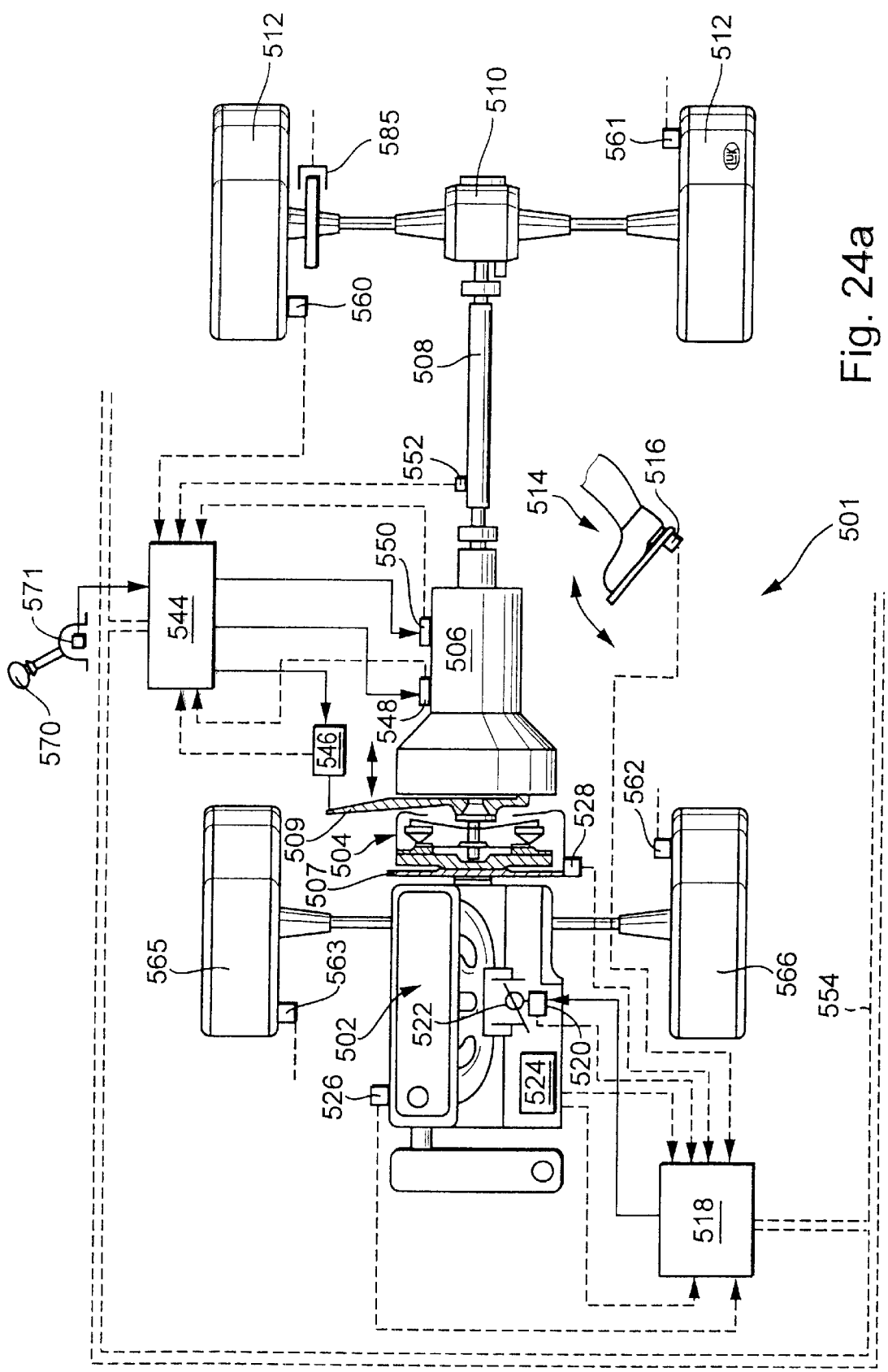
Figure 24B:
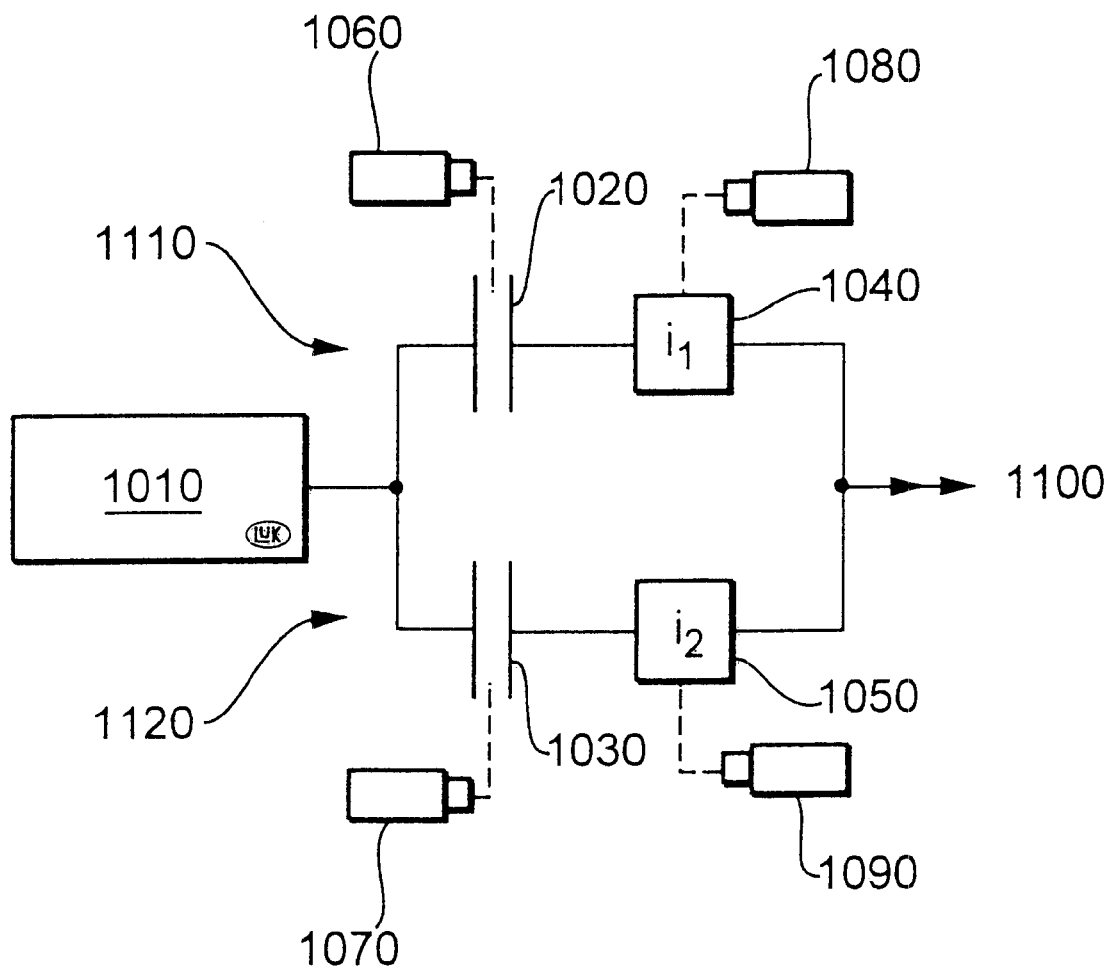
Figure 25:
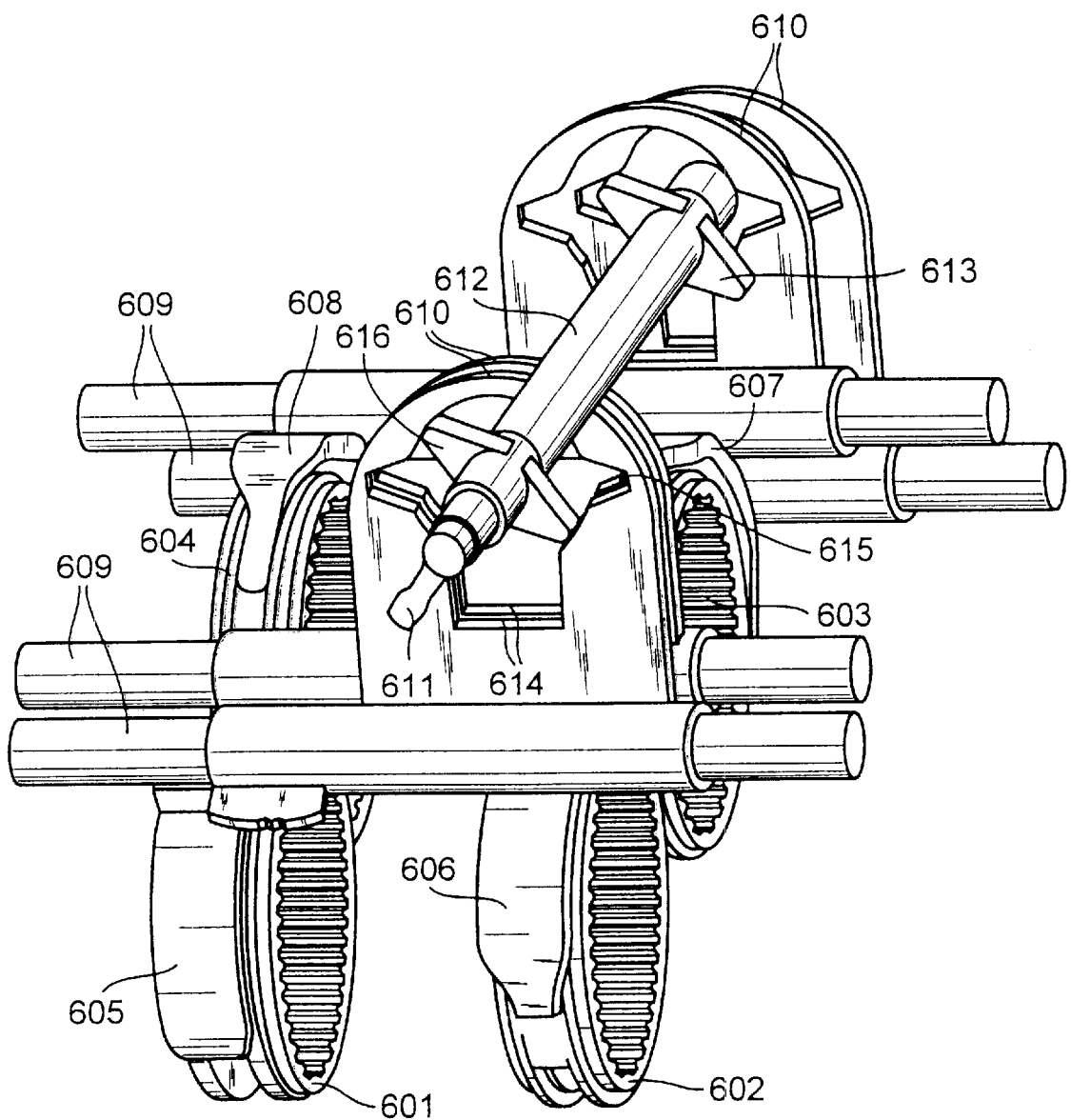
Figure 26A:
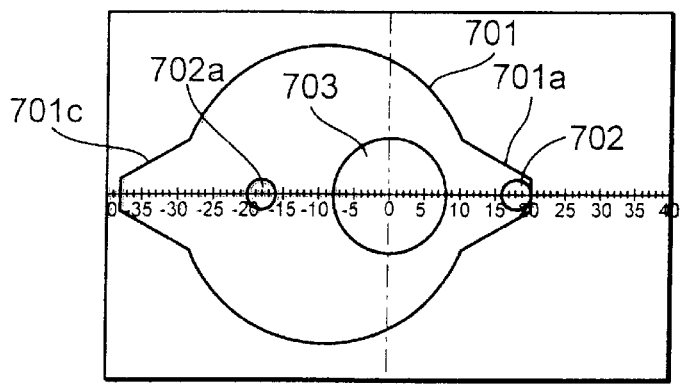
Figure 26B:
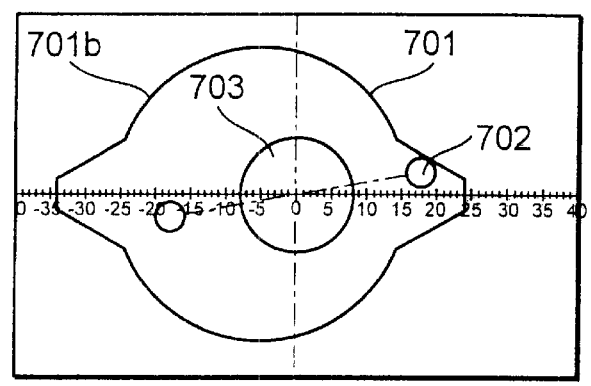
Figure 26C:
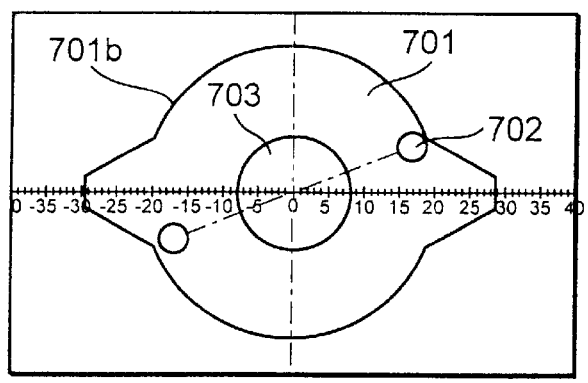
Figure 26D:
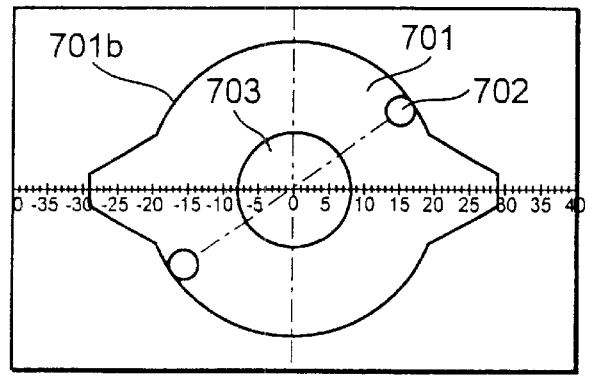
Figure 27:
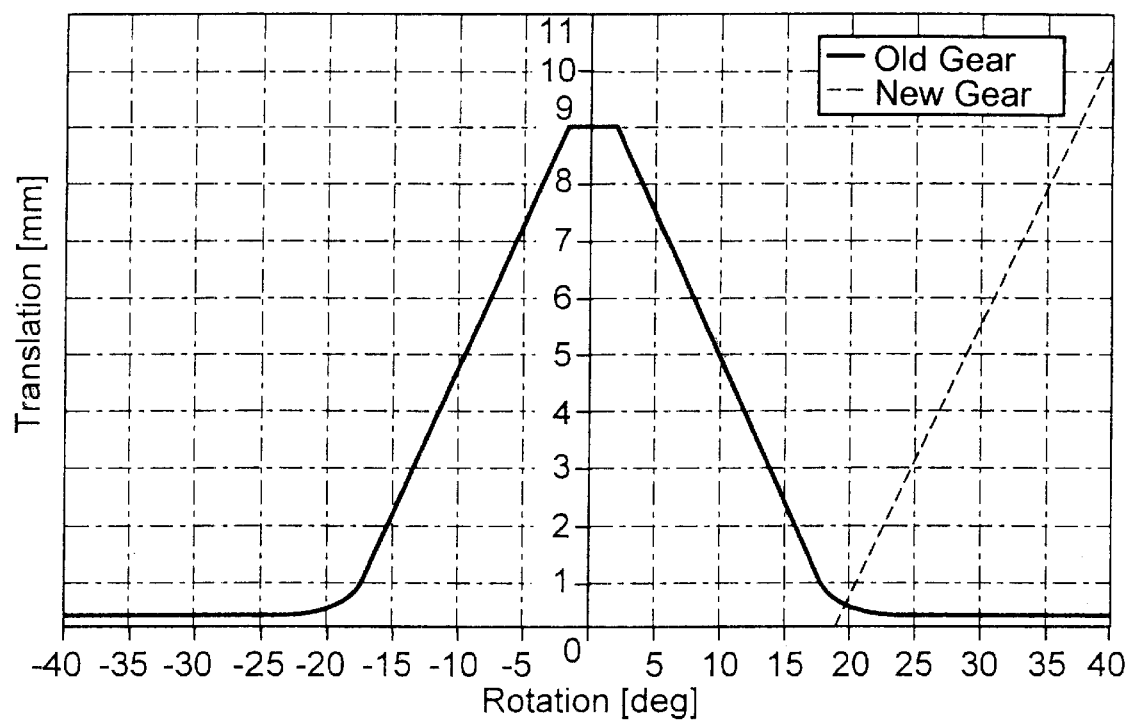
Figure 30A:
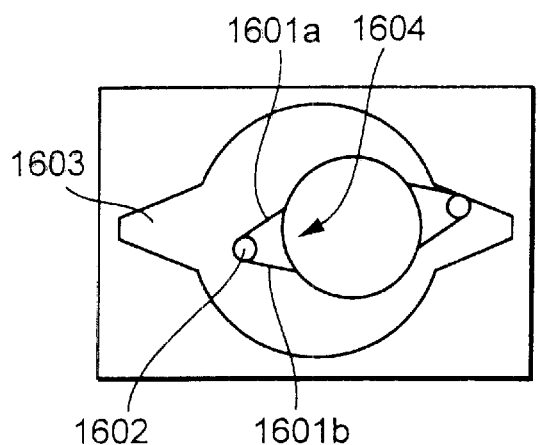
Figure 30D:
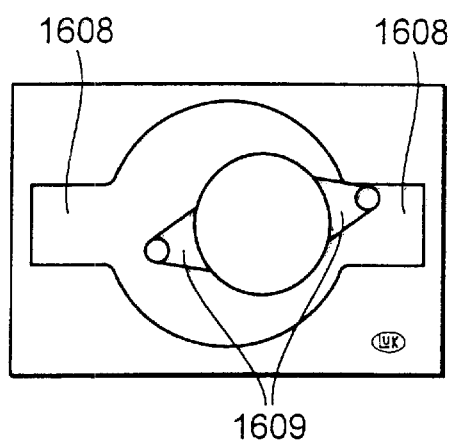
Figure 30B:
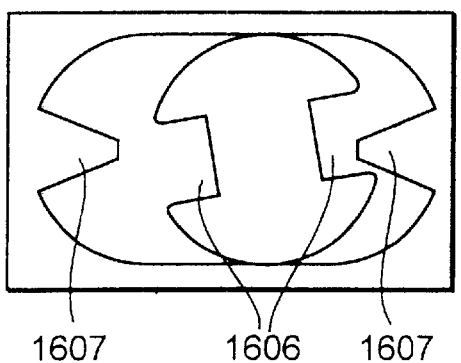
Figure 30E:
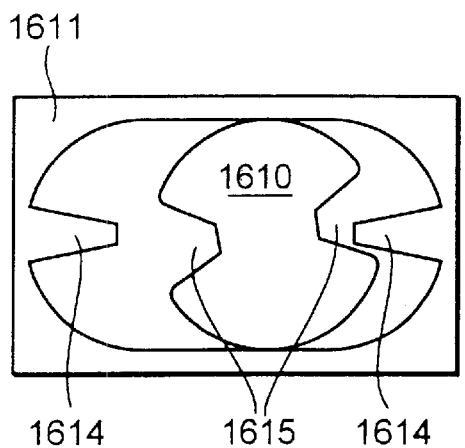
Figure 30C:
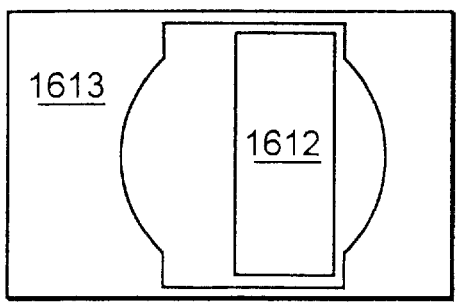
Figure 32B:
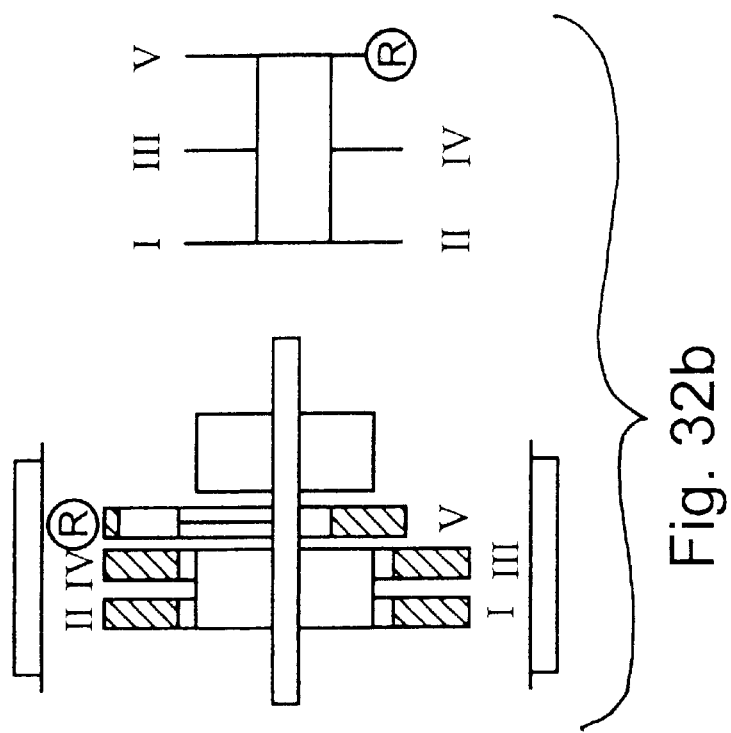
Figure 32A:
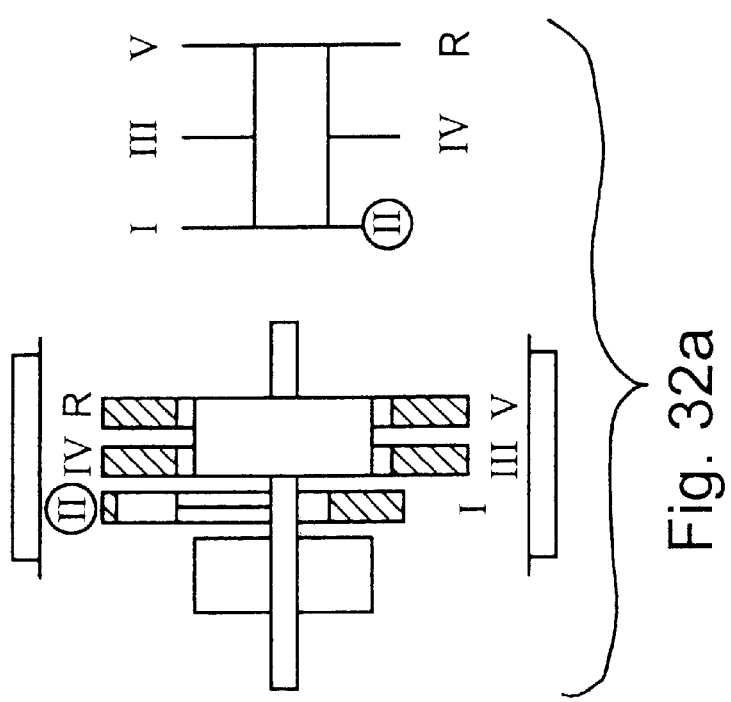
Figure 33A:
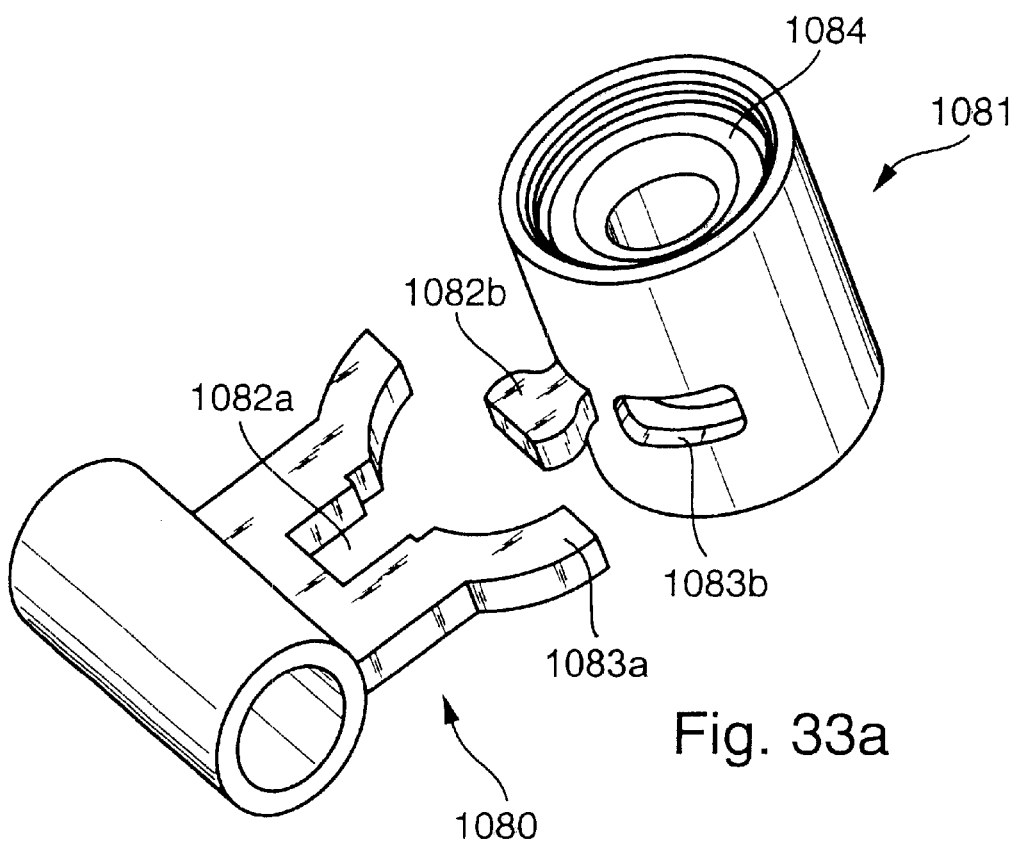
Figure 33B:
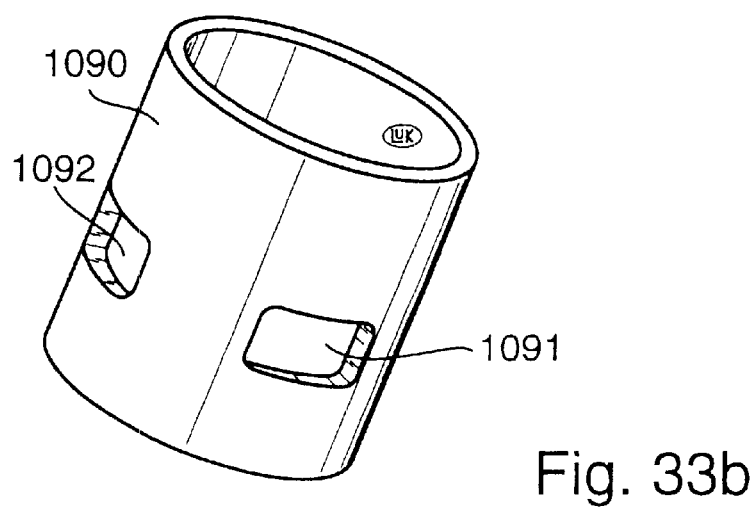
Figure 34A:
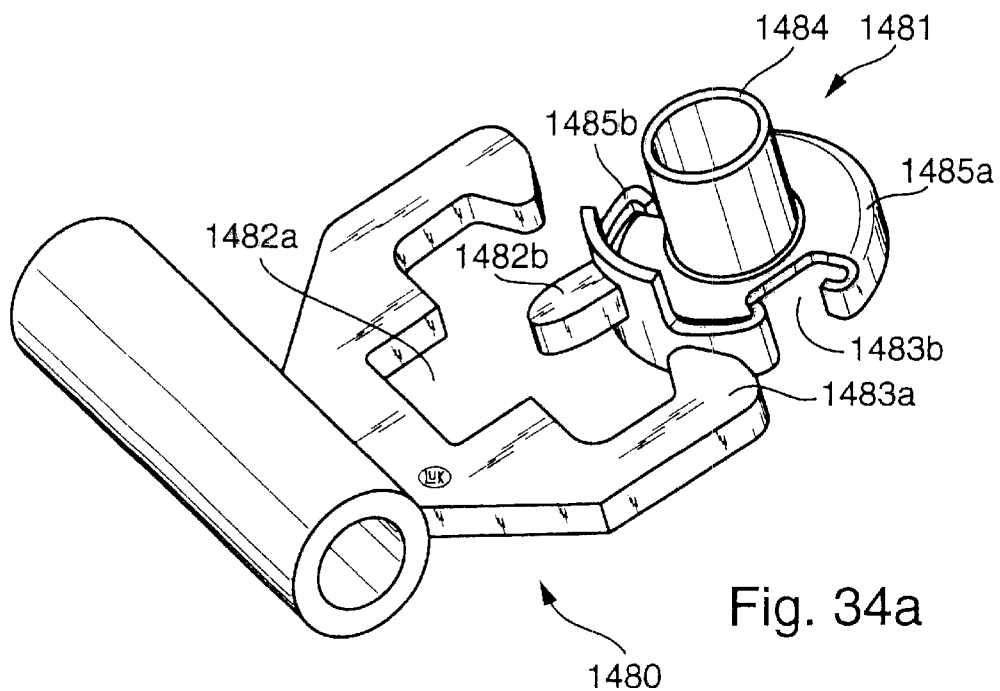
Figure 34B:
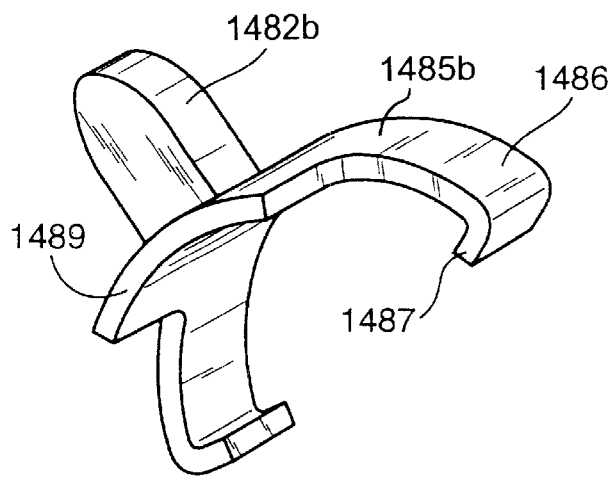
Figure 34C:
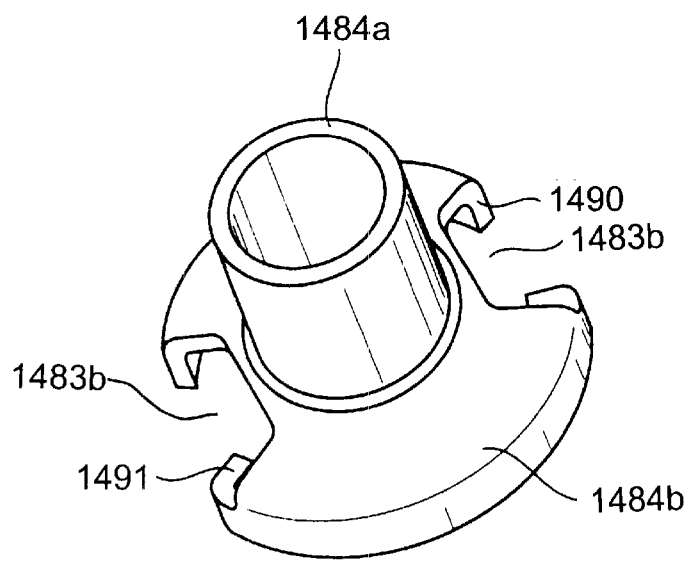
Figure 35A:
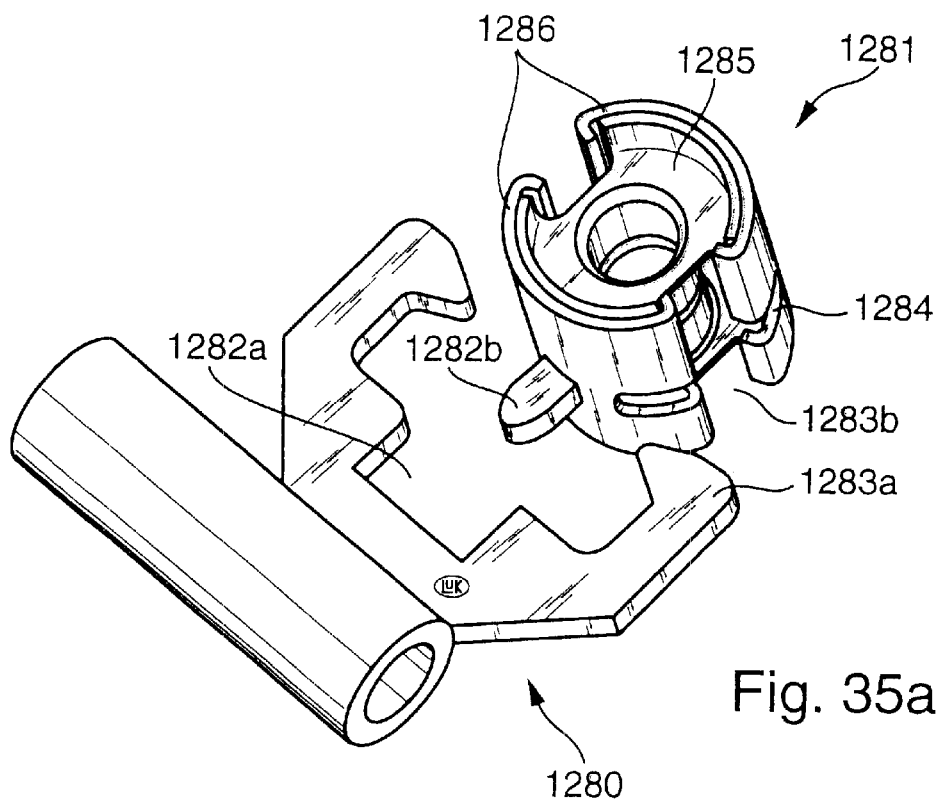
Figure 35B:
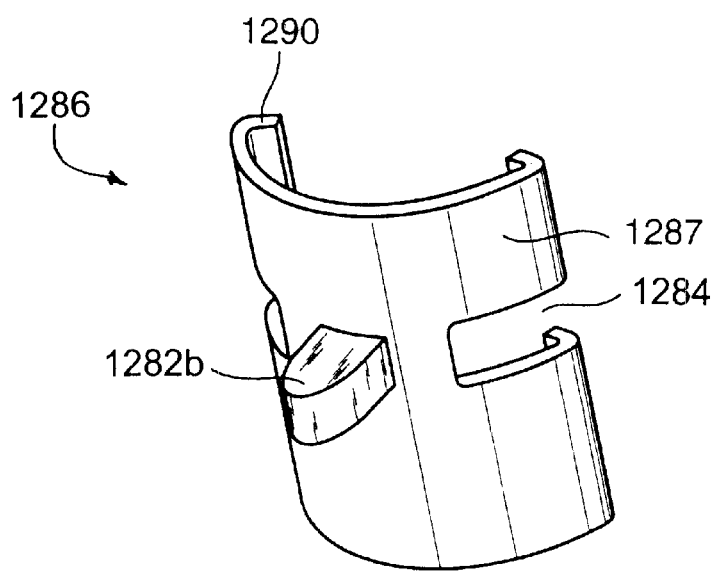

The invention is explained more in detail with FIGS. 1 through 35b. They show:

FIGS. 1 through 10 beneficial embodiments of a double clutch transmission with an internal combustion engine and an electric unit in diagrammatic view as well as details, FIG. 11 diagrammatic view of a double clutch transmission with two electric units, FIGS. 12 and 13 diagrams on the speed dependent power of electric units, FIGS. 14 through 18 torque curves of embodiments in accordance with the invention on the shifting time between two gears, FIG. 19 sequential program for completing a recuperation process, FIG. 20 another embodiment of a double clutch transmission, FIGS. 21 and 22 beneficial embodiments of a double clutch transmission based on the idea of the invention in diagrammatic view, FIG. 23 diagrammatic view of an embodiment of an end actuating mechanism for the double clutch transmission of FIG. 2, FIG. 24a vehicle with automatically actuated clutch and transmission, FIG. 24b vehicle with branched drive branch, FIG. 25 end output mechanisms with end actuating mechanism, FIG. 26a function of an secondary actuating element, FIG. 26b function of an secondary actuating element, FIG. 26c function of an secondary actuating element, FIG. 26d function of an secondary actuating element, FIG. 27 diagram regarding the control shaft rotating angle and the clutch sleeve movement, FIG. 28a arrangement of a main actuating element and an secondary actuating element on a control shaft, FIG. 28b arrangement of a main actuating element and an secondary actuating element on a control shaft, FIG. 29a arrangement of a main actuating element and two particularly wide secondary actuating elements for actuating two end output mechanisms simultaneously, FIG. 29b arrangement of a main actuating element and two particularly wide secondary actuating elements for actuating two end output mechanisms simultaneously, FIG. 30 embodiments of secondary actuating elements, FIG. 31 control shaft position and H-figure FIG. 32 control shaft position and H-figure with wide secondary actuating element, FIG. 33a embodiment example of the invention for application in a conventional manual transmission, FIG. 33b sleeve of the actuating element, FIG. 34a embodiment example of the invention for application in an automatic transmission, FIG. 34b a side element, FIG. 34c a bushing-shaped element, FIG. 35a embodiment example of the invention for application in a double clutch transmission and FIG. 35b a side element.

FIGS. 1 through 10 show in diagrammatic view several embodiments of double clutch transmissions 1a through 1m, which should not be considered restricted to this information. The double clutch transmissions 1a through 1m each contain two gear shafts 2a, 2b as well as at least one output shaft 3 and/or 3a, 3b in FIG. 2a, which is connected with at least one driving wheel, preferably two or four driving wheels, through a differential, a torque splitting mechanism such as a viscous-type clutch, torque splitting transmission and/or similar from a drive point of view and thus transmits the driving torque to at least one driving wheel for the purpose of moving the vehicle, wherein a thrust torque that is supplied by the wheels for recuperation purposes can be supplied into the transmission also in reverse torque direction. Between the crankshaft 4 that is driven by an internal combustion engine and the gear input shafts 2a, 2b a friction clutch 5, 6, respectively, is incorporated, which provides for the appropriate gear input shaft 2a, 2b to be uncoupled from the crankshaft 4. In the course of the torque between the crankshaft 4 and the clutches 5, 6, respectively, a dampening device can be provided for dampening torsional oscillation and/or axial or wobble oscillation, for example, a two-mass flywheel 7a that is arranged between two crankshaft branches or a torsional oscillation dampening device 7b in a clutch disk. Of course, the two-mass flywheel—as is basically known—can be integrated in at least one, preferably both clutches 5, 6, wherein in a preferred embodiment a two-mass flywheel with double clutch, as in FIGS. 5, 8, 9, 10 as two-mass flywheel with double clutch 7c, can be particularly beneficial. The clutches 5, 6 are preferably formed as friction clutches with a pressing plate and a pressure plate that is connected with the pressing plate in an axially displaceable, stationary manner, respectively. In special applications, wet clutches, e.g. in a fin type design or similar to the converter bridging clutches of torque converters, which can be integrated into the transmission, can be advantageous. Of course, all advantages with regard to the design of converter bridging clutches, such as e.g. profiled friction linings, piston controls for the piston selecting the converter bridging clutch, friction lining cooling and similar, can be beneficial here. When employing friction clutches friction linings are provided axially between the pressure plate and pressing plate, which are fastened with a clutch disk that is connected with the respective gear input shaft 2a, 2b in a positive rotational manner. The friction meshing between the pressure plate and pressing plate on one hand and the friction linings on the other hand is preferably accomplished through an axially displaceable energy accumulator that applies axial tension onto the pressing plate and pressure plate, e.g. a disk spring, which is actuated preferably axially through a disengaging device, wherein the prestress between the pressing plate, the friction linings and the pressure plate, and thus frictional engagement between the crankshaft 4 and gear input shaft 2a, 2b, is eliminated with a disengaged clutch. Of course, when employing a double clutch 7c, a pressing plate can be provided for both clutches 5, 6 and a disengaging device can actuate both clutches and slipping clutch modes between an engaged and disengaged clutch can be adjusted with reduced transmittable torque. With regard to a double clutch 7c that can be used, additionally a self-adjusting clutch can be provided, which is explained in detail and described in DE 100 17 815.4, which is hereby included in the present application with its entire content.

At least one disengaging device can be actuated automatically through an actuator. The actuator can become active electrically, hydraulically, pneumatically or in a combination of these methods, wherein, for example, an electric actuator can supply a master cylinder, which transmits the actuation impulse through a hydraulic branch to a slave cylinder, which displaces the disk spring axially by inserting a release bearing. Additionally, an electric actuator can be arranged directly around the gear input shaft 2a, 2b as a rotational drive for an axial drive, wherein one or two axial drives, which can be stacked within each other, can actuate the clutches 5, 6.

Between the gear input shafts 2a, 2b and the gear output shaft 3, the gear steps I, II, III, IV, V, VI, R are provided for forming a gear box 1a through 1k with six forward and one reverse gear in this case, wherein these are arranged on the gear input shafts 2a, 2b in an alternating fashion with regard to their gear ratios. The reverse gear R is arranged on the gear input shaft 2b in the depicted examples 1a through 1k. This results in a shifting process of the gears in such a way that, for example, a gear I can be engaged on the gear input shaft 2b, the clutch 6 can be disengaged and the next gear II can already be engaged with an engage clutch 5 while driving the vehicle via the gear input shaft 2b and the gear output shaft(s) 3, 3a, 3b with the gear I, and that only the clutch 5 is disengaged and the clutch 6 is engaged in the shifting torque without tractive force interruption. In order to increase driving comfort, for example, the clutches 5, 6 can be connected in an overlapping manner, i.e. that in a certain operating range both clutches 5, 6 transmit torque from the internal combustion engine to the gear output shaft 3 in a slipping operating mode. Further beneficial transmission designs of a double clutch gear box are described in DE 100 25 878.6, which is hereby included in this application in its entire content.

Based on the inventive idea, an electric unit 10 is connected with the gear input shaft 2a from a drive point of view or is arranged around it in an connectable manner. In the shown examples, the rotor 9 with the rotor shaft 9a is arranged radially within the stator 11, whose housing is firmly connected with the transmission case or with another stationary component.

The examples of the double clutch transmissions 1a through 1k of FIGS. 1 through 10 differ from each other basically in the different arrangements of the electric unit 10, the arrangement of the gears I–VI, R and in part different functions resulting from these arrangements. The different double clutch transmissions 1a through 1k are explained in more detail in the following.

FIG. 1 shows a double clutch transmission 1a with a two-mass flywheel 7a that is provided between the crankshaft branches 4, 4a. In the diagrammatic view, the crankshaft branch 4a—as shown here—splits through a connection forming a positive lock, such as a gear wheel connection, with a gear wheel 4b that is coaxial to the crankshaft branch 4a and two gear wheels 4c, 4d combing with it, which are each arranged coaxially on an input branch 4e, 4f for the clutches 5, 6 of the gear input shafts 2a, 2b, wherein between the gear wheels 4b, 4c or 4b, 4d the gear ratio i=1 or a gear ratio differing from i=1 can be adjusted and wherein also the gear ratios i between the gear wheels 4b, 4c and the gear wheels 4b, 4d can be different and thus have a different gear ratio (multiplication or reduction) between the gear input shafts 2a, 2b. Of course, the arrangement of the shafts 2a, 2b, 3 in one plane shown here does not necessarily prove beneficial for all transmissions of this type, but rather the shafts may require a small space in a spatial arrangement toward each other. Furthermore the gear input shafts 2a, 2b can be designed as shafts that are arranged around each other, wherein one gear input shaft 2a, 2b is designed as a hollow shaft in which the other one is guided. The two clutches 5, 6 separate the gear input shafts 2a, 2b from the crankshaft 4 and thus restrict the torque connection to and from the internal combustion engine in the disengaged state.

On the gear input shaft 2b the idlers 12, 13, 14, 15 are arranged in an articulating manner to the clutch 6 starting with the smallest gear ratio (gear I) in an ascending gear ratio manner for the purpose of forming the gears I, III, V, R, and the wheels are positioned through the shifting sleeves or sliding sleeves 16, 17, which engage two gears I, III or V, R, respectively, by connecting one of the idlers 12, 13 or 14, 15, respectively, in the conventional manner with the gear input shaft 2b in a stationary manner, or are in a neutral position in which no gear is engaged. The idlers 12, 13, 14, 15 comb with one of the fixed wheels 18, 19, 20, 21, respectively, which are arranged on the drive shaft 3, for the purpose of forming the gear ratios of the gears I, III, V, R, wherein for the purpose of forming the reverse gear R a reversing wheel 22 combs between the fixed wheel 21 and the idler 15 with both. The shifting sleeves 16, 17 are equipped with a synchronizing device 23, 24, 25, 26 such as a synchronous ring, which can have a conventional design, for the uneven gears I, III, V that are arranged on the gear input shaft 2b, with the reverse gear R, while the gear I has the smallest gear ratio and can be described as underdrive.

On the end opposite the clutch 5 the electric unit 10 is connected with the gear input shaft 2a through its rotor shaft 9a through a positive lock in the circumferential direction, e.g. it is flanged, has axial teeth or similar. The electric unit 10 can be arranged outside the transmission casing, wherein the rotor shaft 9a or the gear input shaft 2a, which is guided outward, is sealed against the casing. Alternatively, the electric unit 10 can be incorporated in the transmission housing, wherein it may prove beneficial to encapsulate it separately.

Additionally, the even gears II, IV, VI are arranged on the gear input shaft 2a, wherein the gear II is arranged between gear I and III with regard to its gear ratio, gear IV between gear III and gear V, and gear VI as overdrive with the largest gear ratio. For the formation of the gears II, IV, VI the idlers wheels 27, 28, 29 are arranged in an articulating manner on the gear input shaft 2a and can be connected with the gear input shaft 2a in a stationary manner through the shifting sleeves 30, 31, wherein the shifting sleeve 30 can either shift one of the two gears II or IV or can be in a neutral position in which neither of the two gears II, IV is engaged and the shifting sleeve 31 engages the gear VI with the highest gear ratio or is in a neutral position. The idlers 27, 28, 29 comb with the same fixed wheels 18, 19, 20 as the idlers 12, 13, 14 of the gear input shaft 2b. The gears II, IV, VI can be synchronized in the same manner as the gears I, III, IV of the gear input shaft 2b through synchronizing devices (not shown). Alternatively they can be eliminated, wherein a synchronization of the idlers 27, 28, 29, which are coupled to the speed of the gear output shaft 3 through the fixed wheels 18, 19, 20, occurs through the electric unit 10, which drives or decelerates the gear input shaft 2a accordingly to achieve the synchronizing speed.

The shifting sleeves 16, 17, 30, 31 are actuated through appropriate shifting forks (not shown), which slide them axially along the gear input shafts 2a, 2b.

Actuation of the shifting forks occurs automatically through one or several actuators (also not shown), for example, through electric engines and/or electric, hydraulic and/or pneumatic valves that select appropriate kinematics. It may prove beneficial to use an actuator not for every sliding sleeve, but one actuator for the selection motion for the purpose of selecting a shifting fork for a sliding sleeve 30, 31 or 16, 17, respectively, and another actuator for the shifting motion of the selected shifting fork and thus the shifting sleeve so that for four actuators, two selection actuator and two shifting actuators, respectively, are used for the entire shifting process of the gear box 1a. Furthermore it may also prove beneficial to combine the two selection actuators and the two shifting actuators into an actuator, respectively, wherein the inventive idea provides for a gear to become engaged on the one gear input shaft 2a, 2b without disengaging an engaged gear on the other gear input shaft 2b, 2a, which is also activated in the same shifting and selection arrangement. Such an arrangement of actuators with appropriate kinematics is explained and described in more detail in DE 100 20 821.5, which is hereby included into the present application in its entire content. Another beneficial embodiment can be an axial drive with an electric rotational drive, which is arranged around shifting sleeves 16, 17, 30, 31 and thus does not require any additional devices for the transmission of motion such as rods and similar devices. Such an axial drive is described under FIG. 23 of the German application with reference number DE 100 15 205.8, which is hereby included into the present application in its entire content.

The function of the double clutch transmission 1a is explained with examples based on typical operating modes such as cold starting and warm starting of the internal combustion engine, a typical upshifting process, a typical down-shifting process, up- and down-shifting process of gears arranged on a gear input shaft 2a, 2b, support function of the drive through the electric unit 10, sole driving with the electric unit 10, generator function of the electric unit 10, recuperation.

A cold starting process, for example, with outside temperatures of below 0° C., can be performed with a pulsed start in this embodiment. For this, when a forward driving motion is desired, initially both clutches 5, 6 can be engaged and the sliding sleeves 17, 30, 31 in the neutral position. The shifting sleeve 16 connects the idler 12 of the gear I in a stationary manner with the gear input shaft 2b, the first gear, i.e. gear I, is engaged. The electric unit 10 is supplied with power and reaches the specified pulse speed, e.g. 2000 to 6500 r.p.m. The pulse speed can be adjusted in a variable or fixed manner in dependence on the engine characteristics such as compression, displacement, number of cylinders and/or similar, outside temperature, oil temperature, rest period of the vehicle, viscosity of the engine and/or gear oil and/or similar. The clutch 5 is disengaged and the internal combustion engine is started. Immediately after the start, the clutch 6 is disengaged and the vehicle starts to move. The electric unit 10 then operates as a generator, the electric energy that is generated is passed on to an electric energy storage device such as an accumulator, a high current battery, a power capacitor and/or similar. Beneficial versions can include combinations of this with appropriate power electronics that is designed to store electric energy over an extended period of time in a particularly effective manner and to absorb high energy density with high efficiency quickly in a short-term storage device and release it just as quickly again. For this, particularly energy accumulator methods that use physical energy effects such as charge distribution, the build-up of electromagnetic fields and similar are suited, while for the long-term storage of electric energy especially electro-chemical material conversion such as accumulators, batteries or similar can be used advantageously, wherein an energy exchange can be controlled or excluded through appropriate, e.g. diode-like, circuits, for different charge modes and tension.

In a warm starting process in a warmed-up state or at outside temperatures e.g. of above 0° C. acceleration of the electric unit 10 to the pulse speed can be eliminated and it can be started directly with disengaged clutch 5. This way, a considerably quicker start of the internal combustion engine can be accomplished. Of course, with a more powerful design of the electric unit 10, e.g. depending on the size of the internal combustion engine at a torque of 100 Nm to 250 Nm, a pulse start can be foregone as well, wherein a selection of the torque in dependence on the vehicle and weight between 80 and 200 Nm has proven particularly beneficial for the efficient use of the electric unit 10 as a starter generator with the utilization of recuperation as well as the supportive and short-term sole operation of the vehicle.

As soon as the vehicle has started to move e.g. in gear I, the clutch 5 is engaged and the gear II is engaged through the shifting sleeve 30. In order to activate the gear during an appropriate driving situation, for example, when reaching a certain speed of the internal combustion engine, the clutch 5 is disengaged and clutch 6 is engaged. Similarly, the subsequent gears III to VI are engaged by engaging the subsequent gear with an engaged clutch 5 or 6 already and then activating it through a torque change from one gear input shaft to the other by engaging the one clutch and closing the other clutch 5, 6. Down-shifting takes places in the reverse order. Selection of a subsequent gear can occur by evaluating the driving situation such as speed, acceleration, direction of acceleration, speed of the gear input shafts, gear output shaft, driving wheels, non-driven wheels, cross-acceleration, fuel consumption, gas pedal position, load of the vehicle, trailing load and/or similar parameters. For this it may prove beneficial to integrate a control device for the gear box 1a into an overall control device of the vehicle or to connect it with the vehicle and to evaluate the measurement parameters and characteristic lines of additional vehicle components such as sensor signals, characteristic lines of the internal combustion engine, secondary units, brake system, fuel supply system and/or similar.

In certain driving situations, it may prove beneficial to perform up- and down-shifting processes where one gear that is currently used and a desired gear that is supposed to be engaged are arranged on the same gear input shaft, e.g. gear input shaft 2a, such as when shifting from gear II to gear IV, from gear IV to gear VI. For this purpose, the shifting from gear II to gear IV on the gear input shaft 2a is explained in more detail. After acceleration of the vehicle in gear II the clutch 5 is engaged and in the meantime the clutch 6 with the engaged gear III is disengaged, which allows the speed of the internal combustion engine to be adjusted to the gear III and is lowered. The gear input shaft 2a, which in extreme cases can rotate at the nominal speed of the internal combustion engine, must be decelerated to the new synchronous speed for the gear IV. So as not to have to design possibly existing synchronous rings in an oversized manner or so as to avoid long synchronizing times in the planned synchronization by the electric unit due to the poor efficiency at which the electric unit 10 runs at these speeds, synchronization can take place by decelerating the gear input shaft 2a by briefly disengaging the clutch 5, wherein the breaking torque of the gear input shaft 2a is made available by the torque of the internal combustion engine. The course of the torque across time during this shifting process is shown in the diagram in FIG. 14 with the courses of the torques 150 of the gear output shaft 3, 151 of the internal combustion engine on the gear input shaft 2a, 152 on the clutch 5 and 153 of the electric unit 10. Between the times A and B, the shifting sleeve 30 of the gear 11 is released without load at a engaged clutch 5, in the area between the times B and C the torque 152 of the internal combustion engine is weakened to the extent that a breaking torque 152 is built up on the clutch 5 and the gear input shaft 2a is decelerated to a specified speed. For the purpose of further synchronization, a breaking torque 153 is built up in the area between the times D and 3 through the electric unit 10 until the synchronous speed has been reached so that during the time interval D-E the shifting sleeve 30 for the gear IV can be disengaged again without load. Afterward, the clutch 5 is disengaged again, and the electric unit 10 can possibly be operated as a generator again. The course of torque 150 of the gear output shaft 3 remains constant throughout the shifting process due to the constant supply of torques of the internal combustion engine through the disengaged clutch 6 and the engaged gear III so that the shifting process, which lasts preferably less than 1 second, or even preferably less than 0.7 second, occurs in a load-shifting manner. The corresponding speed-time behavior during this shifting process from gear II to gear IV is shown in the diagram in FIG. 15 with the speeds 160 of the gear output shaft 3, 161 of the internal combustion engine, 162 of the idler 28 for the gear IV and 163 of the electric unit 10 over time. During the time interval A-B the electric unit 10, and thus the gear input shaft 2a, rotate at the speed at which the shifting sleeve 30 was released and is decelerated due to the torque supplied by the internal combustion engine by disengaging the clutch 5 in the time interval C-D. The idler 28 is driven by the increasing speed 160 of the internal combustion engine, which drives the gear output shaft 3, also with increasing gear ratios in accordance with the gear ratio between the fixed wheel 19 and the idler 28 at reduced speed 162 so that the decreasing speed 163 of the electric unit 10, which generates a breaking torque for the gear input shaft 2a for this purpose, and the speed 162 of the idler 28 approach each other in the area of the time D of the synchronous speed and subsequently in the time interval D-E the shifting sleeve 30 can engage the gear IV.

Figure 16:
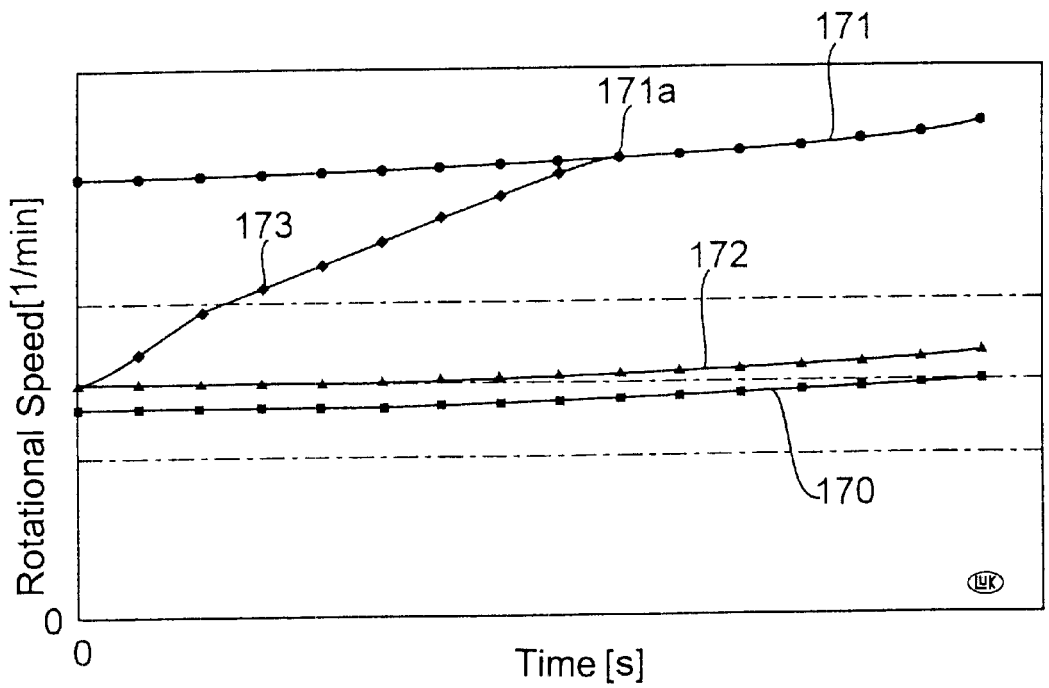

When down-shifting from an engaged gear to a gear on the same gear input shaft, e.g. the gear input shaft 2a, i.e. from gear VI to gear IV or from gear IV to gear II, for example, when the vehicle is driven at a low speed of the internal combustion engine and the driver desires quick acceleration e.g. through a kick-down actuation of the accelerator pedal, the driving torque is directed through the gear input shaft 2b for supplying tractive force. The procedure for this shifting mode will be explained in more detail with the example of a down-shift from gear IV to gear II. Based on the load requirement, the internal combustion engine is first accelerated to full load, and the clutch 5 is engaged only briefly for a load-free disengagement of the shifting sleeve 30 and then again disengaged partially, i.e. operated in a slipping mode so that only a portion of the torque that is made available by the internal combustion engine is directed into the clutch 5 and thus into the gear input shaft 2a. The clutch 5 can be operated in such a way that only a specified torque is transmitted to the gear input shaft 2a. At least one measured variable that can be used for controlling the clutch 5 can be the speed of the crankshaft 4, the gear input shafts 2a, 2b and/or the gear output shaft 3. Due to the limited supply of torque, the internal combustion engine increases its speed, which allows it to reach the synchronous speed for the gear III on the gear input shaft 2a. Initially the clutch 6 is disengaged partially, i.e. operated in a slipping mode, and the gear III is engaged through the shifting sleeve 16, while the clutch 5 is disengaged completely, wherein the internal combustion engine accelerates the gear input shaft 2a to the new synchronous speed of the gear II during optimal support of the electric unit 10. After this synchronous speed has been reached, the clutch 6 is disengaged completely, and the gear II is engaged through the shifting sleeve 30. FIG. 16 shows the courses of speed 170 of the gear output shaft 3, 171 of the idler 27 of the gear II, 172 of the idler 28 of the gear IV and 173 of the internal combustion engine during a shifting process from gear IV to gear II over time. At nearly constant speed 170 of the gear output shaft 3, the speed 173 of the internal combustion engine is adjusted to the speeds 171, 172 of the idlers 27, 28, which differ due to their gear ratios, wherein the internal combustion engine on one hand supplies torque to the gear output shaft 3 through the clutch 6 and the gear III and on the other hand accelerates the gear input shaft 2a through frictional engagement of the clutch 5 until at the point 171a the synchronous speed between the idler 27 and gear input shaft 2a has been reached. The appropriate course of torques in dependence on time during the shifting process is shown in FIG. 17. The course of torque 183 of the internal combustion engine shows an increasing supply of torque into the gear box 1a up to the time Z, at which the clutch 5 is engaged and the gear II is engaged at the synchronizing speed. Afterward, the clutch 5 is disengaged in an overlapping shifting process, and the clutch 6 is engaged. The course of the torque curve 181 shows the moment of inertia of the rotor 9 of the electric unit 10. At the point 181a, it is converted through the supply of torque by the internal combustion engine with a slipping clutch 5, while the gear input shaft 2a is accelerated with the rotor 9.

Acceleration of the gear input shaft 2a takes place much more quickly than when accelerated through the electric unit 10, which can additionally be supplied with power to accelerate the shaft. The course of torque 180 of the gear output shaft 3 is basically constant and experiences a torque conversion through the shifting process. FIG. 18 shows the course of torque 192 of the torques applied to the clutch 5 during the shifting process from gear IV to gear II as well as the appropriate course of torque 190 for the clutch 6. Before initiating the shifting process at the time 0, the vehicle is operated through the clutch 5 and engaged gear IV with low torque and the gear II is engaged through the shifting sleeve 16. At the time Z=1 the clutch 5 is engaged and clutch 6 is disengaged, then the gear IV is disengaged. After Z=2 the vehicle is operated through the clutch 6 and gear III, and the gear input shaft 2a including the rotor 9 is accelerated through the slipping clutch 5. Upon reaching the synchronizing speed at Z=3, the clutch is engaged and the gear II engaged. At the time Z=4, the clutch 6 is engaged, and the clutch 5 is disengaged.

Furthermore, it may prove beneficial when starting to move the vehicle in the gear I to not engage the gear II immediately, but instead keep the clutch 5 engaged and drive the electrical machine 10 through this clutch and the transmission input shaft 2a as a generator for the purpose of generating electrical energy until the driver actuates the gas pedal. Since the acceleration process in the gear I is very brief, the synchronizing and shifting process should therefore be completed in a relatively short period of time, e.g., in less than 1 s, preferably in less than 0.5 s. For this, before starting to move the vehicle the transmission input shaft 2a is accelerated with an engaged clutch 5 through the internal combustion engine that is accelerated to full load, and after starting to move the vehicle in gear I the clutch 5 is disengaged immediately and the rotating transmission input shaft 2a is delayed to the synchronizing rotational speed of the gear II by the electrical machine 10 in the generator mode, and/or a possible existing synchronizing device. Of course, the vehicle does not always have to start moving in gear I, particularly in the case of heavy vehicles it may be prove beneficial to start these moving with the gear II and to use the gear I only for very steep ascending slopes or as a creeping gear. In this and other cases of special versions of double clutch transmissions, it may be advantageous to provide the electrical machine on the transmission input shaft with the gear with the smallest gear ratio, for example, in this transmission 1b' the electrical machine 10 is provided on the transmission input shaft 2b.

When operating the vehicle under traction, the electric unit 10 can be operated as a generator for generating power, as already mentioned above. Furthermore, during thrust operation, the electric unit 10 can recuperate, i.e. gain energy during generator operation from the kinetic energy of the vehicle, which is directed into the gear box 1a through the gear output shaft 3. Both clutches 5, 6 can be engaged, wherein in dependence on the speed of the vehicle a suitable gear II, IV or VI can be engaged for optimal efficiency at nominal speed of the electric unit 10. Of course, it may prove beneficial not to uncouple the internal combustion engine in certain driving situations, particularly when the generation of electric energy is not required, for example, with a fully charge accumulator. Furthermore the internal combustion engine can be connected e.g. in a slipping mode additionally for controlling a defined recuperating torque, such in the case of a slippery road and/or to achieve a consistent delay in ascending or descending slopes. Furthermore, in a pulling mode of the internal combustion engine, the electric unit 10 can be operated as a generator with optimal speeds near the efficiency optimum with an engaged clutch 5 and a flow of torque via the gear input shaft 2b through one of the gears II, IV, VI. FIG. 12 shows the typical speeds 201 of the gear II, speed 202 with an engaged clutch 5 without engaged gear, speed 203 of the gear IV and the speed 204 of the gear VI at a speed of the internal combustion engine of about 1500 r.p.m. in gear III, wherein the gears II, IV, VI connect the electric unit 10 with the gear output shaft 3, respectively. The efficiency curve 210 of a typical electric unit 10 in dependence of the speed clarifies that in this example the gear II achieves best efficiency at the speed 201. FIG. 13 depicts the typical speeds 201a (gear II), 202a (all gears in neutral position, clutch 5 engaged), 203a (gear IV), 204a (gear VI) at a speed of the internal combustion engine of about 4000 r.p.m. with gear II as the driving gear, and it becomes clear that optimal efficiency of the efficiency curve 210 of the electric unit 10 is best approached with gear IV. Of course, at any gear I, III, V in dependence of the speed of the internal combustion engine, different gears II, IV, VI or a neutral position can achieve best efficiency of the electric unit 10 with an engaged clutch.

The example of a double clutch transmission 1b and an electrical machine 10 that is drivingly connected with the transmission input shaft 2a through the rotor shaft 9a, as shown in FIG. 2, is basically similar to the transmission 1a of FIG. 1 in its structure and function, but exhibits differences in the arrangement of the gears II, IV and VI on the transmission input shaft 2a, wherein they are arranged starting from the clutch 5 in the direction of the electrical machine 10 in a descending manner with regard to their gear ratios, i.e., gear IV is next to the clutch 5 and gear II is next to the electrical machine 10. Furthermore, separate fixed gears 18a, 20a are non-rotatably arranged on the transmission output shaft 3 for the gears I and VI, with these gears not being used by a gear on the other transmission input shaft 2a or 2b. The gears I and III, IV and VI, as well as V and R, are engaged through a shift sleeve 16a, 17a, 30a that is provided for two gears by non-rotatably connecting them with the respective transmission input shaft 2a, 2b. The arrangement of the fixed gear 18a' and the idler 27a for the purpose of forming the gear II takes place in the opposite manner, so that the fixed gear 18a is arranged on the transmission output shaft 2a and the idler 27a is arranged on the transmission output shaft 3 in an articulating manner and can be non-rotatably connected with this shaft through the sliding sleeve. Another special feature of the present transmission structure is the formation of the gear V through two idlers 14a, 20a', wherein—as already indicated—the idler 14a is arranged on the transmission input shaft 2b and can be non-rotatably connected with it through the sliding sleeve 17a, and the idler 20a' is arranged on the transmission output shaft 3 and can be non-rotatably connected with it through the sliding sleeve 8. The sliding sleeve 8 hereby performs another function; in another shifting mode it non-rotatably connects the idlers 20a', 27a of the axially neighboring gears II, V with each other, wherein their rotational ability on the transmission output shaft 3 remains. This way the transmission input shaft 2a is connected with the transmission input shaft 2b from a drive point of view by forming a gear ratio that results from the quotient of the gear ratios of the gears II, V. Of course, the connection of other gears may also prove beneficial for attaining different gear ratios. In this example, the series connection of the gears II and V is preferably used to start the cold internal combustion engine directly through the electrical machine 10, particularly during low outside temperatures, with the necessary gear ratio without employing an impulse start. To achieve this, the clutch 5 is disengaged, and the clutch 6 is engaged. Through the shift sleeve 8, a connection between the transmission input shaft 2a and the transmission input shaft 2b is created through the gears II and V and the electrical machine 10 is supplied with power. The gear ratio condition i resulting from this power path through the division of the gear ratios of the gears II and V generally amounts to between i=2.5 and iΔ4, so that the electrical machine 10 can start the internal combustion engine with a smaller maximum torque than would be the case directly through the clutch 5. The remaining operating modes and functions are basically identical to the transmission 1a of FIG. 1.

In order to reduce fuel consumption, the internal combustion engine is preferably uncoupled during pushing phases, e.g. by engaging at least the clutch 5 and shifting the shifting clutches and/or sliding sleeves 16, 17a of the gear input shaft 2b into neutral or also engaging the clutch 5, and shut off. In certain driving situations, for example, during the warm-up phase of the internal combustion engine, shortly before a full load requirement or in general with an appropriate design of the vehicle, it may prove less beneficial to shut off the internal combustion engine, and it should therefore be pulled along in these vehicles during a recuperation process, wherein the pull loss will have a negative effect on the energy that can be recuperated. It is additionally disadvantageous that the internal combustion engine must be operated in idle, e.g. 880 to 1400 r.p.m., in order to minimize the pull loss, and that thus the electric unit 10 must be operated at appropriate speed below optimal efficiency. In order to compensate for these disadvantages, the suggestion is made in example 1b shown in FIG. 2 to pull the internal combustion engine along in the push operating mode after an adjustable speed limit, e.g. 60 km/h, and to couple the electric unit 10 to the gear output shaft 3 through the gear II. This increases the speed of the electric unit 10 over the crankshaft by the quotient of the two gears II and IV, for example, by a factor of 2.5, so that at a speed of about 60 km/h the internal combustion engine is pulled along at a speed of n=1700 r.p.m. and the electric unit 10 can be operated at about 4200 r.p.m. Shifting hereby occurs through the sliding sleeve 8, which is designed so as to connect both 20a' of the gear V and the idler 27a of the gear II with the fixed wheel that is firmly connected with the gear output shaft. The control unit is able to calculate the time at which a down-shift from gear VI into gear is energetically favorably despite increased pull torque and thus establish the speed limit. When the driving speed continues to decrease, another down-shift is preferably provided to effectively utilize the recuperation process. Based on the inventive idea, the down-shifting process however does not occur to the gear IV on the gear input shaft 2a with the electric unit 10, but into gear II, wherein the pull torque of the internal combustion engine is maintained during the shifting process by a short-term slipping operating mode of the clutch 5 with an engaged gear II so that the internal combustion engine does not stop during the shifting process and has to be re-started. This shifting technique achieves a considerably quicker process of putting the vehicle in motion after a full load requirement, with only a slightly worse energy balance.

Figure 2C:
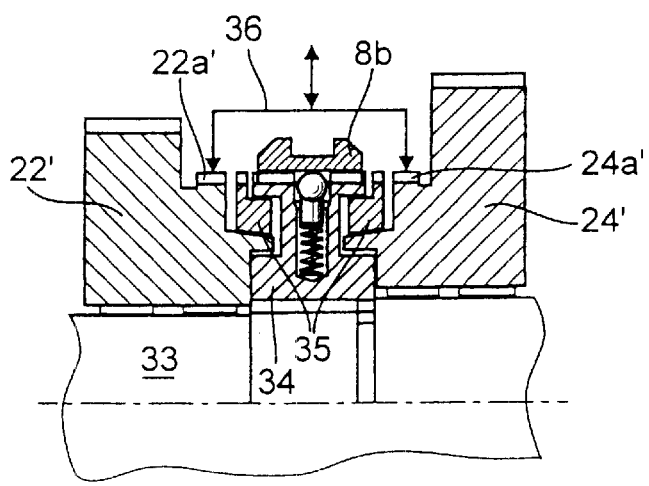
Figure 2A:
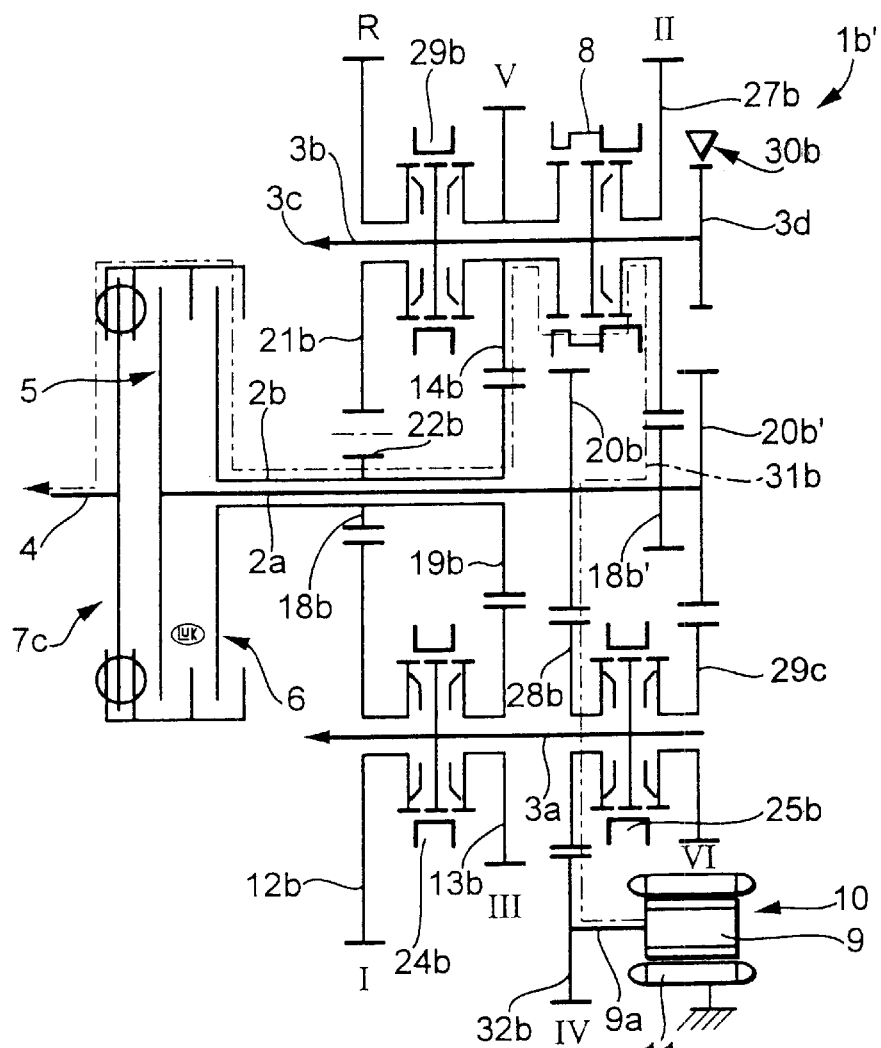

FIG. 2a shows a variation of a double clutch transmission 1b' which is particularly suited for a front crosswise installation in a vehicle. Transmission 1b' is similar to the double clutch transmission 1b of FIG. 2 with a split transmission output shaft, which consists of two parallel branches 3a, 3b and the parallel transmission input shafts 2a, 2b in between, wherein the transmission input shaft 2b is a hollow shaft and arranged around the transmission input shaft 2a. Both branches 3a, 3b can be joined, for example, through a geared connection or in the differential. The arrangement of the gears I–VI, R is such that the fixed gears 18b and 19b are arranged on the hollow shaft 2b, which is shorter than the transmission input shaft 2a, wherein the fixed gear 18b— which is arranged next to the two-mass flywheel 7c that contains the clutches 5, 6 as a double clutch—meshes with the idler 12b of the gear I on the branch 3a of the transmission output shaft and with the idler 21b of the reverse gear R on the branch 3b, through intermediate reversing gear 22b. The fixed gear 19b meshes with the idler 14b of the gear V on the branch 3b on the one hand and with the idler 13b of the gear III on the branch 3a on the other hand.

The fixed gears 18b', 20b, 20b' for the gears II, IV and VI are arranged on the transmission input shaft 2a, wherein the idlers 28b and 29c are arranged on the branch 3a for the purpose of forming the gears IV and VI and the idler 27b is arranged on the branch 3b, adjacent to the idler 14b, for the purpose of forming the gear II. On the end of the branch 3b opposite the output 3c another fixed gear 3d is provided, which forms a parking lock 30b through appropriate means preventing the rotation of the fixed gear 3d. The gears I and III, IV and VI, R and V are engaged through a sliding sleeve 24b, 25b or 29b, respectively, by forming a non-rotatable connection between the branches 3a and 3b on one hand, and the idlers 12b, 13b, 14b, 21b, 27b, 28b, 29c on the other hand. The sliding sleeve 8 engages the gear II and non-rotatably connects the idlers 14b of the gear V and idler 27b of the gear II to form a reduced power path described under FIG. 2 along the dotted line 31b between the rotor shaft 9a of the rotor 9 of the electrical machine 10 and the crankshaft 4 in order to start the cold internal combustion engine, particularly at low outside temperatures. For this, all sliding sleeves with the exception of sliding sleeve 8, which connects with the two idlers 27b, 14b, are in a neutral position, the clutch 5 is disengaged and the clutch 6 is engaged.

In this example, the electric unit 10 is not directly flanged to one of the gear input shafts, but instead connected with the idler 28b of the gear IV through a gear wheel 32b. This offers the possibility of coupling the electric unit 10 to the gear input shaft 2a with the gear ratio of the gear IV and a specified gear ratio between the fixed wheel 28b and the gear wheel 32b and thus couple it directly also to the internal combustion engine with a disengaged clutch 5 through the crankshaft 4 and to start it directly or to absorb torque from it as a generator, wherein the idler 28b—expect when driving in gear IV—is not connected with the branch 3a in a stationary manner.

Figure 2B:
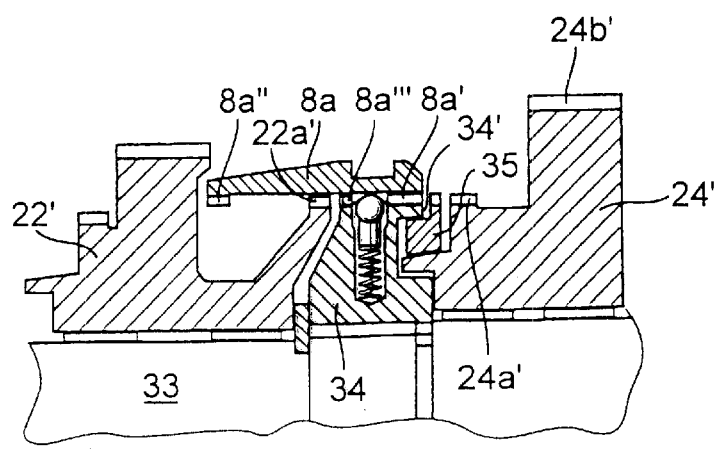

FIGS. 2b and 2c show different variations for engaging the gear II and V through the sliding sleeve 8a, 8b of the transmission 1b, 1b'. The idlers 22', 24' are rotatably arranged on a transmission output shaft or transmission input shaft and are positively connected by means of teeth 22a, 24a' with a fixed pear 34, which is non-rotatably arranged on the shaft 33, through an axial displacement of the sliding sleeve 8a, 8b. Synchronizing member 35 located on a cone balances relative rotational speeds between the idlers 22', 24' and the synchronizing member 34—in a conventional manner—by forming a frictional engagement with the cone surfaces.

The task of the sliding sleeve 8a of FIG. 2b consists of creating a synchronized positive lock between the fixed gear 34 and the idler 24' from the depicted neutral position through an axial displacement in the direction of the idler 24', wherein the outer teeth 24a' enter into a positive lock with the inner teeth 8a' and outer teeth 34' of the fixed gear 34 and form a positive lock with additional inner teeth 8a''' of the sliding sleeve 8a. Additional axial displacement resolves the second task of non-rotatably connecting the two idlers 22', 24' together, wherein the teeth 8a'' of the sliding sleeve 8a and the teeth 22a' of the idler 22' on one hand, and the teeth 8a' of the sliding sleeve 8a and the teeth 24a' of the idler 24' on the other hand, enter into a positive lock. The two idlers are only connected with each during stopped positions of the shaft 33 and the idlers 22', 24', 50 that the formation of such a positive lock does not require synchronization.

The design of the sliding sleeve 8a does not provide for connecting the idler 22' with the shaft 33 and engaging the associated gear. This possibility is offered by the arrangement in FIG. 2c, where the sliding sleeve 8b connects an idler 22', 24', respectively, with the fixed pear 34, and thus with the shaft 33, in a non-rotatable manner through an axial displacement from the depicted rest position. The connection of both idlers in this example takes place with a safety catch 36, which can be swung into the teeth 22a', 24a' radially from the outside to form a positive lock, and can be moved mechanically, electrically, hydraulically, or pneumatically between two end positions. Additional beneficial embodiments in FIG. 2b, particularly for shortening the space axially and reducing the axial expansion of the sliding sleeve 8a, can incorporate a feature that one of the idlers, e.g., idler 22', is rotatably located on the other 24', wherein the fixed gear 34 is arranged on an axial end of the idler 24', the idler 22' is seated axially between the teeth 24a' and the gear teeth 24b', and the teeth 22a' are arranged on the side of the idler 22' facing the fixed gear 34.

Figure 2D:
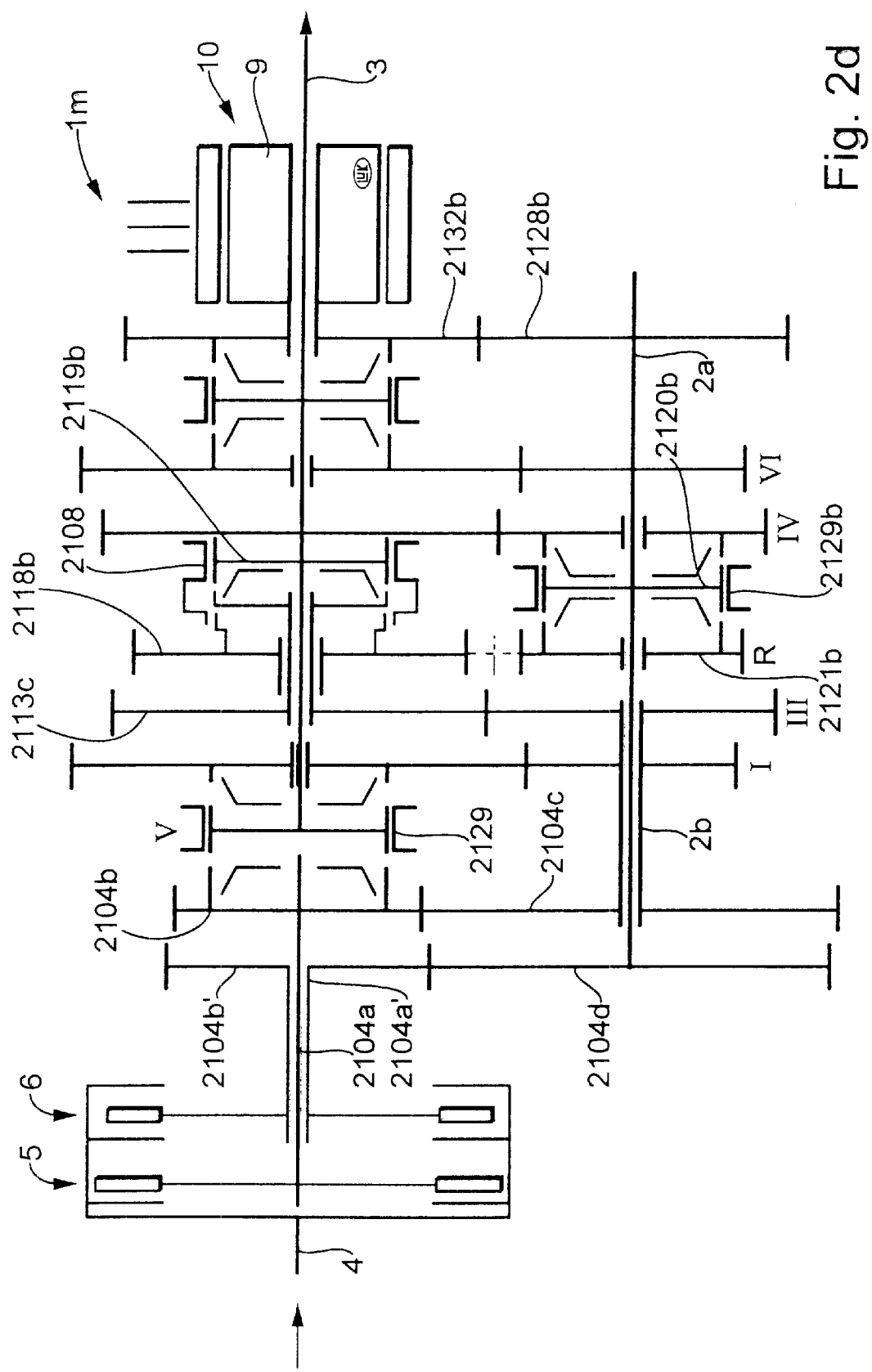

FIG. 2d shows a particularly preferred embodiment of a double clutch transmission 1m as a so-called in-line gear box, particularly for front longitudinal installation of the internal combustion engine with rear drive. The gear input shaft 2b forms a hollow shaft around the gear input shaft 2a, both gear input shafts are arranged parallel to the crankshaft 4 and to the gear output shaft 3, which is arranged coaxially and in an axial extension to the crankshaft. The transmission of power from the crankshaft 4 through the clutches 5, 6, which are assigned to a gear input shaft 2a, 2b, respectively, and have the design of a double clutch, takes place via the crankshaft branches 2104a, 2104a', which are connected with the clutches 5, 6, through a power transmission device, e.g. a toothed wheel connection, which is formed by the gear wheels 2104b, 2104b' of the crankshaft branches 2104a, 2104a' and the gear wheels 2104c, 2104d, which are arranged on the gear input shafts 2a, 2b in a stationary manner. Formation of the gear ratios of the individual gears I, II, III, IV, V, VI, R takes place as in the examples in FIGS. 1, 2, 2a through an idler and a fixed wheel, respectively, which can be arranged on one of the gear input shafts 2a, 2b or on the gear output shaft 3, respectively. Shifting of the gears takes place through shifting devices with possibly provided synchronizing devices, wherein the gears I, III can be allocated to the gear input shaft 2b and the gears II, IV, VI, R to the gear input shaft 2a. Features of the in-line gear that differ from the previously described examples are that one gear—in this case gear V—can have a direct gear ratio process and is engaged e.g. by connecting the crankshaft branch 2104a and the gear output shaft 3 through the shifting clutch 2129, which has a end position to the connection of the two shaft 2104a, 3 and additionally has a neutral position, in which the two shafts are separated, and a end position for engaging the gear I.

For spatial reasons, the electric unit 10 is seated around the gear output shaft 3, wherein the rotor 9 is seated in an articulating manner in relation to the shaft and the stator 11 is firmly connected with the gearbox casing and can be operated in accordance with the functions described in the figures above. For shifting a suitable gear ratio between the crankshaft 4 and the rotor 9 particularly during a cold start of the internal combustion engine through the electric unit 10 a feature is provided for equipping the reverse gear R both with a drive-side idler 2121b and a driven side idler 2118b and furthermore for arranging this idler 2118b not directly on the gear output shaft 3, but instead on a connector 2113c of the idler 2113b of the gear II, with the connector being seated in an articulating manner around the gear output shaft 3. In the depicted end position, the axially displaceable triplex sleeve 2108 now connects the fixed wheel 2119b, which is connected with the gear output shaft 3, with the idler 2118b and engages the reverse gear R when the shifting sleeve 2129 also connects the idler 2121b with the drive-side fixed wheel 2120b for the purpose of engaging the gears R and IV. When the sliding sleeve 2129b is in a neutral position or the gear IV is engaged, the idlers 2113b, 2118b can rotate freely. The gear III is engaged by displacing the triplex sleeve 2108 axially in such a manner that it connects the idler 2113c with the fixed wheel 2119b. The gear ratio for the cold start of the internal combustion engine is engaged by connecting the idler 2121b with the fixed wheel 2120b through the sliding sleeve 2129b, wherein the idler 2113c of the gear III is connected with the idler 2118b of the reverse gear R while being able to rotate freely around the gear output shaft 3 by axially displacing the triplex sleeve 2108 in its end position facing the crankshaft 4. The power distribution from the rotor 9 of the electric unit 10 then takes place through the gear wheels 132b, 128b on the gear input shaft 2a and through the gear pairs of the gears R, III with an appropriate torque conversion for the gear ratios of these gears on the gear input shaft 2b, and from there through the gear wheels 104c, 104b with a disengaged clutch 5 and an engaged clutch 6 to the crankshaft 4. Of course, this way a pulse start is also possible by keeping the clutch 5 engaged until the electric unit 10 has been accelerated up to reaching the appropriate pulse speed and then disengaging it.

Figure 3:
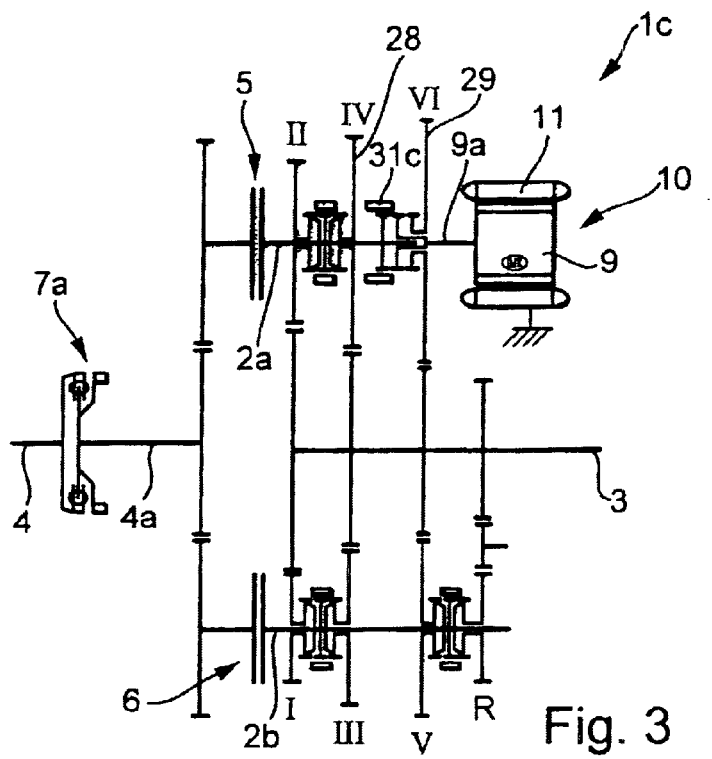

FIG. 3 shows an example of a double clutch 1c that corresponds to the double clutch transmission 1a of FIG. 1 in its major areas. The main difference is the arrangement of the electric unit 10, which allows it to be uncoupled from the gear input shaft 2a. This preferably occurs through the sliding sleeve of the gear, whose sliding sleeve in a six or four gear transmission does not engage two idlers of two gears. In the shown example, this is gear VI. The sliding sleeve 31c is arranged axially between the idlers 28, 29 and has four possible shifting positions. The first position is the shown neutral position, whether neither gear VI is engaged nor the electric unit 10 is coupled to the gear input shaft 2a. The second position in the case of an axial displacement of the sliding sleeve 31c in the direction of the idler 29 connects the gear input shaft 2a with the rotor shaft 9a of the electric unit 10. The third position with further axial displacement of the sliding sleeve 31c connects the idler 29, the rotor shaft 9a and the gear input shaft 2a with each other, e.g. when the vehicle is operated in gear VI and during generator operation of the electric unit 10 or when the vehicle is operated with one of the gears I, III, V and engaged clutch 5. The fourth position in the end position of the sliding sleeve 31c connects the electric unit 10 only with the gear VI, for example, or during a recuperation process with gear VI, or during operation of the vehicle with one of the gears I, III, V. The version that can be uncoupled from the gear input shaft 2a is particularly beneficial with electric units 10, which are inexpensive and have therefore limited power. Such electric units cannot support time critical synchronizing processes sufficiently with their own power supply and uncoupled during these shifting processes pursuant to the inventive idea.

Figure 4:
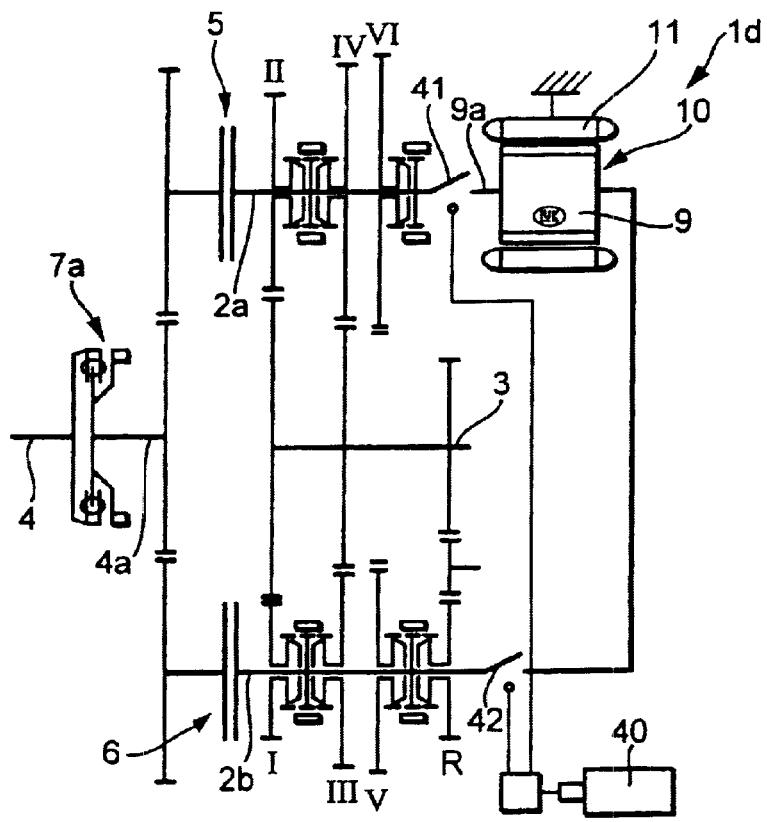

FIG. 4 shows another example of a double clutch gear box 1d with electric unit 10, which is similar to the embodiments of FIGS. 1a, 1c of FIGS. 1 and 4, wherein the main difference to the double clutch transmission 1a consists of the fact that the electric unit 10 can be uncoupled from the gear input shaft 2a and coupled to the gear input shaft 2b. Coupling occurs through an actuator 40, which optionally connects one of the two gear input shafts 2a, 2b with the rotor shaft 9a of the electric unit 10 through kinematics, shown in diagrammatic view here with the switches 41, 42, or uncouples it from the two shafts 2a, 2b. The connection can take place through a belt, friction wheel or sprocket drive, through a magnetic clutch, through a toothed wheel connection or similar. By switching it, the electric unit 10 can optionally be connected directly with the internal combustion engine through one of the gear input shafts 2a or 2b with a disengaged clutch 5 or 6 and drive it e.g. for its start or it can be driven by it in generator mode. Furthermore, the number of gears and thus the number of gear ratios for operating the electric unit 10—as shown in the examples in FIGS. 12 and 13—is larger at optimal efficiency so that through an appropriate switch of the electric unit 10 from one gear input shaft to the other that shaft can be operated even more closely to its power optimum. Another advantage of this arrangement is the usage of every gear I through VI for recuperation, wherein the electric unit 10 is connected with the gear that is to be used appropriate to the gear input shafts 2a, 2b. Furthermore, before a double shift, i.e. a shift between two gears on the same gear input shaft, the electric unit 10 can be connected with the gear input shaft that is not involved in the shifting process before starting the shifting process and can compensate the tractive force interruption caused by disengaging the active and engaging the new gear at least partially by directing a torque into the other gear input shaft.

Figure 5:
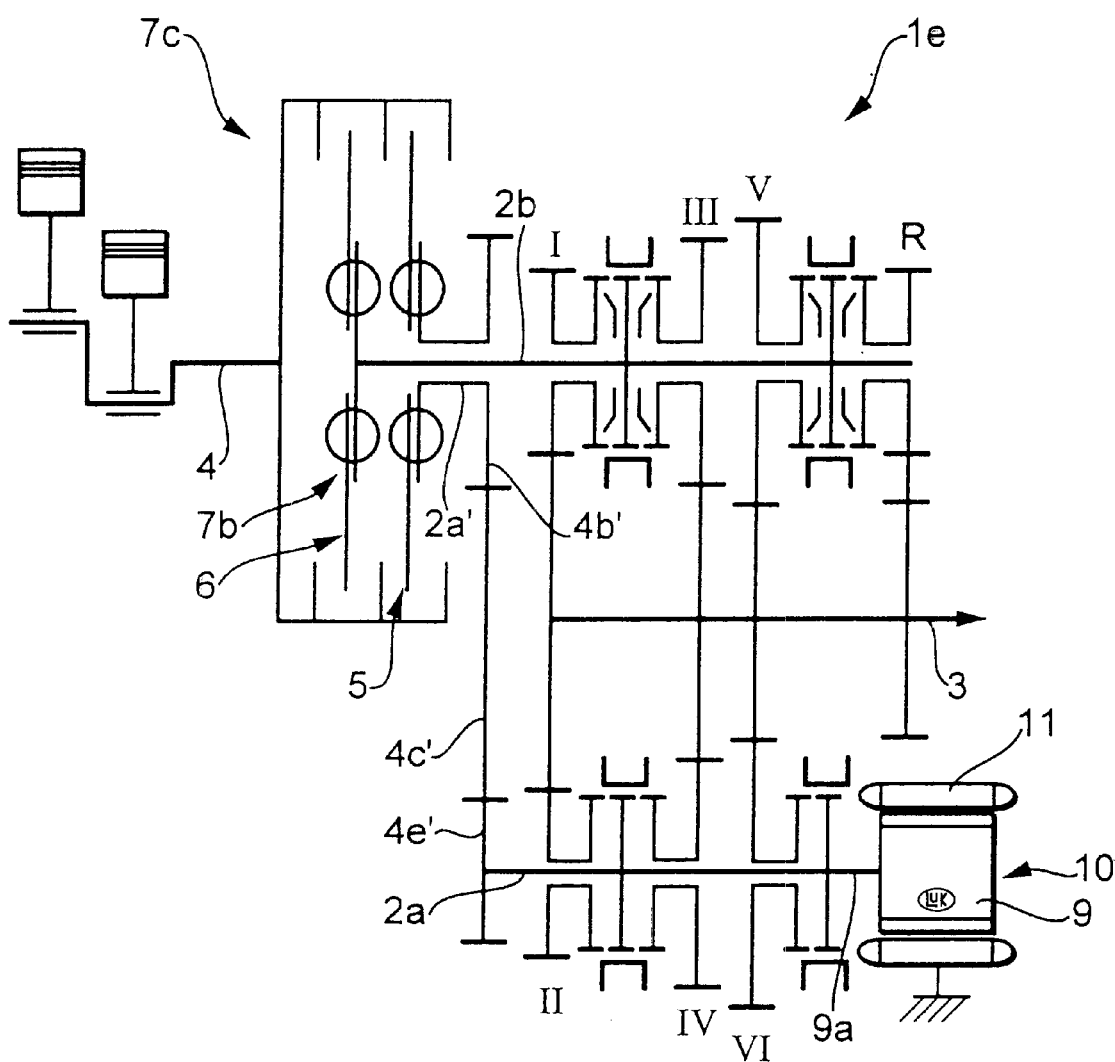

FIG. 5 provides for a design of a double clutch transmission 1e that is modified over the gear box 1a of FIG. 1 according to which e.g. for space or cost reasons the two clutches 5, 6 are combined into a double clutch, wherein the double clutch in turn can be arranged on a two-mass flywheel 7c. With this structure, the splitting of the axis 2b and thus necessary gear wheels can be foregone, and in some embodiments better noise behavior can be achieved. In this example, the gear input shaft 2b is arranged basically coaxially to the crankshaft 4, the second gear input shaft 2a as well as the gear output shaft 3 are arranged parallel to it, wherein the gear output shaft 3 is arranged spatially between the two gear input shafts 2a, 2b. Transmission of the torque of the hollow shaft stump 2a', which is connected with the output part of the clutch 5 and arranged around the gear input shaft 2a, to the gear input shaft 2a occurs through a positive lock or frictional engagement, for example, through a fixed wheel 4b', which is attached to the hollow shaft stump 2a' and combs with a reversing wheel 4c', which in turn combs with a fixed wheel 4e' that is connected to the gear input shaft 2a in a stationary manner. Function and shifting processes are basically identical to the gear box 1a of FIG. 1.

Figure 6:
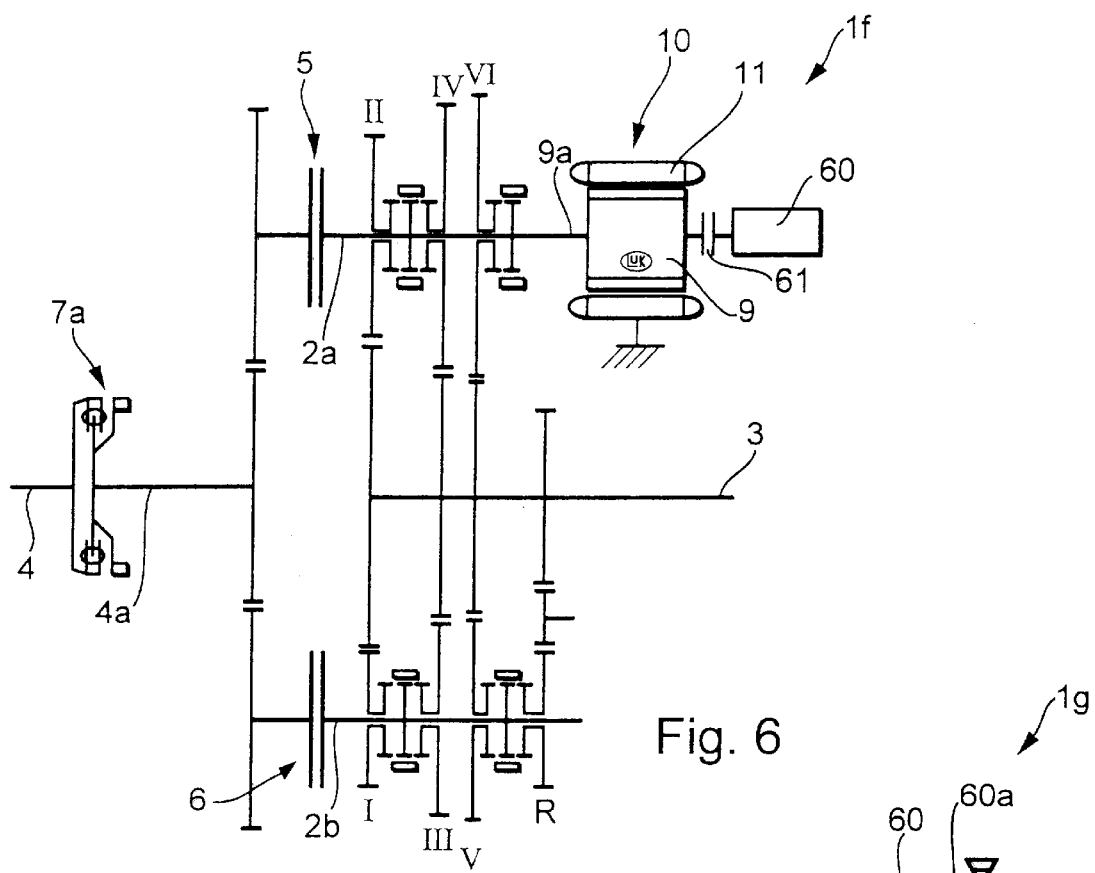

FIG. 6 shows the gear box 1a as another example 1f of double clutch transmissions, where at least one secondary unit 60 is coupled with the electric unit 10 from a drive point of view. Such versions offer the benefit that safety-relevant secondary units and/or units to increase comfort such as air conditioning compressors, steering booster pumps, brake boosters and/or vacuum pumps and/or similar can be coupled to the electric unit 10 and thus continue to be supplied even with a stopped internal combustion engine, e.g. in standstill mode or during recuperation. So as not to increase the synchronizing times by the increased moments of inertia of the secondary units 60, it may prove beneficial to provide a disconnect-type clutch 61, which can be a shifting, magnetic or friction clutch and is selected electrically and/or by an actuator that is triggered in dependence of the appropriate shifting modes, between the electric unit 10 and at least one secondary unit 60. Of course, at least one secondary unit 60 can also be uncoupled for other beneficial reasons such as saving fuel, e.g. an air conditioning compressor can be uncoupled when the air conditioner is not in operation. Furthermore, an secondary unit can couple the secondary unit to the electric unit or uncouple it from it upon reaching or exceeding a specified speed in order to achieve that the secondary unit operates within a beneficial range, for example, through a clutch operating in dependence of the speed of the secondary unit's shaft, e.g. a centrifugal clutch. In the case of several secondary units, such a clutch can be arranged on a shaft of at least one secondary unit so as to affect the entire pulley plane in a central—for example, by arranging it on the rotor shaft 9a—or decentralized manner.

Figure 7:
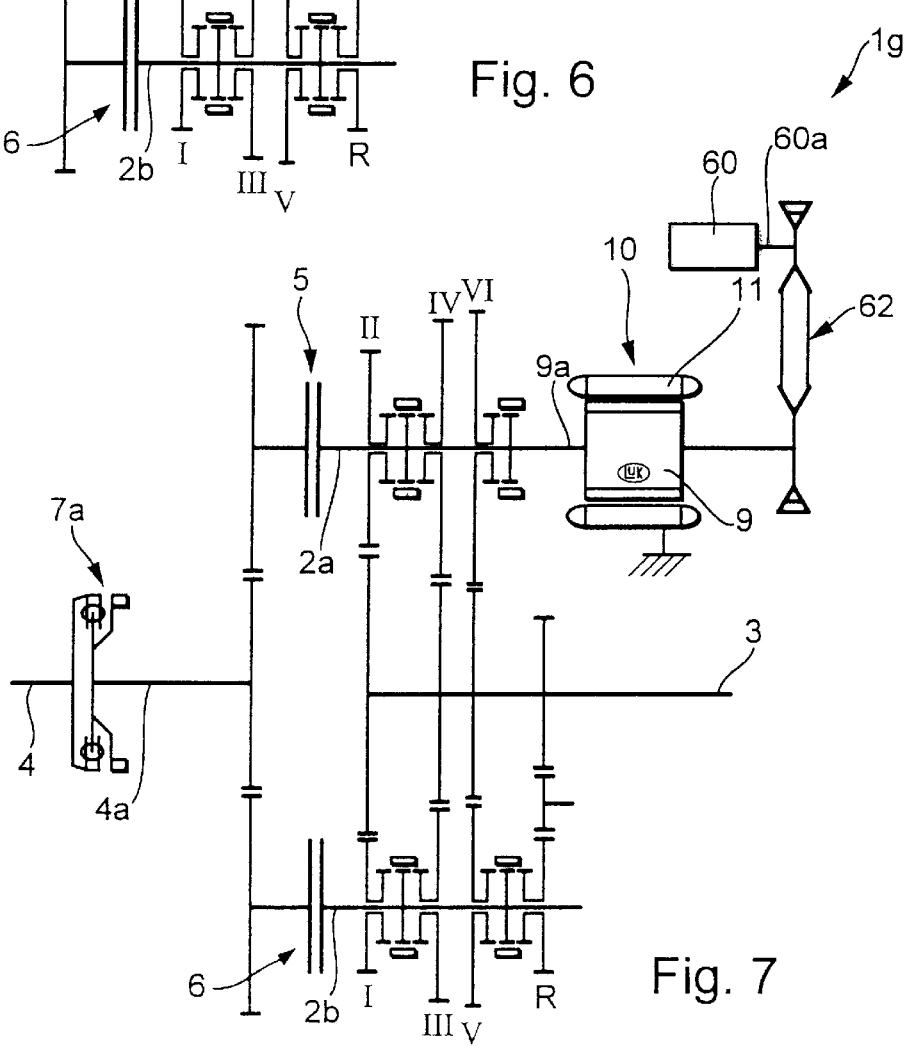

FIG. 7 shows another variation of the double clutch transmission 1g, which is similar to double clutch transmission 1f of FIG. 6, where the secondary unit 60 is connected with the rotor shaft 9a through a belt drive 62. With regard to its gear ratio between the secondary unit 60 and electric unit 10, the belt drive can have a fixed or variable design, for example, it can be a CVT transmission, wherein an automatic selection can be provided, for example, for adjusting optimal efficiency of the secondary unit 60. Furthermore it may prove beneficial to integrate further secondary units into this belt drive 62, apart from an air conditioning compressor. Here as well a disconnect-type clutch can be provided between the electric unit 10 and the belt drive 62 or between the shaft 60a and the belt drive 62. Furthermore it may be beneficial to operate the electric unit 10 in both directions of rotation so as to forgo, for example, a reverse gear R, wherein the vehicle in electric mode is driven with one of the forward gears I or II with reverse sense of rotation of the electric unit 10. Secondary units 60 that can be operated only in one direction of rotation can still be employed if they are uncoupled during the reversal of the sense of rotation pursuant to the inventive idea and/or if a free wheel is provided in the power distribution flow between the electric unit and pulley plane or only between the appropriate secondary unit and the electric unit.

Figure 8:
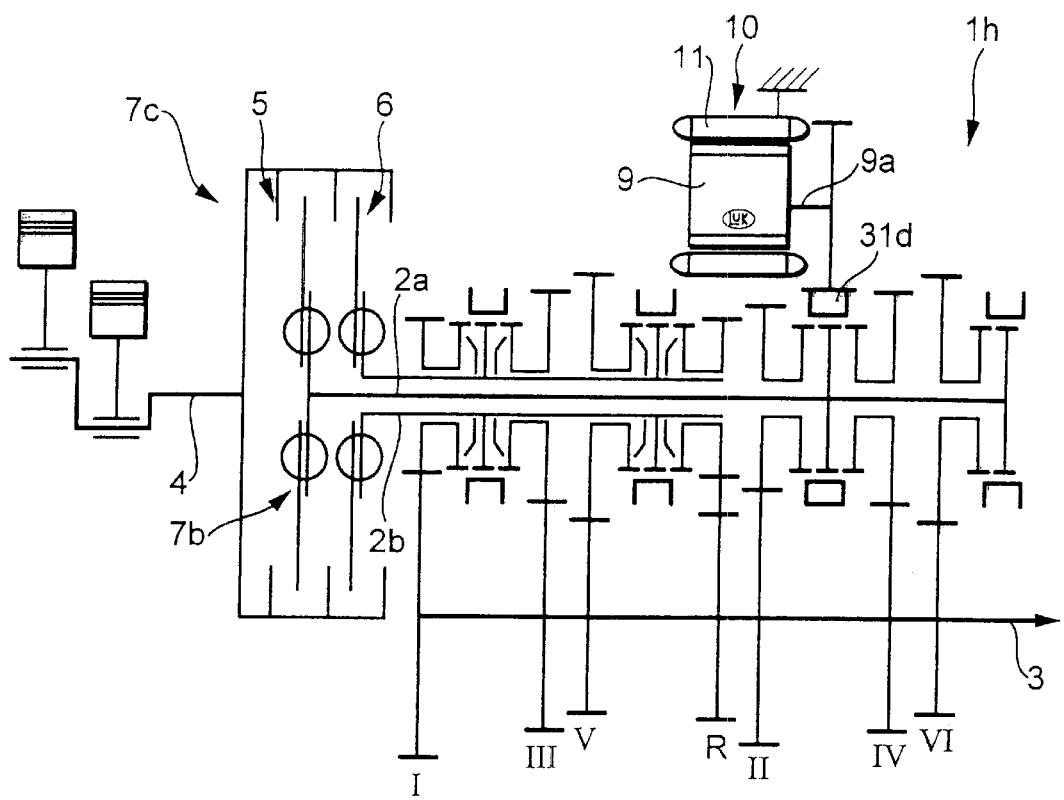

FIG. 8 shows an example of a double clutch transmission 1h, which is particularly beneficial for front longitudinal installation, with an electric unit 10, wherein the gear input shaft 2b has the design of a hollow shaft and is arranged coaxially around the gear input shaft 2a and the gear output shaft 3 and parallel to their axes. With regard to its rotor shaft 9a the electric unit 10 is arranged parallel to their axes and can be coupled with the gear input shaft 2a directly through the sliding sleeve 31d with a switchable positive lock connection. Furthermore, when maintaining this positive lock to the gear input shaft 2a, optionally gear II or gear IV can be engaged through 31d. Another optional shifting variation of the shifting sleeve 31d can be in a neutral position, where the electric unit 10 is uncoupled from the gear input shaft 2a and from the gears II and IV.

The gears I, III, V, R are arranged at a distance to the clutches 5, 6, which are integrated into one double clutch, in this sequence and are shifted as has been explained more closely in FIG. 1. The gear input shaft 2a is designed longer axially than the gear input shaft 2b and on the protruding part the gears II, IV and IV are arranged in this sequence. Function and mode of operation take place in accordance with the previously described gear box 1a with the difference that the electric unit 10 can be uncoupled from the gear input shaft 2a and coupled with the gears II or IV. By connecting the electric unit 10 with the gear input shaft 2a the r.p.m. range of the electric unit 10 can be utilized with a disengaged clutch 5 while taking the gear ratio between the gear input shaft 2a and the rotor shaft 9a into consideration, in the case of a connection of the electric unit 10 through the gear II or IV and with an engaged clutch 5 the r.p.m. range of the gear output shaft 3 can be used while taking the gear ratios of the gears II or IV into consideration.

Figure 9:
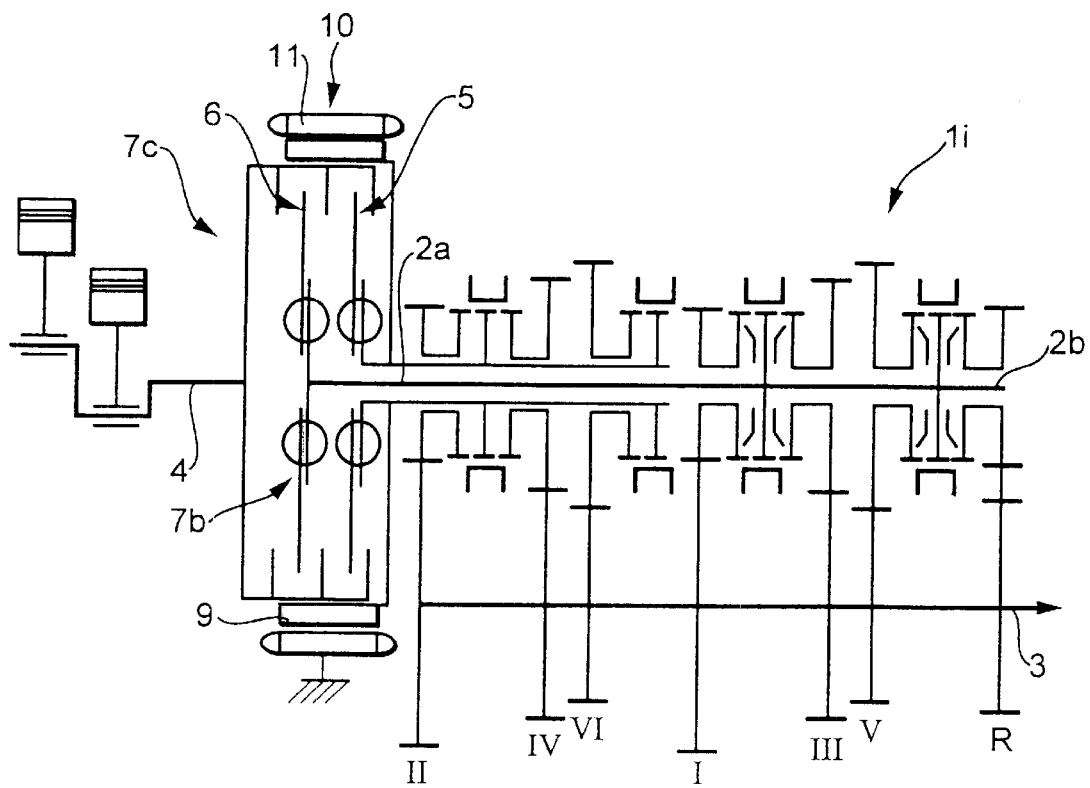
Figure 10:
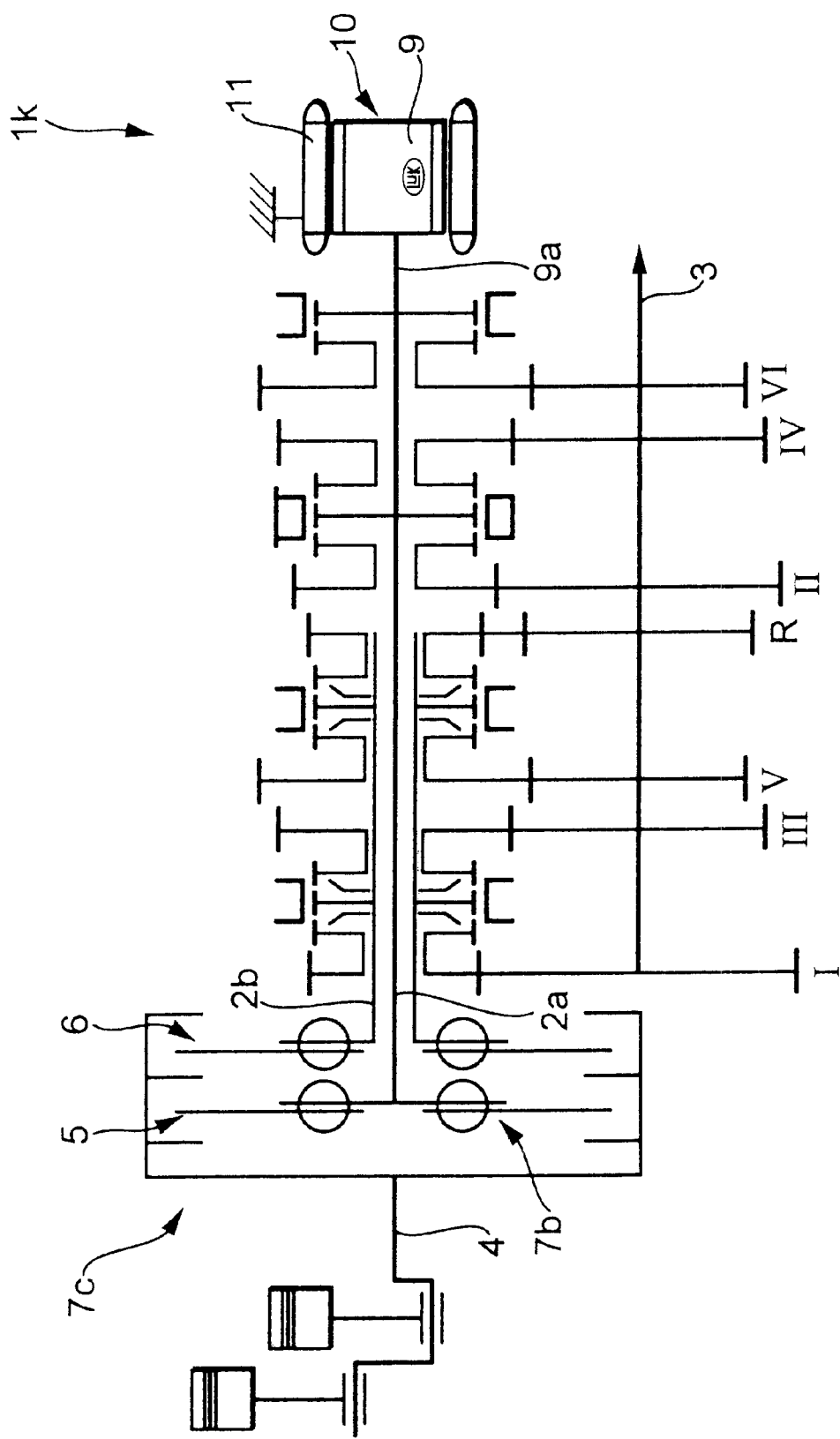

FIG. 9 shows an example of a double clutch transmission 1i that is similar to the gear box 1h of FIG. 8 with the basic difference that the electric unit 10 is arranged radially around the clutches 5, 6, wherein the rotor is connected directly with the gear input shaft 2a, for example, it meshes with a disk part. Furthermore, the gear input shaft 2a is arranged around the gear input shaft 2b as a hollow shaft, which leads to a modified arrangement of the gears I–VI, R. The gears II, IV, VI are arranged on the clutch side part of the gear box 1i and the gears I, III, V and R are arranged on the part of the gear input shaft 2b that is axially extended compared to the gear input shaft 2a in the area of the driven side part of the gear box 1i. A connection of the electric unit 10 with the gear output shaft 3 from a drive point of view can occur through the gears II, IV or VI.

FIG. 8 shows a gear box 1k that is very similar to the transmission 1h of FIG. 8, which basically differs from it by an electric unit 10 that is seated coaxially on the end of the gear input shaft 2a that is opposite the clutch 5.

FIG. 11 shows a diagrammatic view of a double clutch transmission 101 with two electric units 110a, 110b, which each drive a gear input shaft 102a, 102b, respectively. In the example shown, the two electric units 110a, 110b are arranged opposite to each other, and the gear input shafts 102a, 102b allocated to them are arranged basically coaxially to each other between the electric units 110a, 110b. The gear output shaft 103 is arranged parallel to their axes and is equipped with at least one output device 103a for driving at least driving wheel. It is also possible to drive two driving wheels when connecting a differential. Furthermore the gear output shaft 103 can be equipped with another output device 103b, which basically corresponds to the output device 103a, for which another driving wheel or appropriately a pair of driving wheels can be provided for the formation of a four-wheel drive with equal or differing torque supply to both axles, for example, 10% to 50% of the torque on the front axle and accordingly 50% to 90% on the rear axle. In this case, it may prove particularly beneficial to split the gear output shaft 103 into two shaftings 103c and 103d in order to be able to drive the two driving wheels either on one axle without differential gear or to achieve the above-mentioned distribution onto two axles, and to provide between them for means 120 that transmit different torques from a drive point of view, for example, a clutch, torque splitting mechanism or similar so that optionally one of the two output devices 103 can be operated by one electric unit 110a, 110, respectively, with an open torque splitting mechanism 120 or one of the two or both electric units 110a, 110b drive the one output device 103a and optionally additionally a second output device 103b with a transmitting torque splitting mechanism 120. The torque splitting mechanism 120 can also be operated in a slipping mode and can be a shifting clutch, magnetic clutch, friction clutch or viscous-type clutch. The torque splitting mechanism 120 can furthermore be designed so as to shift automatically, for example, in dependence on the different wheel speeds, e.g. during slipping operation, and close or it can be actuated by an actuator 130, which is actuated in dependence of at least one operating parameter, e.g. slippage of the driving wheels, overheating of the wheels, ascending or descending slope, the efficiency of the electric units 110a, 110b, load and similar. Another beneficial design of the transmission 101 can provide a feature that the two gear output shafts 103a, 103b each drive a driving wheel, which eliminates a differential.

The gear box 101 has four gears I–IV in the example shown, wherein the gears I and III are engaged by connecting the idlers 112, 113 through the sliding sleeve 129 and the gear II and IV by connecting the idlers 114, 115 through the sliding sleeve 130, wherein they in turn are axially displaced through the actuator 130. In the example shown, a single actuator 130 is provided with an actuating device 131, with which both sliding sleeves 129 and 130, a parking lock 132, which can catch a fixed wheel 126 of the gear output shaft 103, as well as possibly the torque splitting mechanism 120 are actuated. Of course, several actuators can be used as well. The idlers 112, 113, 114, 115 comb with an appropriate fixed wheel 116, 117, 118, 119, respectively, that is arranged on the gear output shaft 102 or on the shaftings 103c, 103d, wherein embodiments in which at least one idler on the gear output shaft 102 and the corresponding fixed wheel are arranged accordingly on one of the gear input shafts 102, 102b can also be beneficial.

Additional embodiments can include beneficial transmission structures where one or several of the shafts 102a, 102b, 103, 103c, 103d are designed as hollow shafts and can be arranged coaxially to each other. This arrangement may prove particularly beneficial for the gear output shafts 103c, 103d and/or the gear input shafts 102a, 102b, wherein in this case the electric units 110a, 110b—in arrangements equivalent to the one shown in FIG. 11—can be arranged opposite from each other or in a modular unit, for example, radially on top of each other. The electric units 110a, 110b can have the same design, with equivalent or different power. The gears I and II and/or the gears III and IV can have the same gear ratios for the purpose of forming two symmetrical transmission halves or can have different gear ratios for the purpose of forming a four-step gear box 101. Of course, the gear steps I through IV shown can be represented, for example, by two planetary sets that can be shifted through brake straps or shifting clutches, wherein lower noise gear boxes can be manufactured and the statements that were made about gear ratios, shifting strategies and arrangements can largely be transferred to this example.

The example of the gear box 101 that is shown can exercise the following functions, which should not interpreted as being limited to these:

a) one driven axle
  the gear output shaft 103 is one piece, the output device 103b and the clutch 120 are eliminated. The output device 103a drives one driving wheel or two driving wheels through a differential.
  the gear output shaft 103 is divided into two shaftings 103a, 103b, the electric units 110a, 110b drive one driving wheel, respectively. The branch balance in curves is adjusted by the electric units 110a, 110b, a differential has been eliminated. The torque splitting mechanism 120, for example, a torque splitting transmission, a shifting, friction, magnetic or viscous-type clutch, can serve optionally as a limited-slip differential between the two output devices 103a, 103b.

b) two driven axles
  the gear output shaft 103 is one piece, the torque splitting mechanism 120 is eliminated, both output devices have one driving wheel, respectively, or two driving wheels that are coupled through a differential, one or both electric units 110a, 110b drive the output devices 103a, 103b as a permanent all-wheel drive.
  the gear output shaft 103 is a two-piece unit with shaftings 103c, 103d that operate independently from each other, one of the two electric units 110a, 110b drives an output device 103a, 103b, respectively, which drives one or both driving wheels, which are coupled through a differential. The two output devices 103a, 103b can have different weighting. For this, the electric units 110a, 110b can have different power or can be operated at different power levels. The gear ratios of the gears I through IV can be adjusted to the different weighting.
  The gear output shaft 103 is a two-piece unit with shaftings 103, 103d that can be coupled with each other through a friction clutch 120, a torque splitting mechanism such as a torque splitting transmission, viscous-type clutch, magnetic clutch and similar. One or both electric units 110, 110b affect both drives 103a, 103b in accordance with the torque splitting mechanism. With an engaged clutch 120 or torque splitting mechanism, the appropriate electric unit 110a, 110b can drive a drive unit 103a, 103b as described above.

Operation of a vehicle with the gear box 101 occurs through the electric units 110a, 110b, which can feed torque to the gear output shaft 103 simultaneously or individually and thus can drive the driving wheels. It may prove particularly beneficial to operate only one electric unit 110a, 110b in the case of low partial load, preferably with the lower speed when taking the adjustable gear ratios of the gears I–IV into consideration. The other electric unit 110b, 110a can be towed along or in the case of four-wheel drive it can be uncoupled through the torque splitting mechanism 120, wherein at the same time the appropriate driving wheels are uncoupled, and/or through the shifting clutches 129, 130. Synchronization of the gears I–IV with the speeds of the respective gear input shafts 102a, 102b takes place by selecting the electric unit 110a, 110b. When shifting from gear I to gear III a the electric unit 110a takes over the full drive torque, when shifting from gear II to gear IV it is the electric unit 110b. It may prove beneficial to design the electric units 110a, 110a in such a way, e.g. with power from 15 to 50 kW, that they can be overloaded briefly, for example, with 40 to 300% of their nominal power.

The electric unit 110a, 110b is provided for motor and generator operation so that a driving mode and a recuperating mode are possible; additionally generator operation can also be used for decelerating the gear input shafts 102a, 102b when synchronizing the shifting process and released energy can possibly be fed to the respectively other electric unit directly without intermediate storage in an electric accumulator. In a beneficial version, such a drive can be employed both as support in a motor vehicle with an internal combustion engine and in a vehicle that is only operated with electric energy, e.g. coming from a fuel cell.

FIG. 19 shows in a flow chart an example of the course of the transition of a double clutch transmission—here for the example 1a of FIG. 1—during the transition from a recuperating phase with a shut off, i.e. stopped internal combustion engine, into a traction operation, wherein beneficially a time delay, e.g. with a duration of 0.2 to 3 seconds, can be actuated before starting the internal combustion engine. For the purpose of the transition between recuperation and start of the internal combustion engine, e.g. a sub-program 250 is started in a control unit for controlling the transmission 1a in a starting field 251, with v>0 applying for the speed v of the vehicle, a signal S announcing actuation of the gas pedal and n(KW)=0 (internal combustion engine off) applying for the speed n(KW) of the crankshaft 4 (FIG. 1), wherein two parallel sub-routines 252, 253 are set in motion. The sub-routine 253 sets the torque M(EM) of the electric unit 10 in program step 254 to zero and triggers the neutral position NEUTRAL of the sliding sleeve 30 or 31 of the engaged gear G(E), or gear II, IV, or VI, i.e. the idler 27, 28 or 29 of the gear G(E) can be rotated in relation to the gear input shaft 2a. In the subsequent program step 255, the clutch K2 (reference code 5, FIG. 1) is disengaged, and internal combustion BKM is started by supplying power to the electric unit 10 through a pulse start.

Parallel to this, in the sub-routine 252 the new gear G(Z) that is to be engaged is determined from at least one operating value, for example, the vehicle speed, the position of the gas pedal, the air resistance, the previously engaged gear, the speed of the driving wheels and/or the non-driven wheels, the gear input shafts 2a, 2b, the crankshaft 4 or a combination thereof, and a power requirement 257 is issued in accordance with the new gear G(Z) that is to be engaged and evaluated in program step 258 for controlling the internal combustion engine BKM, wherein it is accelerated accordingly. Parallel to this, an examination takes place in the branches 259, 260 of the two routines 252, 254 as to whether the new gear G(Z) that is to be engaged is on the gear input shaft GEW1 (2b, FIG. 1). When the gear G(Z) is on the gear input shaft 2b, G(Z) is engaged in step 261 and the two sub-routines 252, 253 are combined in step 262, and when the crankshaft of the internal combustion engine reaches a higher speed n(KW) than the speed n(GEW1) the clutch K1 (6 in FIG. 1) is disengaged in step 258 and the sub-program is terminated in step 263.

When the target gear G(Z) is not on the gear input shaft GEW1, the clutch K2 is engaged in the sub-routine 253 in step 264, and the gear input shaft GEW2 is synchronized on the new gear G(Z) that is to be engaged in step 265 through the electric unit 10 and engaged upon reaching the synchronizing speed. Parallel to this, the next higher gear G(Z+1) on the gear input shaft GEW1 is engaged in the sub-routine 252 in step 266 and subsequently the clutch K1 is operated in a slipping mode in step 267 until the synchronizing speed between the gear input shaft GEW2 and the new gear G(Z) that is to be engaged has been reached. During this time, drive torque is transmitted to the gear output shaft 3 (FIG. 1) through the gear G(Z+1). Upon reaching the synchronizing speed for the gear G(Z), the sub-routines 252 and 251 are combined in step 268 and the clutch K1 is engaged and the clutch K2 is disengaged and they are transmitted to the end of the program 263.

Deviating from the course of the shifting program 250 it may prove beneficial to engage a target gear already during recuperation in dependence of the vehicle speed. It may prove particularly useful to engage the target gear in relation to an expected full load requirement.

FIG. 20 shows an example of a double clutch transmission where a friction clutch between the crankshaft and one of the two gear input shafts has been replaced by two shifting clutches. In additional embodiments, both friction clutches can be replaced by shifting clutches. Furthermore, in accordance with the previously described examples in FIGS. 1 through 10, double clutch transmissions with shifting clutches in the power distribution flow between the crankshaft and gear input shafts can have an appropriate design, for example, with a split output shaft, with hollow shafts, as in-line transmission, fixed wheels and idlers with the appropriate shifting devices that can be actuated manually or automatically, for a uniform arrangement on the gear input shafts or the gear output shaft or in a mixed fashion on the gear input shafts and the gear output shaft.

The embodiment of this group of double clutch transmissions shown in FIG. 20 where one or both friction clutches have been replaced by shifting clutches shows a double clutch transmission 1201, which is similar to the double clutch transmission 1b of FIG. 2, wherein the function of the clutch 5 (FIG. 2) is assumed by the shifting clutches 1205a.

An additional shifting clutch 1205b connects the stator 1211 of the electric unit 1210 optionally with the gearbox casing 1250—which is only hinted in the diagram—or with the crankshaft 1204 in the case of a disengaged shifting clutch 1205. Synchronizing devices 1251, 1252 can be provided on both shifting clutches. The connection of the stator 1211 with the crankshaft 1204 with a disengaged shifting clutch 1205 enables an operation of the electric unit 1210 with a differential speed to the speed of the crankshaft 1204 so that, for example, very small differential speeds can be controlled very well and adjustment of the synchronizing speeds on the gear input shaft 1202a can occur better, more quickly and more easily with regard to the shifting processes of the shifting clutches 1205a, 1205b, 1230a.

The internal combustion engine is preferably started with a neutral position of the transmission 1201 with an engaged shifting clutch 1205a and with a stator 1211 that is connected to the gear box casing 1250. During operation of the electric unit 1210, the rotor 1209 accelerates the gear input shaft 1202a and through the gear pair 1253/1254 also the crankshaft 1204 and starts the internal combustion engine. An alternative starting method can provided in such a manner that the shifting clutch 1205a is disengaged, the stator 1211 is connected with the crankshaft 1204 and a gear VI or IV that is arranged on the gear input shaft 1202a is engaged through the shifting clutch 1230a. When actuating the brakes of the vehicle, the rotor 1209 is secured and the stator 1211 drives the crankshaft 1204 through the toothed gear connection 1253/1254.

Further operation of the vehicle occurs as in the examples with two friction clutches, wherein when shifting the shifting clutches 1205a, 1205b the electric unit 1210 supports or completely assumes their synchronization by accelerating and delaying the gear input shaft 1202a with the crankshaft 1204, respectively, so that the synchronizing devices 1251, 1252 can be eliminated.

On the end of the gear input shaft 1202a that is opposite the end with the shifting clutch 1205a an secondary unit 1255 can be connected with it or be arranged in a connected manner, which can be driven, i.e. continued to be driven, through the electric unit 1210 when the vehicle is stopped. Of course, additional secondary units can be arranged in active interaction to the gear input shaft 1202a, which can be connected, for example, with the secondary unit 1255 through a continuously variable transmission.

FIG. 21 shows in a diagrammatic view an example of a double clutch transmission 301, which is similar to the embodiment of the double clutch transmission 1 of FIG. 1, with two gear shafts 302a, 302b as well as at least one output shaft 303, which is connected with at least one driving wheel, preferably two or four driving wheels from a drive point of view through a differential, a torque splitting mechanism such as a viscous-type clutch, a torque splitting transmission and/or similar and thus transmits the drive torque to at least one driving wheel for the purpose of moving the vehicle, wherein a thrust torque that is supplied by the wheels for recuperation can also be fed to the transmission in the opposite torque direction. Between the crankshaft 304 that is driven by an internal combustion engine and the gear input shafts 302a, 302b a friction clutch 305, 306, respectively, is provided, which provides for the appropriate gear input shaft 302a, 302b to be uncoupled from the crankshaft 304. During the course of the torque between the crankshaft 304 and the clutches 305, 306 a dampening device for dampening torsional oscillation and/or axial or wobble oscillation can be provided optionally, for example, a two-mass flywheel 307 that is arranged between two crankshaft branches 304, 304a or a torsional oscillation dampening device in at least one of the clutch disks of the clutches 305, 306. Of course, the two-mass flywheel—as is known—can be integrated into at least one, preferably both clutches 305, 306, wherein in a preferred embodiment a two-mass flywheel with double clutch can proven particularly beneficial. The clutches 305, 306 are preferably formed as friction clutches with a pressing plate and a pressure plate, respectively, which is connected with the pressing plate in an axially displaceable, stationary manner. In particular applications, even wet clutches, for example, in a fin design or similar to converter bridging clutches of torque converters, can be beneficial, which can be integrated into the transmission. Of course, all advantages with regard to the design of converter bridging clutches, such as e.g. profiled friction linings, piston controls for the piston selecting the converter bridging clutch, friction lining cooling and similar, can be beneficial here. When employing friction clutches friction linings are provided axially between the pressure plate and pressing plate, which are fastened with a clutch disk that is connected with the respective gear input shaft 302a, 302b in a positive rotational manner. The friction meshing between the pressure plate and pressing plate on one hand and the friction linings on the other hand is preferably accomplished through an axially displaceable energy accumulator that applies axial tension onto the pressing plate and pressure plate, e.g. a disk spring, which is actuated preferably axially through a disengaging device, wherein the prestress between the pressing plate, the friction linings and the pressure plate, and thus frictional engagement between the crankshaft 304 and gear input shaft 302a, 302b, is eliminated with a disengaged clutch. Of course, when employing a double clutch, a pressing plate can be provided for both clutches 305, 306 and a disengaging device can actuate both clutches and slipping clutch modes between an engaged and disengaged clutch can be adjusted with reduced transmittable torque. With regard to a double clutch that can be used, additionally a self-adjusting clutch can be provided, which is explained in detail and described in DE 100 17 815.4, which is hereby included in the present application with its entire content.

At least one disengaging device can be actuated automatically through an actuator. The actuator can become active electrically, hydraulically, pneumatically or in a combination of these methods, wherein, for example, an electric actuator can supply a master cylinder, which transmits the actuation impulse through a hydraulic branch to a slave cylinder, which displaces the disk spring axially by inserting a release bearing. Additionally, an electric actuator can be arranged directly around the gear input shaft 302a, 302b as a rotational drive for an axial drive, wherein one or two axial drives, which can be stacked within each other, can actuate the clutches 305, 306.

Between the gear input shafts 302a, 302b and the gear output shaft 303, the gears or gear ratio steps I, II, III, IV, V, VI, R are provided for forming a gear box 301 with six forward and one reverse gear in this case, wherein these are arranged on the gear input shafts 302a, 302b in an alternating fashion with regard to their gear ratios. The reverse gear R is arranged on the gear input shaft 302b in the depicted example, but can also be provided on the gear input shaft 302a, e.g. neighboring to the gear ratio step VI, in other embodiments. This arrangement of the gear ratio steps results in a shifting process of the gears in such a way that, for example, a gear I can be engaged on the gear input shaft 302b, the clutch 306 can be disengaged and the next gear II can already be engaged with an engaged clutch 305 while driving the vehicle via the gear input shaft 302b and the gear output shaft 303 with the gear I, and that only the clutch 305 is disengaged and the clutch 306 is engaged in the shifting torque without tractive force interruption. In order to increase driving comfort, for example, the clutches 305, 306 can be connected in an overlapping manner, i.e. that in a certain operating range both clutches 305, 306 transmit torque from the internal combustion engine to the gear output shaft 303 in a slipping operating mode.

Based on the inventive idea, an electric unit 310 is connected with the gear input shaft 302a from a drive point of view or is arranged around it in an connectable manner. In the shown examples, the rotor 309 with the rotor shaft 309a is arranged radially within the stator 311, whose housing is firmly connected with the transmission case or with another stationary component.

In the diagrammatic view, the crankshaft branch 304a—as shown here—splits through a connection forming a positive lock, such as a gear wheel connection, with a gear wheel 304b that is coaxial to the crankshaft branch 304a and two gear wheels 304c, 304d combing with it, which are each arranged coaxially on an input branch 304e, 304f for the clutches 305, 306 of the gear input shafts 302a, 302b, wherein between the gear wheels 304b, 304c or 304b, 4d the gear ratio i=1 or a gear ratio differing from i=1 can be adjusted and wherein also the gear ratios i between the gear wheels 304b, 304c and the gear wheels 304b, 304d can be different and thus have a different gear ratio (multiplication or reduction) between the gear input shafts 302a, 302b. Of course, the arrangement of the shafts 302a, 302b, 303 in one plane shown here does not necessarily prove beneficial for all transmissions of this type, but rather the shafts may require a smaller space in a spatial arrangement toward each other. Furthermore the gear input shafts 302a, 302b can be designed as shafts that are arranged around each other, wherein one gear input shaft 302a, 302b is designed as a hollow shaft in which the other one is guided. The two clutches 305, 306 separate the gear input shafts 302a, 302b from the crankshaft 304 and thus restrict the torque connection to and from the internal combustion engine in the disengaged state.

On the gear input shaft 302b the idlers 312, 313, 314, 315 are arranged in an articulating manner starting from the clutch 306 with the smallest gear ratio or largest gear reduction (gear I) in an ascending gear ratio manner for the purpose of forming the gears I, III, V, R, and the wheels are positioned through the shifting sleeves or sliding sleeves 316, 317, which engage two gears I, III or V, R, respectively, by connecting one of the idlers 312, 313 or 314, 315, respectively, in the conventional manner with the gear input shaft 302b in a stationary manner, or are in a neutral position in which no gear is engaged. The idlers 312, 313, 314, 315 comb with one of the fixed wheels 318, 319, 320, 321, respectively, which are arranged on the drive shaft 303 in a stationary manner, for the purpose of forming the gear ratios of the gears I, III, V, R, wherein for the purpose of forming the reverse gear R a reversing wheel 322 combs between the fixed wheel 321 and the idler 315 with both. The shifting sleeves 316, 317 are actuated through the end actuating mechanism 430', for example, through shifting forks, which are not shown. The gear ratio steps V, R are each equipped with a synchronizing device 325, 326. On the gear ratio steps I, III the synchronizing devices are foregone. Synchronization of the gear input shaft 302b to the speed of the gear output shaft 303 during a shifting process from the gear ratio step I to III takes place by decelerating the gear input shaft 302b through the synchronizing device 325 of the gear ratio step V. For this, the synchronizing device 325 is actuated and the gear III is engaged with the end actuating mechanism 430' after disengaging the gear I. The spatial sequence of the gear ratio steps I, III, V can be selected in accordance with the invention in such a way that the disengagement of the gear ratio step I and the engagement of the gear ratio step III takes place in the same axial direction of motion of the end actuating mechanism 323 as the deceleration of the synchronizing device 325. Of course, the gear input shaft 302b can also be synchronized accordingly during a switch from the gear ratio step II into the gear ratio step IV through an appropriate end actuating mechanism, wherein here an appropriate synchronizing device should be provided on the gear ratio step VI. The electric unit 310, as the unit that takes over the synchronization of the gear input shaft 302a, could then—but would not necessarily have to—be eliminated or could be arranged around the gear input shaft 302b. Furthermore, the reverse gear could also be assigned to the sliding sleeve 331, which engages the gear VI, wherein the sliding sleeve 317 only engages the gear V or an additional gear VII, which has a higher gear ratio than the gear VI and on which the synchronizing device in accordance with the invention would need to be installed.

On the end opposite the clutch 305 the electric unit 310 is connected with the gear input shaft 302a through its rotor shaft 309a through a positive lock in the circumferential direction, e.g. it is flanged, has axially toothing or similar. The electric unit 310 can be arranged outside the transmission casing, wherein the rotor shaft 309a or the gear input shaft 302a, which is guided outward, is sealed against the casing. Alternatively, the electric unit 310 can be incorporated in the transmission housing, wherein it may prove beneficial to encapsulate it separately.

Additionally, the even gear ratio steps or gears II, IV, VI are arranged on the gear input shaft 302a, wherein the gear II is arranged between gear I and III with regard to its gear ratio, gear IV between gear III and gear V, and gear VI as overdrive with the largest gear ratio. For the formation of the gears II, IV, VI the idlers wheels 327, 328, 329 are arranged in an articulating manner on the gear input shaft 302a and can be connected with the gear input shaft 302a in a stationary manner through the shifting sleeves 330, 331, similarly to the shifting sleeves 316, 317, wherein the shifting sleeve 330 can either shift one of the two gears II or IV or can be in a neutral position in which neither of the two gears II, IV is engaged and the shifting sleeve 331 engages the gear VI with the highest gear ratio or is in a neutral position. The idlers 327, 328, 329 comb with the same fixed wheels 318, 319, 320 as the idlers 312, 313, 314 of the gear input shaft 302b and are preferably actuated with the same end actuating mechanism 430' as the gears I, III, V. The gears II, IV, VI can be synchronized in the same manner as the gears I, III, IV of the gear input shaft 302b through synchronizing devices (not shown). Alternatively they can be eliminated, wherein a synchronization of the idlers 327, 328, 329, which are coupled to the speed of the gear output shaft 303 through the fixed wheels 318, 319, 320, occurs through the electric unit 310, which drives or decelerates the gear input shaft 302a accordingly to achieve the synchronizing speed. During down-shifting processes, for example, from the gear ratio step III to II or from IV to II, the appropriate gear input shaft 302a, 302b can be accelerated through a torque that is fed by the internal combustion engine by briefly disengaging the appropriate clutch 305, 306.

The shifting sleeves 316, 317, 330, 331 are actuated through appropriate shifting forks (not shown), which slide them axially along the gear input shafts 302a, 302b. Actuation of the shifting forks occurs automatically through one or several actuators (also not shown), for example, through electric engines and/or electric, hydraulic and/or pneumatic valves that select appropriate kinematics—such as the end actuating mechanism 430', for example. It may prove beneficial to use an actuator not for every sliding sleeve, but one actuator for the selection motion for the purpose of selecting a shifting fork for a sliding sleeve 330, 331 or 316, 317, respectively, and another actuator for the shifting motion of the selected shifting fork and thus the shifting sleeve. Furthermore it may also prove beneficial to combine the two selection actuators and the two shifting actuators into one actuator, respectively, wherein the inventive idea provides for a gear to become engaged on the one gear input shaft 302a, 302b without disengaging an engaged gear on the other gear input shaft 302b, 302a, which is also activated in the same shifting and selection arrangement.

Another beneficial embodiment can be an axial drive with an electric rotational drive, which is arranged around the shifting sleeves 316, 317, 330, 331 and thus does not require any additional devices for the transmission of motion such as rods and similar devices. Such an axial drive is described under FIG. 23 of the German application with reference number DE 100 15 205.8, which is hereby included into the present application in its entire content. Finally, the usage of a end actuating mechanism 430' with one main actuating and at least one secondary actuating element may prove particularly beneficial, as the one explained more closely in the FIGS. 23 to 35c.

The function of the double clutch transmission 301 is explained with examples based on typical operating modes such as cold starting and warm starting of the internal combustion engine, a typical upshifting process, a typical down-shifting process, up- and down-shifting process of gears arranged on a gear input shaft 302a, 302b, support function of the drive through the electric unit 310, sole driving with the electric unit 310, generator function of the electric unit 310, recuperation.

A cold starting process, for example, with outside temperatures of below 0° C., can be performed with a pulsed start in this embodiment. For this, when a forward driving motion is desired, initially both clutches 305, 306 can be engaged and the sliding sleeves 317, 330, 331 in the neutral position. The shifting sleeve 316 connects the idler 312 of the gear I in a stationary manner with the gear input shaft 302b, the first gear, i.e. gear I, is engaged. The electric unit 310 is supplied with power and reaches the specified pulse speed, e.g. 2000 to 6500 r.p.m. The pulse speed can be adjusted in a variable or fixed manner in dependence on the engine characteristics such as compression, displacement, number of cylinders and/or similar, outside temperature, oil temperature, rest period of the vehicle, viscosity of the engine and/or gear oil and/or similar. The clutch 305 is disengaged and the internal combustion engine is started. Immediately after the start, the clutch 306 is disengaged and the vehicle starts to move. The electric unit 310 then operates as a generator, the electric energy that is generated is passed on to an electric energy storage device such as an accumulator, a high current battery, a power capacitator and/or similar. Beneficial versions can include combinations of this with appropriate power electronics that is designed to store electric energy over an extended period of time in a particularly effective manner and to absorb high energy density with high efficiency quickly in a short-term storage device and release it just as quickly again. For this, particularly energy accumulator methods that use physical energy effects such as charge distribution, the build-up of electromagnetic fields and similar are suited, while for the long-term storage of electric energy especially electrochemical material conversions such as accumulators, batteries or similar can be used advantageously, wherein an energy exchange can be controlled or excluded through appropriate, e.g. diode-like, circuits, for different charge modes and tension.

In a warm starting process in a warmed-up state or at outside temperatures e.g. of above 0° C. acceleration of the electric unit 310 to the pulse speed can be eliminated and it can be started directly with disengaged clutch 305. This way, a considerably quicker start of the internal combustion engine can be accomplished. Of course, with a more powerful design of the electric unit 310, e.g. depending on the size of the internal combustion engine at a torque of 100 Nm to 250 Nm, a pulse start can be foregone as well, wherein a selection of the torque in dependence on the vehicle size and weight between 80 and 200 Nm has proven particularly beneficial for the efficient use of the electric unit 310 as a starter generator with the utilization of recuperation as well as the supportive and short-term sole operation of the vehicle.

As soon as the vehicle has started to move e.g. in gear I, the clutch 305 is engaged and the gear II is engaged through the shifting sleeve 330. In order to activate the gear during an appropriate driving situation, for example, when reaching a certain speed of the internal combustion engine, the clutch 305 is disengaged and clutch 306 is engaged. Similarly, the subsequent gears III to VI are engaged by having the subsequent gear already engaged with an engaged clutch 305 or 306 and then activating it through a torque change from one gear input shaft to the other by engaging the one clutch and closing the other clutch 305, 306. Down-shifting takes places in the reverse order. Selection of a subsequent gear can occur by evaluating the driving situation such as speed, acceleration, direction of acceleration, speed of the gear input shafts, gear output shaft, driving wheels, non-driven wheels, cross-acceleration, fuel consumption, gas pedal position, load of the vehicle, trailing load and/or similar parameters. For this it may prove beneficial to integrate a control device for the gear box 301 into an overall control device of the vehicle or to connect it with the vehicle and to evaluate the measurement parameters and characteristic lines of additional vehicle components such as sensor signals, characteristic lines of the internal combustion engine, secondary units, brake system, fuel supply system and/or similar.

In certain driving situations it may prove beneficial to perform up- and down-shifting processes where one gear that is currently used and a desired gear that is supposed to be engaged are arranged on the same gear input shaft 302*a*, such as when shifting from gear II to gear IV, from gear IV to gear VI. For this purpose, the shifting from gear II to gear IV on the gear input shaft 302*a* is explained in more detail. After acceleration of the vehicle in gear II the clutch 305 is engaged and in the meantime the clutch 306 with the engaged gear III is disengaged, which allows the speed of the internal combustion engine to be adjusted to the gear III and is thus lowered. The gear input shaft 302*a*, which in extreme cases can rotate at the nominal speed of the internal combustion engine, must be decelerated to the new synchronous speed for the gear IV. So as not to have to design possibly existing synchronous rings in an oversized manner or so as to avoid long synchronizing times in the planned synchronization by the electric unit 310 due to the poor efficiency at which the electric unit 310 runs at these speeds, synchronization can take place by decelerating the gear input shaft 302*a* by briefly disengaging the clutch 305, wherein the breaking torque of the gear input shaft 302*a* is made available by the torque of the internal combustion engine.

When down-shifting from an engaged gear to a gear on the same gear input shaft 302*a*, i.e. from gear VI to gear IV or from gear IV to gear II, for example, when the vehicle is driven at a low speed of the internal combustion engine and the driver desires quick acceleration e.g. through a kick-down actuation of the accelerator pedal, the driving torque is directed through the gear input shaft 302*b* for supplying tractive force. The procedure for this shifting mode will be explained in more detail with the example of a down-shift from gear IV to gear II. Based on the load requirement, the internal combustion engine is first accelerated to full load, and the clutch 305 is engaged only briefly for a load-free disengagement of the shifting sleeve 330 and then again disengaged partially, i.e. operated in a slipping mode so that only a portion of the torque that is made available by the internal combustion engine is directed into the clutch 305 and thus into the gear input shaft 302*a*. The clutch 305 can be operated in such a way that only a specified torque is transmitted to the gear input shaft 302*a*. At least one measured variable that can be used for controlling the clutch 305 can be the speed of the crankshaft 304, the gear input shafts 302*a*, 302*b* and/or the gear output shaft 303. Due to the limited supply of torque, the internal combustion engine increases its speed, which allows it to reach the synchronous speed for the gear III on the gear input shaft 302*a*. Initially the clutch 306 is disengaged partially, i.e. operated in a slipping mode, and the gear III is engaged through the shifting sleeve 316, while the clutch 305 is disengaged completely, wherein the internal combustion engine accelerates the gear input shaft 302*a* to the new synchronous speed of the gear II during optimal support of the electric unit 310. After this synchronous speed has been reached, the clutch 306 is disengaged completely, and the gear II is engaged through the shifting sleeve 330.

Furthermore it may prove beneficial when starting to move the vehicle in the gear I to not engage the gear II immediately, but instead keep the clutch 305 engaged and drive the electric unit 310 through this clutch of the gear input shaft 302*a* as a generator for the purpose of generating electric energy until the driver actuates the gas pedal. Since the acceleration process in the gear I is very brief, the synchronizing and shifting process should therefore be completed in a relatively short period of time, e.g. in less than 1 s, preferably in less than 0.5 s. For this, the gear input shaft 302*a* is accelerated before starting to move the vehicle with an engaged clutch 305 through the internal combustion engine that is accelerated to full load, and after starting to move the vehicle in gear I the clutch 305 is engaged immediately and the rotating gear input shaft 302*a* is delayed to the synchronizing speed of the gear II by the electric unit 310 in generator mode and/or a possibly existing synchronizing device. Of course, the vehicle does not always have to start moving in gear I, particularly in the case of heavy vehicles it may be prove beneficial to start these moving with the gear II and to use the gear I only for very steep ascending slopes or as a creeping gear. In this and other cases of special versions of double clutch transmissions, it may be advantageous to provide the electric unit on the gear input shaft with the gear with the smallest gear ratio, for example, in this transmission 301 the electric unit 310 is provided on the gear input shaft 302*a*.

When operating the vehicle under traction, the electric unit 310 can be operated as a generator for generating power, as already mentioned above. Furthermore, during thrust operation, the electric unit 310 can recuperate, i.e. gain electric energy during generator operation from the kinetic energy of the vehicle, which is directed into the gear box 301 through the gear output shaft 303. Both clutches 305, 306 can be engaged, wherein in dependence on the speed of the vehicle a suitable gear II, IV or VI can be engaged for optimal efficiency at nominal speed of the electric unit 310. Of course, it may prove beneficial not to uncouple the internal combustion engine in certain driving situations, for example, to use its towing torque, particularly when the generation of electric energy is not required, for example, with a fully charge accumulator. Furthermore the internal combustion engine can be connected e.g. in a slipping mode additionally for controlling a defined recuperating torque, such in the case of a slippery road and/or to achieve a consistent delay in ascending or descending slopes. Furthermore, in a pulling mode of the internal combustion engine, the electric unit 10 can be operated as a generator with optimal speeds near the efficiency optimum with an engaged clutch 305 and a flow of torque via the gear input shaft 302b through one of the gears II, IV, VI.

FIG. 22 shows an example of a double clutch gear box 401 with a modified arrangement of the gear step ratios I, II, III, IV, V, VI, R compared to the double clutch transmission 301 of FIG. 21 with basically the same function, wherein the electric unit (not shown) can be connected with one of the two gear input shafts 402a, 402b or one of the two gear output shafts 403a, 403b in a coupling/uncoupling manner or in a firmly interacting manner or can be foregone, wherein the functions that are described under FIG. 21 and are dependent on the electric unit are then eliminated.

In the example shown, the gear input shafts 402a, 402b are arranged coaxially around the gear input shaft 402a as hollow shafts. Guided through the clutches 405, 406 preferably outside the gear box 401 as double clutch, the gear input shafts 402a, 402b can preferably be connected with the crankshaft 404 in an internal combustion engine (not shown) by inserting a dampening device 407. The gear output shaft is split in the example shown into the two branches 403a, 403b, on which the idlers 412, 413, 414, 415 or 416, 417, respectively, are arranged through the sliding sleeves 416, 417 or 438, 431 so that they can be connected with them. In order to form the gear sets for the individual gear ratio steps, the idlers comb with the fixed wheels 427, 428 or 432, 433, 434, which are arranged on the gear input shafts 402a, 402b in a stationary manner. The gear ratio steps I and III are arranged in a meshing design between the hollow shaft shaped gear input shaft 402b and the gear output shaft 403b, the gear ratio steps V, R with the gear input shaft 402b and the gear output shaft 403a. The gear input shaft 402a is extended axially compared to the gear input shaft 402, facing away from the clutches 405, 406, on the axial expansion area the gear ratio steps IV and VI are arranged in an actively interacting manner to the gear output shaft 403, and the gear ratio step 11 is arranged in an actively interacting manner to the gear output shaft 403. Furthermore, the gear output shaft 403 holds the parking lock P. Synchronization of the gear input shafts 402a, 402b, respectively, occurs during the shifting processes on a gear input shaft 402a, 402b, respectively, through a single synchronizing device that is arranged on the appropriate gear input shaft 402a, 402b, for example, on the gear ratio step V when shifting from the gear ratio step I to III through the synchronizing device 425 or on the gear ratio step VI when shifting from the gear ratio step II to IV on the synchronizing device 426. The torque is transmitted here on the synchronizing devices 425, 426 through the idlers 415 or 417 to the fixed 434 or 428 of the gear input shafts 402a, 402b. The reverse gear R is synchronized through a synchronizing device of its own.

The shifting process of the gear ratio steps takes place through so-called end output mechanisms, parts of which are the sliding sleeves 416, 417, 438, 431 and (not shown) shifting forks that displace the sliding sleeves axially. The end output mechanisms are actuated by an end actuating mechanism, which in turn is driven through an appropriate actuator system. In a beneficial version, the end actuating mechanism 430, which is only hinted at diagrammatically in FIG. 22, has such a design that it can shift the gear ratio steps of both gear input shafts 402a, 402b through an actuator system.

FIG. 23 shows, for example, an end actuating mechanism 430, as it can be used for the transmission 401 of FIG. 22 and in an appropriate version that is adjusted to the transmission structure as end actuating mechanism 430' for the transmission 301 in FIG. 21 as well as in a version that has been appropriately adjusted to any additional transmission with a synchronizing device on the last gear. Of course, the subsequent end actuating mechanism can be beneficial for any additional type of transmission, e.g. additional types of load-shifted gear boxes or automatic transmissions with tractive force interruption for minimizing the shifting times.

The example of the end actuating mechanism 430 based on the idea of the invention in FIG. 23 consists of a control shaft 462 that is actuated by an actuator system (not shown) and of the meshing means 423a, 423b, 423c, 423d. The meshing means are main actuating elements such as shifting fingers 423a, 423c and secondary actuating elements such as double cams 423b, 423d. The shifting finger 423c is covered by the control shaft 462 and therefore only hinted at in this figure. The meshing means interact with appropriate end output mechanisms 420, which are formed by a shifting sleeve 416, 417, 438, 431 and a shifting fork 465, 466, 467, 468 that interacts with it. In relation to the transmission 401 in FIG. 22, the following allocation applies: The shifting fork 465 with the sliding sleeve 416 actuates the gear ratio steps I and III, the shifting fork 466 with the sliding sleeve 417 actuates the gear steps IV and VI, the shifting fork 468 with the sliding sleeve 438 actuates the gear ratio steps V and R, and the shifting fork 467 with the sliding sleeve 431 actuates the gear ratio step II. Furthermore the shifting fork 467 can engage a gear VII (not shown) that is additionally arranged on the sliding sleeve 431, which could then take over the synchronizing device from gear VI as the largest gear. The shifting forks 465, 466, 467, 468 are arranged on shaft 469 in an axially displaceable manner, the openings 450 of the end areas 453 of the shifting forks 465, 466, 467, 468 are designed so as to interact with the respective main actuating element such as shifting fingers 423a, 423c and/or the secondary actuating element such as double cams 423b, 423d. For this, first partial areas 451 are provided for connection with a shifting finger 423a, 423c and second partial areas 452 for connection with a double cam 423b, 423d. For the purpose of engaging a gear ratio step, one of the shifting fingers 423a, 423c interacts with the partial areas 451 of the appropriate shifting fork 465, 466, 467 or 468 by displacing the control shaft 462 in axial direction, wherein the shifting finger 423b interacts with a partial area 450. By rotating the control shaft 462, the shifting finger 423a, 423c swivels, thus displacing the respective shifting fork 465, 466, 467 or 468, in whose opening 450 the shifting finger 423a or 423c—it is only one shifting finger, respectively that interacts with the partial areas 451—is located, on the shaft 469 and therefore also the appropriate sliding sleeve 416, 417, 438 or 431 and thus engaging the appropriate gear ratio step.

At the same time, the double cams 423b, 423d have interacted with the corresponding areas 452 of all other end output mechanisms 420 that are allocated to the same gear input shaft (402a, 402b in FIG. 22) during the axial displacement process of the control shaft 462 so that these gear step ratios are disengaged upon rotation of the control shaft 462. Synchronizing a shifting process from the gear ratio step I to the gear ratio step III takes place as follows, while taking the transmission 401 of FIG. 22 in a shifting example from gear I to gear III into consideration: the gear that currently transmits torque is gear II, the clutch 405 is disengaged, the clutch 406 is engaged, gear I is still engaged. With the shifting finger 423c the opening 450 of the shifting fork 468 is selected and brought into interaction with the partial area 451c, wherein the double cam 423b enters into interaction with the partial area 452a of the shifting fork 465 of the gear pair I/III. A rotation of the control shaft 462 initially causes the gear I to be disengaged due to the offset angle of the shifting finger 423c to the double cam 423b and then causes the gear input shaft to be decelerated through the synchronizing device 425 (FIG. 22) on gear V. Upon reaching the synchronizing speed or a tolerable synchronizing speed range, the control shaft 462 is rotated in the neutral position direction and displaced axially so that the shifting finger 423a interacts with the partial area 451 of the shifting fork and is again rotated for engaging the gear III. Shifting from gear II to gear IV takes place accordingly by decelerating first the synchronizing device 426 (FIG. 22) of the gear ratio step VI through the shifting finger's 423a interaction with the partial area 451b of the shifting fork 466 and then disengaging gear II through the double cam 423d, which has an interactive connection with the partial area 452d. A rotation of the gear selector rod 462 affects a displacement of the sliding sleeve 466 and thus the engagement of the gear IV.

The time sequence of the meshing of the main actuating element 423a, 423c in relation to the individual secondary actuating elements 423b, 423d depends on the time-related activation of the contact between the areas 451 and the shifting fingers 423a, 423c on one hand and between the double cams 423b, 423d and the areas 452 on the other hand during rotation of the control shaft 462 so that e.g. an offset angle provided between the parts 423a, 423c and 423b, 423d and/or an expansion of one of the parts 423a, 423b, 423c, 423d in circumferential direction around the axis of the control shaft 462 can affect the time sequence of manipulations, for example, a time delay between disengagement of the active gear ratio step, synchronization of the new gear ratio step that is to be engaged and engagement of the new gear ratio step.

FIG. 24a shows a diagrammatic view and an example of a vehicle 501, where the invention can be applied in a particularly beneficial manner. The clutch 504 in this case is arranged in the power distribution flow between the driving motor 502 and transmission device 506; it is useful to arrange a split centrifugal mass between the driving motor 502 and the clutch 504, whose partial masses can be rotated against each other while connecting a spring-dampening device, which improves particularly vibration-related properties of the drive branch considerably. The invention is preferably combined with a dampening device for absorbing or compensating rotational thrusts or a device for compensating or reducing rotational thrusts or a device for dampening oscillation, as described particularly in the publications DE OS 34 18 671, DE OS 34 11 092, DE OS 34 11 239, DE OS 36 30 398, DE OS 36 28 774 and DE OS 37 21 712 by the applicant, whose disclosures are also part of the disclosure content of the present invention.

The vehicle 501 is driven by a driving motor 502 such as an internal combustion engine, which in this case is shown as an Otto or Diesel engine; in another example, it can also be driven by hybrid drives, electric motor or hydraulic engine. The clutch 504 in the example shown is a friction clutch through which the driving motor 502 can be separated from the transmission device 506, particularly for starting to move the vehicle or performing shifting processes. By increasing the engagement or disengagement of the clutch, more or less torque is transmitted; for this, a pressing plate and a pressure plate are shifted relative against each in an axial manner, pulling a connected friction disk more or less along. The clutch 504 is beneficially a self-adjusting clutch, i.e. the wear of the friction linings is balanced so that a consistent low disengagement force is ensured. The invention is preferably combined with a friction clutch, especially as it is described in the applications DE OS 42 39 291, DE OS 42 39 289 and DE OS 43 06 505 by the applicant, whose disclosures are also part of the disclosure content of the present application.

The wheels 512 of the vehicle 501 are driven via a differential 510 through a shaft 508. The driven wheels 512 are allocated speed sensors 560, 561, wherein possibly also only one speed sensor 560 or 561 can be provided, generating a signal based on the speed of the wheels 512; additionally or alternatively, a sensor 552 is provided in a different suitable area in the drive branch, for example, on the shaft 508, for determining the gear output speed. The gear input speed can be determined with an additional sensor or also, as is the case in the present example, from the driving motor speed, e.g. the gear ratio adjusted in the transmission can be determined.

Actuation of the friction clutch 504, which is beneficially engaged, but can also be released in another useful embodiment, occurs in this case through an actuating device 546, such as a clutch actuator. For the purpose of actuating the transmission 506, an actuating device that comprises two actuators 548 and 550 is provided, wherein one of the actuators performs a selection actuation and the other a shifting actuation. The clutch actuator 546 has the design of an electro-hydraulic system, wherein an engagement or disengagement motion is generated through an electric drive, e.g. through an electric direct current motor and transmitted to the disengaging system through a hydraulic branch. The transmission actuators 548, 550 have the design of electric drives, e.g. electric d.c. motors, which are connected with the moving sections that are actuated for establishing the gear ratio in the transmission 506 through kinematics. In another example, particularly when large actuating forces are required, it may also prove very beneficial to provide a hydraulic system for actuation.

Control of the clutches 504 and the transmission 506 occurs through a control device 544, which beneficially forms a modular unit with the clutch actuator 546, wherein it may also be advantageous in another embodiment to attach it in a different location in the vehicle. Actuation of the clutch 504 and transmission 506 can occur automatically in an automatic operating mode through the control unit 544, or in a manual operating mode through input by the driver through a driver input device 570, such as a shift lever, wherein the input is recorded through a sensor 571. In the automatic operating mode, gear ratio step switches are performed through appropriate selection of the actuators 546, 548 and 550 based on characteristic lines, which are stored in a storage unit that is assigned to the control device 544. A multitude of driving programs that are established by at least one characteristic line is available from which the driver can make his selection, such as a sporty driving program where the driving motor 502 is operated in a performance optimized manner, an economy program where the driving motor 502 is operated in a consumption optimized manner, or a winter program where the vehicle 501 is operated in a safety optimized manner; furthermore, in the described example characteristic lines can be adjusted e.g. to the driver's behavior and/or other marginal conditions such as track surface friction, outside temperature and similar.

A control device 518 controls the driving motor 502 by influencing the mixture or composition that is fed, wherein in the figure a representative throttle valve 522 is shown, whose angle is recorded by an angle transmitter and whose signal is available to the control device 518. In other examples of the driving motor control system, the control device 518—if it is an internal combustion engine—receives an appropriate signal, based on which the mixture composition and/or the appropriate volume can be determined; it is also useful to use the signal of an existing lambda probe. Furthermore, in the present example the control device 518 receives a signal from a load lever 514 that is actuated by the driver and whose position is recorded by a sensor 516, a signal about the engine speed, generated by a speed sensor 528 that is allocated to the engine output shaft, a signal of a suction pipe pressure sensor 526 as well as a signal of a cooling water temperature sensor 524.

The control devices 518 and 544 can be incorporated in separate spatial and/or functional partial areas; then it is useful to connect them with each other e.g. through a CAN bus 554 or another electric connection for data exchange. It may also prove beneficial, however, to combine the areas of the control devices, particularly since the functions cannot always be allocated clearly and interaction is required. In particular, during certain phases of the gear ratio step switch the control device 544 can control the driving motor 502 with regard to the speed and/or torque.

Both the clutch actuator 546 and the transmission actuators 548 and 550 generate signals, from which an actuator position can at least be deduced, which are available to the control device 544. The process of determining the position takes place in this example within the actuator, wherein an incremental sensor is used, which determines the actuator position in relation to a reference point. In another embodiment, it may also prove useful to arrange the sensor outside the actuator and/or provide an absolute position determination, for example, through a potentiometer. Determining the actuator position is of particular importance with regard to the clutch actuator because this way the point where the clutch 504 grabs can now be allocated to a certain engagement branch and thus actuator position. The grabbing point of the clutch 504 is beneficially re-determined repeatedly during start-up and operation, particularly in dependence of parameters such as clutch wear, clutch temperature and similar. Determining the transmission actuator position is important with regard to determining the engaged gear ratio.

Additionally, signals from speed sensor 562 and 563 of the non-driven wheels 565 and 566 are available to the control device 544. In order to determine a vehicle speed, it may be useful to include the average value of the speed sensors 562 and 563 or 560 and 561 in order to compensate speed differences e.g. when driving around curves. Through the speed signals the vehicle speed can be determined and beyond that a slipping determination can be performed. In the figure, output connections of the control devices are shown as solid lines, input connections as dotted lines. The connection of the sensors 561, 562 and 563 to the control device is only hinted at.

Even on a vehicle with a drive branch as the one shown in diagrammatic view in the example in FIG. 24b, the present invention can be applied particularly beneficially. On such a vehicle it is possible to change gear ratio steps without tractive force interruption. Two branches 1110 and 1120 are formed between the driving motor 1010 and output 1100, via which the torque flow can occur; each of the branches is allocated to a clutch 1020 or 1030 and can be integrated through it in the torque flow. Depicted is a preferred embodiment, where the clutches 1020 and 1030 are arranged between the driving motor 1010 and gear ratio steps 1040 or 1050. In another example, it may also prove useful to arrange one or both clutches 1020 and/or 1030 between the gear ratio steps 1040, 1050 and the output 1100.

By actuating the clutches 1020 or 1030 during the switch, a continuous change of the torque flow from one branch to the other can be achieved. Two groups 1040 and 1050 of gear ratio steps are available, which are surrounded by one of the branches 1110 or 1120, respectively, wherein gear ratio steps between which a tractive force uninterrupted switch is supposed to be possible belong to different groups. Subsequent gear ratio steps with regard to their gear ratios preferably belong to different groups, for example, the gears I, III and V form a group 1040 and the gears II, IV and possibly VI form a group 1050; the reverse gear R is allocated to the group 1050 in a useful version. In other examples, however, it may also prove advantageous to divide the gear ratio steps differently in groups or if certain gear ratio steps can be used both in one group 1040 and in the other group 1050 or are available in both groups.

The clutches 1030 and 1020 as well as the gear ratio steps of the groups 1040 and 1050 can be actuated automatically as well, as in the example shown and described in FIG. 24a. For this purpose, clutch actuators 1060 and 1070 are shown for actuating the clutches 1020 and 1030. In another example, however, it may also be very useful to use only one clutch disk for actuating both clutches.

In the figure, actuating devices 1080 and 1090 are also shown, for the purpose of actuating the gear ratio steps of the groups 1040 and 1050. One example, however, which is only equipped with one actuating device for actuating the gear ratio steps of both groups 1040 and 1050 is particularly beneficial. An actuation comprises a selection drive and a shifting drive. With regard to further details of the clutch and transmission actuation as well as the control system we would like to refer to FIG. 1a with the appropriate description.

Furthermore the present invention can be applied on a vehicle whose drive branch comprises a secondary branch parallel to the main branch, through which the driving torque is transmitted during a shifting process in the main branch. Such transmissions have become known in various embodiments as tractive force uninterrupted shifting gear boxes.

FIG. 25 shows end output mechanism with end actuating mechanism in accordance with a particularly preferred example in accordance with the invention in an application of a vehicle as the one shown and described in FIG. 24a. The end output mechanisms are formed by a clutch sleeve 601, 602, 603, 604 and a shifting fork 605, 606, 607, 608, respectively, that is connected with it. A group of gear ratio steps is actuated through the end output elements 601 and 604, such as clutch sleeves, the other group of gear ratio steps is actuated through the end output elements 602 and 603. The end actuating mechanism is equipped with main and secondary actuating elements for the purpose of its connection with the end output mechanisms of both groups. A first main actuating element 611 and an additional main actuating element, which in this view is not visible, are suitable for engaging gear ratio steps; secondary actuating elements 616, 613 ensure that all other gear ratio steps of the same group, respectively, are disengaged. The shifting forks 605, 606, 607, 608 are arranged on shaft 609 in an axially displaceable manner, their shifting fork mouths are designed so as to connect with a main actuating element, respectively, such as shifting fingers 611, or an secondary actuating element, such as double cams 613, 616. For this, first partial areas 614 are provided for connection with a shifting finger 611 and second partial areas 614 for connection with a double cam 613. In order to engage a gear ratio step, for example, the shifting finger 611 interacts with the end area 610 of the appropriate shifting fork 605 or 606 by displacing the control shaft 612 in axial direction. At the same time, the double cam 613 interacts with the appropriate shifting fork 607 or 608, which belongs to the same group of gear ratio steps. A rotation of the control shaft 612 swivels the shifting finger 611, thus displacing the shifting fork 605 or 606 on the shaft 609 and therefore also the appropriate clutch sleeve 601 or 602 and engaging the appropriate gear ratio step. Simultaneously, the rotation of the double cam 613 causes the affected gear ratio step to be disengaged, if one was engaged.

If it is a transmission with a clutch and a drive branch, as shown in FIG. 24*a*, secondary actuating elements interact with all other end output mechanisms, respectively, when a main actuating element interacts with a first end output mechanism. In the case of a double clutch transmission with two parallel transmission branches, secondary actuating mechanisms interact with all other end output mechanisms of a branch, respectively, when a main actuating element interacts with a first end output mechanism of this branch; this way, only one gear ratio step can be engaged in one branch at any time, however it is possible to engage one gear ratio step in each branch simultaneously.

FIGS. 26*a*, 26*b*, 26*c*, 26*d* show the function of an secondary actuating element in more detail. Starting in FIG. 26*a*, in which the gear ratio step belonging to the shifting fork 701 is engaged and the secondary actuating element is interacting with the shifting fork 701 through axial displacement of the control shaft, the control shaft 703 is rotated so that the end area 702 of the double cam—see 613 in FIG. 25—is pressed against the taper 701*a* and thus a force is generated in the disengagement direction that is larger than or equal to the required disengagement force, thus causing a disengagement motion, as shown in FIGS. 26*b* and 26*c*. In FIG. 26*d*, the gear ratio step is completely disengaged, and the control shaft 703 can be rotated freely without power being transferred to the shifting fork 701 in engagement or disengagement direction, wherein the double cam rotates within the circle limited by 701*b*. The state shown in FIG. 26*d* also predominates when no gear ratio step of the affected shifting fork 701 has been engaged from the beginning. The secondary actuating element can be rotated freely within the circle limited by 701*b*.

Similar to the above described disengagement process disengagement occurs when the other gear ratio step that has been actuated through the same shifting fork is engaged. In FIG. 26*a*, the shifting fork 701 would then be displaced to the right at the beginning in relation to the control shaft 703, and the effect would occur between the cam 702*a* and the taper 701*c*. Disengagement takes place for both gear ratio steps belonging to the shifting fork 701 and for both rotational directions of the control shaft 703.

Engagement or disengagement of an old or new gear step ratio upon rotation of the control shaft is shown in FIG. 27. First, the old gear ratio step is disengaged through the double cam, see solid line; upon further rotation, the new gear ratio step is engaged, see dotted line. This clarifies the closeness with regard to time at which the disengagement and engagement of the gear ratio steps, and which may even overlap slightly, which is enabled by allowing the main actuating element and the secondary actuating elements to mesh simultaneously with the respective shifting forks and by swiveling both actuating elements upon rotation of the control shaft. The delay between the disengagement motion of the clutch sleeve of the old gear ratio step and the engagement motion of the new gear ratio step is largely determined by the play of the main actuating element in the shifting fork mouth, the design of the double cams and the relative angular arrangement of the main and secondary actuating elements on the control shaft—see also FIG. 28*a*. Particularly preferred, due to its symmetry, is an arrangement where the axis of the double cam from tip 803*a* to tip 803*b* rests vertically on the axis of the control finger 802. It may however also prove useful if these axes are not vertical to each other, particularly when a shifting fork must be actuated that shifts only one gear ratio step.

FIGS. 28*a* and 28*b* show an arrangement of a main actuating element 802 and an secondary element 803 on a control shaft 801. Shifting fingers and appropriate double cams are located axially on the control shaft axis at a distance so that they interact with shifting forks that are allocated to the same transmission branch when the control shaft is displaced appropriately in axial direction so that during a subsequent rotation of the control shaft the affected gear ratio steps can be actuated simultaneously. From a radial point of view, the axes of the shifting fingers 802 and the double cam 803 with the end areas 803*a* and 803*b* have a normal position toward each other in the depicted preferred example. Another arrangement is shown in FIGS. 29*a* and 29*b*. Two double cams 903 and 904 with their end areas 903*a*, 903*b*, 904*a* and 904*b* are arranged next to a shifting finger 902 on the control shaft 901. In this example as well, the axes of the shifting finger 902 and the double cam 903, 904 have normal positions toward each other. The double cams 903, 904 have a particularly wide design so that they can interact with two shifting forks, respectively. This way, each of the double cams 903, 904 can actuate two shifting forks for disengaging the appropriate gear ratio steps. In another example, it may also prove very beneficial to combine such wide double cams with simple double cams. It may also be useful to further widen one double cam in order to actuate more than two shifting forks simultaneously. The usage of particularly wide secondary actuating elements should always be preferred when end output mechanisms are supposed to be actuated whose shifting forks are located next to each other.

FIG. 30 shows examples of beneficial versions of secondary actuating elements. The double cam described so far is marked 'a.' Both the cam end areas and the corresponding recesses 1603 have a wedge-shaped design. As an example, one cam 1604 will be described. Depicted are two tapered functional areas 1601*a* and 1601*b*, the cam end area 1602 is rounded. In a preferred example, the areas 1601*a* and 1701*b* enclose an angle of 40° to 45°, with the angle being selected accordingly larger if the force that is required to disengage the gear ratio step that is to be actuated is larger. The shape of the cam largely determines the course of the disengagement force that is generated for a disengagement motion upon rotation of the control shaft. In another example, the shape of the cam is therefore adjusted to the necessary force line that occurs during disengagement. The recess 1603 that corresponds to the cam encloses a slightly larger angle with the areas that limit it than the angle of the cam. The design of the recess depends on the shape of the cam since interaction between cam and recess is decisive.

Combinations with a wedge-shaped and a rectangular-shaped corresponding part are shown in variations b and d. In variation b, the rotating secondary actuating element is equipped with rectangular recesses 1606, which interact with wedge-shaped cams 1607 of the displaceable shifting fork; in variation d, the displaceable shifting fork is equipped with rectangular recesses 1608, which interact with wedge-shaped cams 1609 of the rotating secondary actuating element. Variation e shows just like variation a two wedge-shaped corresponding parts, wherein here however the rotating secondary actuating element 1611 is equipped with the cam 1614. Two rectangular corresponding parts 1612, 1613 are shown in variation c.

The variations shown vary the idea of a wedge shape and a rectangular shape with recess or cam on the actuating element that can be rotated with the control shaft or the displaceable end actuating mechanism.

The control shaft position and H-figure are shown in FIG. 31. The example relates to a double clutch transmission where the gear I, III, V and VII form a group that is allocated to a clutch, and the gears II, IV, VI as well as the reverse gear R form another-group that is allocated to the other clutch. Picture a shows the engagement process of the gear I. Since only one gear of one group can be engaged at a time, the gears III, V and VI must be disengaged when shifting into the gear I. Gear III is actuated by the same shifting clutch as gear I, i.e. it cannot be engaged at the same time anyhow. Upon axial displacement of the control shaft 1705 for the purpose of connecting the shifting finger 1703 with the shifting fork belonging to the gear I, the secondary actuating element 1704 interacts simultaneously with the shifting fork belonging to gears V and VII. The rotation of the control shaft 1705 for the purpose of engaging the gear I causes the gears V or VII to be disengaged. Picture b shows the engagement process of gear II, where the secondary actuating element 1704 disengages the gears VI and/or R. Upon engaging gear V through the shifting finger 1701, the gears I and/or III are disengaged through the secondary actuating element 1702, see picture c.

Picture d shows the engagement process of the gear VI, wherein the gears II and/or IV are disengaged.

FIGS. 32*a* and 32*b* show the function of a wide cam described in FIGS. 29*a* and 29*b*. Upon engaging e.g. the gear II—see 32*a*—the gear III, IV, V and/or R are simultaneously disengaged, upon engaging the reverse—see FIG. 32*b*—the gear I, II, III and/or IV are simultaneously disengaged.

FIG. 33*a* shows an example of the invention for application on a conventional automatic or manual transmission, which at the same time is also a particularly preferred embodiment. Although only one shifting fork 1080 is shown, the described gear box is equipped with several shifting forks. The shifting forks 1080 of such a transmission are equipped with a meshing area 1082*a* for the meshing of a shifting finger 1082*b* as well as with two legs 1083*a*. The legs 1082*b* together form an arc, whose diameter at least roughly corresponds to the diameter of a bushing-shaped actuating element 1081 that is installed between the arc-shaped legs 1083*a*. During operation the bushing-shaped actuating element 1081 can be rotated e.g. through a manually actuated or through an actuator-actuated shifting rod and is axially displaceable in certain positions. Through the axial displacement of the bushing-shaped actuating element 1081 a shifting finger 1082*b* can interact with the actuating area 1082*a* of the desired shifting fork so that a subsequent rotation of the bushing-shaped actuating element 1081 causes a swiveling motion of the shifting finger 1082*b* and thus a displacement of the shifting fork 1080. The rotation is enabled because notches 1083*b*, with which the leg ends 1083*a* can mesh upon a rotational motion, are provided in the sleeve of the actuating element 1081. As already described above, additional shifting forks are incorporated axially in the transmission at a distance from each other with regard to the bushing-shaped actuating element 1081. These shifting forks are also equipped with arc-shaped legs, into which the bushing-shaped actuating element 1081 is inserted. Since no notches like 1083*b* exist in the bushing-shaped actuating element 1081 axially at the height of these additional shifting forks, these shifting forks are fixed in their mean position in accordance with the neutral position. This way, an actuating mechanism is connected particularly effectively with a locking device of the remaining shifting forks in neutral position for actuation of the desired shifting fork. The connection of the sleeve of the actuating element 1081 with an actuating rod (not shown here) takes place, for example, through bushing-shaped elements 1084. The shifting finger 1082*b* is beneficially connected with the sleeve through a very firm connection. Particularly suited for this are welding or gluing procedures. Alternatively or in combination with this, the shifting finger 1082*b* can be connected with the sleeve mechanically to a positive lock.

FIG. 33*b* shows the sleeve 1090 of the actuating element 1081 more closely. In a particularly preferred version, the sleeve is made from a tube piece, into which recesses 1091 and 1092 are incorporated e.g. in a machining process or also through a cutting technique such as laser cutting or flame cutting. In their basic shape, the recesses 1091 and 1092 correspond at least roughly to the cross-section of the shifting fork leg 1083*a*, however they are slightly expanded particularly in circumferential direction in order to enable the displacement of the shifting fork 1080. It is also beneficial to manufactured the sleeve from flat sheet metal, which is then rolled, wherein the axial clearance that is formed can remain open in the case of sufficient firmness of the material or can be closed, e.g. welded. The recesses 1091 and 1092 are manufactured e.g. through punching, in the case of a flat state of the sheet metal.

FIG. 34*a* shows an example of the invention for application on an automatic transmission as described further above in detail, which at the same time is a particularly preferred embodiment. The shifting fork 1480 is equipped with a first functional area 1482*a* for the meshing of a shifting finger 1482*b*, which is expanded so much that a large enough selection branch remains even after engagement of a gear ratio step by displacing the shifting fork 1480 in order to interact with the first functional area of an additional shifting fork. When a gear ratio step of this additional shifting fork is engaged, the old gear ratio step should be disengaged at the same time, for which second functional areas 1483*a* are provided on the shifting fork, which interact with the appropriate recesses 1483*b*. Upon rotating the actuating element 1481, the shifting fork is shifted into its neutral position and the disengagement force is transmitted by the side areas of the recess 1483*b*, which is formed by an appropriate bent piece of sheet metal, to the wedge-shaped second functional area of the shifting fork. The actuating element 1181 is formed, for example, by a bushing-shaped element 1484 and side elements 1485*a* and 1485*b,* preferable made from sheet metal, that are connected with it, whose end areas have such a design as to form the desired functional areas; additionally, the shifting finger 1482*b* is connected with the side element 1485*b,* wherein this connection can occur like the connection of the shifting finger in FIG. 33*a.* FIG. 34*a* furthermore clarifies that the shifting finger 1482*b*—the main actuating element —and the recesses 1483*b*—the secondary actuating elements—are arranged axially on the axis of the actuating element 1481 at a distance from each other in such a way that the shifting finger 1482*b* can interact with a shifting fork and the recess 1483*b* with an additional shifting fork at the same time. During a (shifting) actuation, both shifting forks are actuated simultaneously so that a gear ratio step is engaged and at the same time another one is disengaged and/or it is ensured that the neutral position predominates. This figure describes only one example of a special embodiment, the entire function was already shown in previous figures so that representatively only one element with a main and an secondary actuating element is shown.

The side element 1485*b* from FIG. 34*a* is shown more closely in FIG. 34*b.* The element has been manufactured from sheet metal, preferably in a punching process. The center area 1489 is widened compared to the end areas 1486, which results in special stability in the area of the shifting finger 1488; additionally, the end areas 1487 are easily malleable. The bent ends 1487 form the counter-piece to the second functional area 1483*b* of the shifting fork.

The bushing-shaped element 1484 from FIG. 34*a* is shown in more detail in FIG. 34*c.* The element is preferably manufactured in two pieces from a tube piece 1085 and a punched sheet metal collar 1086 that is connected with it, which is bent into the depicted shape through a forming process. In another example, the entire element is a single piece. The collar is then shaped in the depicted manner from a tube piece in a forming process. The two side areas 1088 and 1089 of the recesses 1087 for the meshing of the second functional areas 1483*a* of the shifting fork 1480 (FIG. 34*a*) have different designs. Only the side area 1089 relevant for the function has the bent end area.

FIG. 35*a* shows an example of the invention for application on a double clutch transmission, which is described in detail further above, which at the same time is a particularly preferred embodiment. The bushing-shaped element 1281 consists of two interior bushings 1285, which are arranged in such a manner to each other that their collars face away from each other. They carry the two side areas 1285, of which one comprises a shifting finger 1282*b* that can interact with the first functional areas 1282. The grooves or slots 1283*b* provided in the element 1281 are suited to interact with second functional areas 1283*a* in order to secure the neutral position of a shifting fork, as already described above. These slots—in the picture shown one each of every side of the shifting finger—are arranged along the axial sleeve shape of the element 1281 at a distance from the shifting finger 1282*b* in such a manner that they and the shifting finger 1282*b* can interact simultaneously with the desired shifting forks. Recesses or grooves 1284 are provided at the same axial height of the shifting finger 1282*b,* which provide space for the second functional areas 1283*a* of the same shifting fork during a shifting motion in accordance with a rotation of the element 1281 for the purpose of actuating a shifting fork so that an unimpaired shifting motion is enabled.

A side element 1296 from FIG. 35*a* is shown in more detail in FIG. 35*b.* The element is manufactured from sheet metal, preferably in a punching process. The picture shows an element with shifting finger 1288. In the flat state, the grooves are e.g. punched, and in a subsequent process the element 1287 is bent into the desired radius and equipped with crimps 1290.

The patent claims submitted with the application are formulation suggestions without priority for achieving further patent protection. The applicant reserves the right to claim additional combinations of features that have so far only been revealed in the description and/or drawings.

References made in sub-claims refer to the further development of the object of the main claim through features of the respective sub-claim; they should not be understood as a waiver for achieving autonomous protection of the object for combinations of features of the referred sub-claims.

Since the objects of the sub-claims can form autonomous and independent inventions with regard to the state of the art on the priority day, the applicant reserves the right to make them the object of independent claims or partial declarations. Furthermore, they may also contain autonomous inventions, which have a design that is independent from the objects of the previous sub-claims.

The examples should not be interpreted as a limitation to the invention. Within the framework of the present disclosure numerous changes and modifications are possible, particularly such variations, elements and combinations and/or materials that can be deduced by an expert with regard to the solution of the task, for example, through the combination or modification of individual features or elements or procedural steps that are described in connection with the general description and embodiments as well as the claims and contained in the drawings and that can lead to a new object or new procedural steps or procedural step sequences through combined features, also as they relate to manufacturing, testing and processing methods.

What is claimed is:

1. A transmission for a motor vehicle, the transmission having multiple shafts including a first, at least single-piece and a second, at least single-piece transmission input shaft and at least one transmission output shaft, said transmission comprising:
  a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input shafts;
  b) at least one transmission input shaft driven by a drive unit having a drive shaft;
  c) at least one transmission input shaft operatively connected with a first electrical machine;
  d) wherein the transmission output shaft is operatively connected with at least one driving wheel; and
  e) wherein at least one gear stage is actuated automatically by at least one actuator, and including a synchronizing device for synchronously coupling idlers to one of a transmission input shaft and a transmission output shaft to synchronize the r.p.m. of the idler and the shaft carrying the idler.

2. A transmission in accordance with claim 1, wherein the drive unit is an internal combustion engine.

3. A transmission in accordance with claim 1, wherein the drive unit is a second electrical machine.

4. A transmission in accordance with claim 3, wherein the electrical machines each drive a respective transmission input shaft.

5. A transmission in accordance with claim 4, wherein the electrical machines each have substantially the same dimensions.

6. A transmission in accordance with claim 1, including at least one clutch for operatively connecting the drive unit with at least one transmission Input shaft.

7. A transmission In accordance with claim 1, including a pair of clutches for operatively connecting the drive unit with a respective one of the transmission input shafts.

8. A transmission in accordance with claim 7, wherein at least one clutch is a friction clutch.

9. A transmission in accordance with claim 7, wherein the clutches are formed as a double-clutch that is positioned outside the transmission.

10. A transmission in accordance with claim 7, wherein at least one clutch is a shifting clutch.

11. A transmission in accordance with claim 1, including means for uncoupling the first electrical machine from the first transmission input shaft.

12. A transmission in accordance with claim 1, including means for selectively coupling the first electrical machine with one of the first transmission input shaft and the second transmission input shaft.

13. A transmission in accordance with claim 1, wherein the means for selectively coupling is an actuator selected from the group consisting of electric, hydraulic, and pneumatic actuators, and combinations thereof.

14. A transmission in accordance with claim 1, wherein the transmission output shaft is arranged substantially coaxially to the drive shaft.

15. A transmission in accordance with claim 1, wherein at least one transmission input shaft is arranged substantially coaxially to the drive shaft.

16. A transmission in accordance with claim 15, wherein one transmission input shaft is a hollow shaft that surrounds the other transmission input shaft.

17. A transmission in accordance with claim 1, wherein the first electrical machine is arranged around the transmission output shaft and is operatively connected to one of the transmission input shafts to cause the one input shaft to rotate.

18. A transmission for a motor vehicle, the transmission having multiple shafts including a first, at least single-piece and a second, at least single-piece transmission input shaft and at least one transmission output shaft, said transmission comprising:
   a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input shafts;
   b) at least one transmission input shaft driven by a drive unit having a drive shaft;
   c) at least one transmission input shaft operatively connected with a first electrical machine;
   d) wherein the transmission output shaft is operatively connected with at least one driving wheel; and
   e) wherein at least one gear stage is actuated automatically by at least one actuator, and wherein the transmission includes two transmission output shafts and two transmission input shafts, and wherein at least some of one group of gears between the first transmission output shaft and one of the transmission input shafts, and at least some of a second group of gears positioned between the second transmission output shaft and one of the two transmission input shafts are shiftable and the electrical machine is operatively connected to at least one of the transmission output shafts.

19. A transmission in accordance with claim 1, wherein gear pairs that form individual gear stages are arranged alternating on the two transmission input shafts to provide different gear ratios.

20. A transmission in accordance with claim 19, wherein the transmission includes at least four separate forward speeds with a gear stage with the smallest gear ratio arranged on one transmission input shaft and intermediate gear stages and a gear stage with the largest gear ratio arranged on the other transmission input shaft.

21. A transmission in accordance with claim 1, wherein each of the idlers is carried on at least one transmission output shaft.

22. A transmission in accordance with claim 1, wherein the synchronization device couples at least one idler to the shaft that holds the idler by an electrical machine.

23. A transmission in accordance with claim 1, wherein the first electrical machine is arranged on an end of the transmission input shaft that is located opposite the drive unit.

24. A transmission in accordance with claim 6, wherein the first electrical machine is arranged around at least one clutch.

25. A transmission in accordance with claim 1, wherein the first electrical machine includes a rotor shaft that is arranged substantially parallel to a transmission input shaft with which the electrical machine is drivingly connected.

26. A transmission in accordance with claim 1, wherein at least one accessory unit is drivingly connected with the first electrical machine.

27. A transmission in accordance with claim 26, wherein the transmission includes a coupling for uncoupling the accessory unit from the first electrical machine.

28. A transmission in accordance with claim 26, wherein the accessory unit is drivingly connected with the first electrical machine by a gear drive.

29. A transmission in accordance with claim 28, wherein the gear ratio for the gear drive that drives the accessory unit is variable.

30. A transmission in accordance with claim 1, including a torsional vibration damping device positioned in the power distribution flow between the drive shaft and the transmission input shafts.

31. A transmission for a motor vehicle, the transmission having multiple shafts including a first, at least single-piece and a second, at least single-piece transmission input shaft and at least one transmission output shaft, said transmission comprising:
   a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input
   b) at least one transmission input shaft driven by a drive unit having a drive shaft;
   c) at least one transmission input shaft operatively connected with a first electrical machine;
   d) wherein the transmission output shaft is operatively connected with at least one driving wheel; and e) wherein at least one pear stage is actuated automatically by at least one actuator, and including a torsional vibration damping device positioned in the power distribution flow between the drive shaft and the transmission input shafts, wherein the torsional vibration damping device is a two-mass flywheel.

32. A transmission in accordance with claim 6, wherein a clutch disk included in at least one of the clutches includes at least one one-step torsional vibration damping device.

33. A transmission in accordance with claim 1, wherein the connection between the drive shaft and at least one transmission input shaft is a variable gear ratio drive connection.

34. A transmission in accordance with claim 6, wherein at least one of the clutches can be controlled automatically in dependence of the driving situation.

35. A transmission in accordance with claim 34, wherein control of at least one clutch and shifting of at least one gear is effected by at least one actuator.

36. A transmission in accordance with claim 35, wherein the at least one actuator is selected from the group consisting of electrical, hydraulic, and pneumatic actuators, or a combination thereof.

37. A transmission in accordance with claim 35, wherein the at least one actuator axially operates one sliding sleeve for two neighboring gears on one of the two transmission input shafts, with this sleeve forming a stationary connection to the idler through a shift coupling in dependence of the sleeve axial position, in which position two idlers can be rotated against one of the transmission input shafts and the transmission output shaft.

38. A transmission for a motor vehicle, the transmission having multiple shafts including a first, at least single-piece and a second, at least single-piece transmission input shaft and at least one transmission output shaft, said transmission comprising:
   a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input shafts;
   b) at least one transmission input shaft driven by a drive unit having a drive shaft;
   c) at least one transmission input shaft operatively connected with a first electrical machine, wherein the electrical machine can be connected with one of the transmission input shafts through a shift sleeve that is provided for shifting an individual gear, including means for uncoupling the first electrical machine from the at least one transmission input shaft;
   d) wherein the transmission output shaft is operatively connected with at least one driving wheel; and
   e) wherein at least one gear stage is actuated automatically by at least one actuator.

39. A transmission for a motor vehicle, the transmission having multiple shafts including a first, at least single-piece and a second, at least single-piece transmission input shaft and at least one transmission output shaft, said transmission comprising:
   a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input shafts;
   b) at least one transmission input shaft driven by a drive unit having a drive shaft;
   c) at least one transmission input shaft operatively connected with a first electrical machine, wherein the electrical machine that is drivingly connected with a transmission input shaft is connected with the transmission output shaft through a shift sleeve for the purpose of shifting a gear, with the transfer of torque occurring through the gears that form the gear ratio of the gear, including means for uncoupling the first electrical machine from the at least one transmission input shaft;
   d) wherein the transmission output shaft is operatively connected with at least one driving wheel; and
   e) wherein at least one gear stage is actuated automatically by at least one actuator.

40. A transmission for a motor vehicle, the transmission having multiple shafts including a first, at least single-piece and a second, at least single-piece transmission input shaft and at least one transmission output shaft, said transmission comprising:
   a) a plurality of gear pairs arranged between the transmission output shaft and the transmission input shafts, said gear pairs including an idler non-rotatably secured to one of the shafts, and a drive gear arranged to mesh with an idler and non-rotatably carried on a shaft for providing gear stages having different gear ratios between the transmission output shaft and one of the transmission input shafts;
   b) at least one transmission input shaft driven by a drive unit having a drive shaft;
   c) at least one transmission input shaft operatively connected with a first electrical machine;
   d) wherein the transmission output shaft is operatively connected with at least one driving wheel; and
   e) wherein at least one gear stage is actuated automatically by at least one actuator, and wherein a gear on the first transmission input shaft and a gear on the second transmission input shaft can be shifted to transfer torque from an electrical machine that is operatively connected to one of the gears to the drive shaft through one of the transmission input shafts, without transferring any torque from the transmission input shafts to at least one driving wheel.

41. A transmission in accordance with claim 40, wherein the internal combustion engine is started by the electrical machine.

42. A transmission in accordance with claim 1, including at least one actuator for automatically actuating at least one gear ratio; and a synchronizing device provided in association with a single last gear pair that is arranged on one of the transmission input shafts, wherein the last gear pair provides a largest possible speed of the transmission output shaft with regard to its gear ratio in relation to other gear ratios of the one transmission input shaft that includes the single last gear pair.

43. A transmission in accordance with claim 42, wherein no synchronizing device is provided on the second transmission input shaft and the electrical machine synchronizes the second transmission input shaft with the transmission output shaft when shifting between two gear ratios that are arranged on the second transmission input shaft.

44. A transmission in accordance with claim 42, including an end output element that is part of an end output mechanism that is actuated by an end actuating mechanism, wherein gear ratios are engaged by movement of the end output element to connect an idler with a shaft on which the idler is carried, and wherein a shifting sequence of the gear ratios is not set in the end actuating mechanism.

45. A transmission in accordance with claim 44, wherein the end actuating mechanism includes at least one main actuating element that actively connects with the end output mechanism to allow engagement of a selected gear ratio, and wherein the at least one main actuating element is connected with another end output mechanism without having to disengage the selected gear ratio, and wherein the end actuating mechanism includes at least one secondary actuating element.

46. A transmission in accordance with claim 45, wherein the at least one secondary actuating element is connected with at least one additional end output mechanism as soon as the at least one main actuating element actively connects with an end output mechanism.

47. A transmission in accordance with claim 46, wherein upon actuating an end output mechanism for engaging a gear ratio through at least one main actuating element, at least one additional end output mechanism is simultaneously actuated through at least one secondary actuating element for disengaging the gear ratio.

48. A transmission in accordance with claim 44, wherein only one gear ratio of each transmission input shaft can be engaged at the same time.

49. A transmission in accordance with claim 45, wherein for the purpose of synchronizing at least a first transmission input shaft with the transmission output shaft during a gear ratio change the synchronizing device on the last gear pair is actuated through a main actuating element, and wherein in the same torsional movement of a control shaft that is part of the end actuating mechanism the engaged gear is disengaged through a secondary actuating element.

50. A transmission in accordance with claim 45, wherein the end output mechanisms include connecting elements that have a first functional area for engagement of a main actuating element and a second functional area for engagement with a secondary actuating element.

51. A transmission in accordance with claim 50, wherein at least one secondary actuating element is arranged on a control shaft that can rotate around its longitudinal axis, and wherein the second functional area is operable so that upon rotating the control shaft a force can be transmitted from one secondary actuating element to the second functional area in a disengaging direction of the appropriate gear ratio, which force is equal to or larger than a force that is required for disengagement.

52. A transmission in accordance with claim 45, wherein at least one secondary actuating element is brought into engagement with at least two second functional areas.

53. A transmission in accordance with claim 51, wherein at least one secondary actuating element has a predetermined width in the control shaft axial direction.

54. A transmission in accordance with claim 51, wherein at least one secondary actuating element and the second functional areas cooperate to disengage a gear ratio when rotating the control shaft.

55. A transmission in accordance with claim 54, wherein at least one secondary actuating element and the second functional areas are symmetrical.

56. A transmission in accordance with claim 54, wherein at least one secondary actuating element includes cam-like end areas and the second functional areas include correspondingly shaped recesses for receiving the cam-like end areas.

57. A transmission in accordance with claim 54, wherein the second functional areas include cam-like end areas, and at least one secondary actuating element includes correspondingly shaped recesses for receiving the cam-like end areas.

58. A transmission in accordance with claim 54, wherein power transmission between the secondary actuating element and the second functional area occurs through tip areas of the cam-like end areas.

59. A transmission in accordance with claim 54, wherein power transmission between the secondary actuating element and the second functional area occurs through side areas of the cam-like end areas.

* * * * *